(12) United States Patent
Yin et al.

(10) Patent No.: US 11,199,460 B2
(45) Date of Patent: Dec. 14, 2021

(54) SOFT SHEAR FORCE RESISTIVE SENSOR EMBEDDED IN ARTIFICIAL SKIN

(71) Applicants: University of Washington, Seattle, WA (US); The Regents of the University of California, Oakland, CA (US)

(72) Inventors: Jianzhu Yin, Seattle, WA (US); Jonathan Posner, Seattle, WA (US); Veronica J. Santos, Oakland, CA (US)

(73) Assignees: University of Washington, Seattle, WA (US); The Regents of the University of California, Oakland, CA (US)

( * ) Notice: Subject to any disclaimer, the term of this patent is extended or adjusted under 35 U.S.C. 154(b) by 84 days.

(21) Appl. No.: 16/496,164

(22) PCT Filed: Mar. 21, 2018

(86) PCT No.: PCT/US2018/023662
§ 371 (c)(1),
(2) Date: Sep. 20, 2019

(87) PCT Pub. No.: WO2018/175662
PCT Pub. Date: Sep. 27, 2018

(65) Prior Publication Data
US 2020/0049580 A1    Feb. 13, 2020

Related U.S. Application Data

(60) Provisional application No. 62/474,502, filed on Mar. 21, 2017, provisional application No. 62/570,032, filed on Oct. 9, 2017.

(51) Int. Cl.
*G01L 5/161* (2020.01)
*G01L 5/22* (2006.01)
*G01L 1/22* (2006.01)

(52) U.S. Cl.
CPC ............ *G01L 5/226* (2013.01); *G01L 1/2287* (2013.01); *G01L 5/161* (2013.01)

(58) Field of Classification Search
CPC ........ G01L 5/226; G01L 1/2287; G01L 5/161
See application file for complete search history.

(56) References Cited

U.S. PATENT DOCUMENTS 5,263,375 A * 11/1993 Okada .................. B25J 13/085
                                                  73/862.042
6,886,415 B1    5/2005 Kurgoi et al.
(Continued)

FOREIGN PATENT DOCUMENTS

WO    WO 2014/066300    5/2014

OTHER PUBLICATIONS

Scheibert et al, "The Role of Fingerprints in the Coding of Tactile Information Probed with a Biomimetic Sensor," Science, vol. 323, No. 5920, 1503-1506, (2009).
(Continued)

*Primary Examiner* — Max H Noori
*Assistant Examiner* — Masoud H Noori
(74) *Attorney, Agent, or Firm* — McDonnell Boehnen Hubert & Berghoff LLP

(57) ABSTRACT

An example sensor device is provided. The sensor device includes (a) a substrate having a first end and a second end, wherein the substrate includes a contact portion, a first sensor portion positioned between the first end of the substrate and the contact portion, and a second sensor portion positioned between the second end of the substrate and the contact portion, (b) a first strain gauge sensor positioned at the first sensor portion, and (c) a second strain gauge sensor positioned at the second sensor portion, wherein the first end of the substrate and the second end of the substrate are configured to be coupled to a rigid curved (Continued)

surface, and wherein the sensor device is configured such that a force applied to the contact portion of the substrate will be sensed by each of the first strain gauge sensor and the second strain gauge sensor.

22 Claims, 36 Drawing Sheets

(56) References Cited

U.S. PATENT DOCUMENTS

| | | | |
|---|---|---|---|
| 7,127,301 B1* | 10/2006 | Okandan | A61N 1/0543 607/116 |
| 7,295,724 B2 | 11/2007 | Wang et al. | |
| 10,345,163 B2* | 7/2019 | Iesato | G01L 1/225 |
| 2002/0050174 A1* | 5/2002 | Valdevit | G01B 7/18 73/795 |
| 2008/0006450 A1* | 1/2008 | Simons | G01G 19/12 177/211 |
| 2010/0013941 A1 | 6/2010 | Loeb et al. | |
| 2010/0139418 A1 | 6/2010 | Loeb et al. | |
| 2012/0011806 A1 | 5/2012 | Majidi et al. | |
| 2012/0118066 A1 | 5/2012 | Majidi et al. | |
| 2013/0033309 A1 | 2/2013 | Choi | |
| 2013/0271159 A1 | 10/2013 | Santos et al. | |
| 2013/0333094 A1 | 12/2013 | Rogers et al. | |
| 2014/0238153 A1 | 8/2014 | Wood et al. | |
| 2015/0068324 A1* | 3/2015 | Ojima | G01L 1/2231 73/862.045 |
| 2020/0116608 A1* | 4/2020 | Yamagata | G01N 3/40 |

OTHER PUBLICATIONS

Schneider et al, "Mechanical properties of silicones for MEMS," J. Micromechanics Microengineering, vol. 18, No. 6, 065008, (2008).
Schubert et al, Variable stiffness material based on rigid low-melting-point-alloy microstructures embedded in soft poly(dimethylsiloxane) (PDMS) RSC Adv., 3 (46) 24671-24679 (2013).
Schwartz et al, "Flexible polymer transistors with high pressure sensitivity for application in electronic skin and health monitoring", Nature Communications. vol. 4, No. 1859 (2013).
Shewchuk. "What is a good linear finite element? interpolation, conditioning, anisotropy, and quality measures (preprint)," Univ. Calif. Berkeley, vol. 73, (2002).
Smith et al, "Role of friction and tangential force variation in the subjective scaling of tactile roughness," Exp. Brain Res., vol. 144, No. 2, 211-223, (2002).
Sohgawa et al, "Tactile array sensor with inclined chromium/silicon piezoresistive cantilevers embedded in elastomer," in Transducers 2009-2009 International Solid-State Sensors, Actuators and Microsystems Conference, 284-287 (2009).
Sokhanvar et al, , "A multifunctional PVDF-based tactile sensor for minimally invasive surgery," Smart Mater. Struct., vol. 16, No. 4, 989, (2007).
Stassi et al, "Flexible Tactile Sensing Based on Piezoresistive Composites: A Review," Sensors, vol. 14, No. 3, 5296-5332, (2014).
Su et al, "Use of tactile feedback to collrol exploratory movements to characterize object compliance," Front. Neurorobotics, vol. 6, (2012).
Su et al, "Force estimation and slip detection/classification for grip control using a biomimetic tactile sensor," in 2015 IEEE-RAS 15th International Conference on Humanoid Robots (Humanoids), 297-303 (2015).
Takenawa et al, "A soft three-axis tactile sensor based on electromagnetic induction," in IEEE International Conference on Mechalronics, 2009. ICM 2009, 1-6, (2009).
Tee et al, "A skin-inspired organic digital mechanoreceptor", Science. vol. 350, Issue 6258, 313-316 (2015).
Tegin et al, "Tactile sensing in intelligent robotic manipulation—a review," Ind. Robot Int. J., vol. 32, No. 1, 64-70, (2005).

Tiwana et al, "A review of tactile sensing technologies with applications in biomedical engineering," Sens. Actuators Phys., vol. 179, 17-31, (2012).
Townsend et al, "The BarrettHand grasper—programmably flexible part handling and assembly," Ind. Robot Int. J., vol. 27, No. 3, 181-188, (2000).
Tremblay et al, "Estimating friction using incipient slip sensing during a manipulation task," in , 1993 IEEE International Conference on Robotics and Automation, Proceedings, 429-434 vol. 1 (1993).
Trkalevska, "Tech Falls. New artificial skin for prosthetic limbs senses even small salt grains", (2015).
Vallbo et al, "Properties of cutaneous mechanoreceptors in the human hand related to touch sensation," Hum. Neurobiol., vol. 3, No. 1, 3-14, (1984).
Van Spengen et al, "MEMS reliability from a failure mechanisms perspective," Microelectron. Reliab., vol. 43, No. 7, 1049-1060, (2003).
Viry et al, "Flexible Three-Axial Force Sensor for Soft and Highly Sensitive Artificial Touch," Adv. Mater., vol. 26, No. 17, 2659-2664, (2014).
Vogt et al, "Design and Characterization of a Soft Multi-Axis Force Sensor Using Embedded Microfluidic Channels," IEEE Sens. J., vol. 13, No. 10, 4056-4064, (2013).
Wang et al, "Liquid Metal Inks for Flexible Electronics and 3D Printing: A Review," presented at the ASME 2014 International Mechanical Engineering Congress and Exposition. American Society of Mechanical Engineers, pp. 1-8, (Nov. 2014).
Weigel et al, "iSkin: Flexible, Stretchable and Visually Customizable On-Body Touch Sensors for Mobile Computing," in Proceedings of the 33rd Annual ACM Conference on Human Factors in Computing Systems, New York, NY, USA, 2991-3000 (2015).
Westling et al, "Factors influencing the force collrol during precision grip," Exp. Brain Res., vol. 53, No. 2, 277-284, (1984).
Westling et al, "Responses in glabrous skin mechanoreceptors during precision grip in humans," Exp. Brain Res., vol. 66, No. 1, 128-140, (1987).
Wettels et al, "Biomimetic Tactile Sensor Array," Adv. Robot., vol. 22, No. 8, 829-849, (2008).
Wisitsoraat et al, "Low cost thin film based piezoresistive MEMS tactile sensor," Sens. Actuators Phys., vol. 139, No. 1-2, 17-22, (2007).
Wissman et al, "Soft-matter electronics with stencil lithography," in 2013 IEEE Sensors, 1-4, (2013).
Wolfe et al, Chapter 12—Touch, in Sensation & Perception. Sinauer Associates, 16 pages (2006).
Wong et al, "Flexible microfluidic normal force sensor skin for tactile feedback," Sens. Actuators Phys., vol. 179, 62-69, (2012).
Wong et al, "Haptic exploration of fingertip-sized geometric features using a multimodal tactile sensor," Next Generation Robots and Systems vol. 9116, p. 911605-911615 (2014).
Wong et al, "Spatial Asymmetry in Tactile Sensor Skin Deformation Aids Perception of Edge Orientation During Haptic Exploration," IEEE Trans. Haptics, vol. 7, No. 2, 191-202, 2014.
Yamada et al, "Tactile sensor with 3-axis force and vibration sensing functions and its application to detect rotational slip," in 1994 IEEE International Conference on Robotics and Automation, 3550-3557 vol. 4, (1994).
Yang et al, "An integrated flexible temperature and tactile sensing array using PI-copper films," Sens. Actuators Phys., vol. 143, No. 1, 143-153, (2008).
Yin "Soft Tactile Sensor Embedded Artificial Skin", Thesis—University of Washington pp. 1-106, (2017).
Yin et al, "Measuring Dynamic Shear Force and Vibration with a Bioinspired Tactile Sensor Skin" IEEE Sensors Journal 18(9):3544-53 (May 2018).
Yin et al, "Bioinspired flexible microfluidic shear force sensor skin," Sensors and Actuators A: Physical 264:289-297 (2017).
Yoshizawa et al, "Fundamental mechanisms of interfacial friction. 2. Stick-slip friction of spherical and chain molecules," J. Phys. Chem., vol. 97, No. 43, 11300-11313, (1993).

(56) References Cited

OTHER PUBLICATIONS

Yousef et al, "Tactile sensing for dexterous in-hand manipulation in robotics—A review," Sens. Actuators Phys., vol. 167, No. 2, 171-187, (2011).

Yu et al, "Electrical, thermal, and species transport properties of liquid eutectic Ga—In and Ga—In—Sn from first principles" J. Chem. Phys., 140 (6) 064303, 9 pages (2014).

Yuji et al, "A PVDF Tactile Sensor for Static Contact Force and Contact Temperature," in 2006 5th IEEE Conference on Sensors, 738-741, (2006).

Yussof et al, "Development of an Optical Three-Axis Tactile Sensor for Object Handing Tasks in Humanoid Robot Navigation System," in Autonomous Robots and Agents, D. S. C. Mukhopadhyay and G. S. Gupta, Eds. Springer Berlin Heidelberg, 43-51, (2007).

Zahouani et al, "Effect of roughness on vibration of human finger during a friction test," Wear, vol. 301, No. 1-2, 343-352, (2013).

Zhao et al, "Optoelectronically innervated soft prosthetic hand via stretchable optical waveguides," Sci. Robot., vol. 1, No. 1, eaai7529, (2016).

Zhu et al, "Microstructured Graphene Arrays for Highly Sensitive Flexible Tactile Sensors," Small, vol. 10, No. 18, 3625-3631, (2014).

Ziegler-Graham et al, "Estimating the Prevalence of Limb Loss in the United States: 2005 to 2050," Arch. Phys. Med. Rehabil., vol. 89, No. 3, 422-429, (2008).

Howe et al, "Sensing skin acceleration for slip and texture perception," in , 1989 IEEE International Conference on Robotics and Automation, Proceedings, 145-150 vol. 1 (1989).

Hwang et al, "A Polymer-Based Flexible Tactile Sensor for Both Normal and Shear Load Detections and Its Application for Robotics," J. Microelectromechanical Syst., vol. 16, No. 3, 556-563, (2007).

James et al, "Impact of Prostheses on Function and Quality of Life for Children with Unilateral Congenital Below-the-Elbow Deficiency," J. Bone Jt. Surg., vol. 88, No. 11, 2356-2365, (2006).

Johansson et al, , "Coding and use of tactile signals from the fingertips in object manipulation tasks," Nat. Rev. Neurosci., vol. 10, No. 5, 345-359, (2009).

Johansson et al, "Tactile Sensory Control of Object Manipulation in Humans," in The Senses: A Comprehensive Reference, R. H. Masland, T. D. Albright, T. D. Albright, R. H. Masland, P. Dallos, D. Oertel, S. Firestein, G. K. Beauchamp, M. C. Bushnell, A. I. Basbaum, J. H. Kaas, and E. P. Gardner, Eds. New York: Academic Press, 67-86 (2008).

Johnson et al, "Tactile Functions of Mechanoreceptive Afferents Innervating the Hand:," J. Clin. Neurophysiol., vol. 17, No. 6, 539-558, (2000).

Johnson et al, "The roles and functions of cutaneous mechanoreceptors," Curr. Opin. Neurobiol., vol. 11, No. 4, 455-461, (2001).

Johnston et al, "Mechanical characterization of bulk Sylgard 184 for microfluidics and microengineering," J. Micromechanics Microengineering, vol. 24, No. 3, 035017, (2014).

Kandel et al, Principles of Neural Science, Fifth Edition. McGraw Hill Professional, (2012).

Keller et al, "Torsion fatigue response of self-healing poly(dimethylsiloxane) elastomersPolymer," 49 (13-14) 3136-3145, (2008).

Kim et al, "Thin, Flexible Sensors and Actuators as 'Instrumented' Surgical Sutures for Targeted Wound Monitoring and Therapy", Small. 8, No. 21, 3263-3268 (2012).

Klatzky et al, "Touch," in Handbook of Psychology, Experimental Psychology, vol. 4, John Wiley & Sons, 147-176, (2003).

Kolesar et al, "Tactile integrated circuit sensor realized with a piezoelectric polymer," in , Eighth Annual IEEE International Conference on Innovative Systems in Silicon, Proceedings, 372-381, (1996).

Kolesar et al, "Multiplexed piezoelectric polymer tactile sensor," J. Robot. Syst., vol. 9, No. 1, 37-63, (1992).

Krishna et al, "Tactile sensor based on piezoelectric resonance," IEEE Sens. J., vol. 4, No. 5, 691-697, (2004).

Kyung et al, "Perceptual and biomechanical frequency response of human skin: implication for design of tactile displays," in Eurohaptics Conference, 2005 and Symposium on Haptic Interfaces for Virtual Environment and Teleoperator Systems, 2005. World Haptics 2005. First Joint, 2005, 96-101.

Ladd et al, "3D Printing of Free Standing Liquid Metal Microstructures," Adv. Mater., vol. 25, No. 36, 5081-5085, (2013).

Lee et al, "A Flexible Polymer Tactile Sensor: Fabrication and Modular Expandability for Large Area Deployment," J. Microelectromechanical Syst., vol. 15, No. 6, 1681-1686, (2006).

Lee et al, "Normal and Shear Force Measurement Using a Flexible Polymer Tactile Sensor With Embedded Multiple Capacitors," J. Microelectromechanical Syst., vol. 17, No. 4, 934-942, (2008).

Lu et al, "Rapid Prototyping for Soft-Matter Electronics," Adv. Funct. Mater., vol. 24, No. 22, 3351-3356, (2014).

Luo et al, "Mobile Health: Design of Flexible and Stretchable Electrophysiological Sensors for Wearable Healthcare Systems", 2014 11th International Conference on Wearable and Implantable Body Sensor Networks. 87-91.

Macefield et al, "Control of grip force during restraint of an object held between finger and thumb: responses of cutaneous afferents from the digits," Exp. Brain Res., vol. 108, No. 1, 155-171, (1996).

Majidi et al, "A non-differential elastomer curvature sensor for softer-than-skin electronics," Smart Mater. Struct., vol. 20, No. 10, 105017, (2011).

MEMS & Nanotechnology Exchange. "What is MEMS Technology?" pp. 1-4; accessed from internet on Dec. 10, 2019.

Meyer et al, "Topology, Accuracy, and Quality of Isosurface Meshes Using Dynamic Particles," IEEE Trans. Vis. Comput. Graph., vol. 13, No. 6, 1704-1711, (2007).

Monzee et al, "The Effects of Digital Anesthesia on Force Control Using a Precision Grip," J. Neurophysiol., vol. 89, No. 2, 672-683, (2003).

Muhammad et al, "Development of a bioinspired MEMS based capacitive tactile sensor for a robotic finger," Sens. Actuators Phys., 165(2)1221-29 (Feb. 2011).

Muhammad et al, "A capacitive tactile sensor array for surface texture discrimination," Microelectron. Eng., 88 (8)11811-13 (Aug. 2011).

Muthukrishnan et al, "Edge detection in tactile images," in 1987 IEEE International Conference on Robotics and Automation. Proceedings, vol. 4, 1500-1505 (1987).

Noda et al, "A shear stress sensor for tactile sensing with the piezoresistive cantilever standing in elastic material," Sens. Actuators Phys., vol. 127, No. 2, 295-301, (2006).

Ohka et al, "A robotic finger equipped with an optical three-axis tactile sensor," in IEEE International Conference on Robotics and Automation, 2008. ICRA 2008, 3425-3430, (2008).

Ohka et al, "An Experimental Optical Threeaxis Tactile Sensor for Micro-Robots," Robotica, vol. 23, No. 04, 457-465, (2005).

Ohka et al, Sensing Precision of an Optical Three-axis Tactile Sensor for a Robotic Finger, in Roman—The 15th IEEE International Symposium on Robot and Human Interactive Communication, 214-219, (2006).

Ohka et al, "Sensing characteristics of an optical three-axis tactile sensor under combined loading," Robotica, 22 (02):213-21 (Mar. 2004).

Okamura et al, "Haptic Feedback in Robot-Assisted Minimally Invasive Surgery," Curr. Opin. Urol., vol. 19, No. 1, 102-107, (2009).

Olausson et al, "Tactile directional sensibility: peripheral neural mechanisms in man," Brain Res., vol. 866, No. 1-2, 178-187, (2000).

Pang et al, "A flexible and highly sensitive strain-gauge sensor using reversible interlocking of nanofibers". Nature Materials. 11, 795-801 (2012).

Park et al, "Design and Fabricartion of Soft Artificial Skin Using Embedded Microchannels and Liquid Conductors", IEEE Sensors Journal, vol. 12, Issue 8, 2711-18, (2012).

Park et al, "Hyperelastic pressure sensing with a liquidembedded elastomer," J. Micromechanics Microengineering, vol. 20, No. 12, 125029, (2010).

(56) References Cited

OTHER PUBLICATIONS

Park et al, "Tensile and high cycle fatigue test of copper thin film," Mater. Werkst., vol. 39, No. 2, 187-192, (2008).
Parthasarathy et al, "A comparison of tetrahedron quality measures," Finite Elem. Anal. Des., vol. 15, No. 3, 255-261, (1994).
Patarinski et al, "Robot force control: A review," Mechatronics, vol. 3, No. 4, 377-398, (1993).
Peng et al, "Flexible Tactile Sensor for Tissue Elasticity Measurements," J. Microelectromechanical Syst., vol. 18, No. 6, 1226-1233, (2009).
Petter et al, "Vibrotactile palpation instrument for use in minimal invasive surgery," in Proceedings of the 18th Annual International Conference of the IEEE Engineering in Medicine and Biology Society, 1996. Bridging Disciplines for Biomedicine, vol. 1, 179-180 vol. 1, (1996).
Preising et al, "A literature review: robots in medicine," IEEE Eng. Med. Biol. Mag., vol. 10, No. 2, 13-22, (1991).
Puangmali et al, "State-ofthe-Art in Force and Tactile Sensing for Minimally Invasive Surgery," IEEE Sens. J., vol. 8, No. 4, 371-381, (2008).
Qasaimeh et al, "PVDF-Based Microfabricated Tactile Sensor for Minimally Invasive Surgery," J. Microelectromechanical Syst., vol. 18, No. 1, 195-207, (2009).
Reinecke et al, "Experimental comparison of slip detection strategies by tactile sensing with the BioTac® on the DLR hand arm system," in 2014 IEEE International Conference on Robotics and Automation (ICRA), 2014, 2742-2748 (2014).
Roberts et al, "Soft-matter capacitive sensor for measuring shear and pressure deformation," in 2013 IEEE International Conference on Robotics and Automation (ICRA), 3529-3534, (2013).
Saikia et al, "Recent advancements in prosthetic hand technology," J. Med. Eng. Technol., vol. 0, No. 0, 1-10, (2016).
International Search Report for corresponding PCT application No. PCT/US2018/023662, dated Jun. 25, 2018.
Alenda, "Somatosensation—Neuroscience | Fastbleep." [Online]. Available: http://www.fastbleep.com/biology-notes/39/145/911. 11 pages. [Accessed: May 11, 2016].
Ando et al, "Tensile and high cycle fatigue test of copper thin film," Mater. Werkst., vol. 39, No. 2, 187-192, Feb. 2008.
Ando et al, "Ultrasonic emission tactile sensing," IEEE Conlrol Syst., vol. 15, No. 1, 61-69, (1995).
Bagdahn et al, "Tensile and high cycle fatigue test of copper thin film," Mater. Werkst., vol. 39, No. 2, 187-192, (2008).
Baumann et al, "Vibrotactile characteristics of different tissues in endoscopic otolaryngologic surgery—in vivo and ex vivo measurements," Minim. Invasive Ther. Allied Technol., vol. 10, No. 6, 323-327, (2001).
Bensmaia et al, "The Representation of Stimulus Orientation in the Early Stages of Somatosensory Processing," J. Neurosci., vol. 28, No. 3, 776-786, (2008).
Bicchi et al, "Low cost thin film based piezoresistive MEMS tactile sensor," Sens. Actuators Phys., vol. 139, No. 1-2, 17-22, (2007).
Biddiss et al, "Multivariate prediction of upper limb prosthesis acceptance or rejection," Disabil. Rehabil. Assist. Technol., vol. 3, No. 4, 181-192, 2008.
Biddiss et al, "Upper limb prosthesis use and abandonment: A survey of the last 25 years," Prosthet. Orthot. Int., vol. 31, No. 3, 236-257, (2007).
Bistac et al, "Sliding Friction of Polymers: The Complex Role of Interface," in Fundamentals of Friction and Wear, D. E. Gnecco and P. D. E. Meyer, Eds. Springer Berlin Heidelberg, 2007, 647-658.
Bolanowski et al, "Four channels mediate the mechanical aspects of touch," J. Acoust. Soc. Am., vol. 84, No. 5, 1680-1694, (1988).
Boley et al, "Direct Writing of Gallium-lndium Alloy for Stretchable Electronics," Adv. Funct. Mater., vol. 24, No. 23, 3501-3507, (2014).
Borysiak et al, "Translating diagnostic assays from the laboratory to the clinic: analytical and clinical metrics for device development and evaluation," Lab. Chip, vol. 16, No. 8, 1293-1313, (2016).

Brisben et al, "Detection of vibration transmitted through an object grasped in the hand," J. Neurophysiol., vol. 81, No. 4, 1548-1558, (1999).
Carter et al, "Selecting Piezoresistive vs. Piezoelectric Pressure Transducers." (Kulite Semiconductor Products, Inc.) Industry/Kulite General Overview pp. 1-25, 2018.
Charalambides et al, "A novel all-elastomer MEMS tactile sensor for high dynamic range shear and normal force sensing," J. Micromechanics Microengineering, vol. 25, No. 9, 095009, (2015).
Chen et al, "Efficient edge detection from tactile data," in 1995 IEEE/RSJ International Conference on Intelligent Robots and Systems 95. 'Human Robot Interaction and Cooperative Robots', Proceedings, vol. 3, 386-391 vol. 3 (1995).
Chen et al, "Novel Tactile Sensors Manufactured by Carbon Microcoils," in 2004 International Conference on MEMS, NANO and Smart Systems, 2004. ICMENS 2004. Proceedings, 486-491, (2004).
Cheng et al, "The development of a highly twistable tactile sensing array with stretchable helical electrodes", Sensors and Actuators A: Physical, vol. 166, Issue 2, 226-233, (2011).
Cheung et al, "A sensitive skin system for motion collrol of robot arm manipulators," Robot. Auton. Syst., vol. 10, No. 1, pp. 9-32 (Jan. 1992).
Chitta et al, "Tactile Sensing for Mobile Manipulation," IEEE Trans. Robot., vol. 27, No. 3, 558-568, (2011).
Codd et al, "Novel pressure-sensing skin for detecting impending tissue damage during neuroendoscopy Laboratory Investigation". Journal of Neurosurgery:Pediatrics vol. 13, Issue 1, 114-21 (2014).
Collins et al, "Movement illusions evoked by ensemble cutaneous input from the dorsum of the human hand.," J. Physiol., vol. 496, No. Pt 3, 857-871, (1996).
Cutkosky et al, "Dynamic Tactile Sensing," in The Human Hand as an Inspiration for Robot Hand Development, R. Balasubramanian and V. J. Santos, Eds. Springer International Publishing, 389-403, (2014).
Dahiya et al, "Human Tactile Sensing," in Robotic Tactile Sensing, Springer Netherlands, 19-41, (2013).
Dahiya et al, "Tactile sensing—from humans to humanoids," Robot. IEEE Trans. On, vol. 26, No. 1, 1-20, (2010).
Dargahi et al, "A micromachined piezoelectric tactile sensor for an endoscopic grasper-theory, fabrication and experiments," J. Microelectromechanical Syst., vol. 9, No. 3, 329-335, (2000).
Dargahi et al, "Human tactile perception as a standard for artificial tactile sensing—a review," Int. J. Med. Robot., vol. 1, No. 1, 23-35, (2004).
Dickey et al, "Eutectic Gallium-lndium (EGaln): A Liquid Metal Alloy for the Formation of Stable Structures in Microchannels at Room Temperature," Adv. Funct. Mater., vol. 18, No. 7, 1097-1104, (2008).
Doudrick et al, "Different Shades of Oxide: From Nanoscale Wetting Mechanisms to Contact Printing of Gallium-Based Liquid Metals," Langmuir, vol. 30, No. 23, 6867-6877, (2014).
Drimus et al, "Design of a flexible tactile sensor for classification of rigid and deformable objects," Robot. Auton. Syst., vol. 62, No. 1, 3-15, (2014).
Edin et al, "Skin strain patterns provide kinaesthetic information to the human central nervous system.," J. Physiol., vol. 487, No. 1, 243-251, (1995).
Eltaib et al, "Tactile sensing technology for minimal access surgery—a review," Mechatronics, vol. 13, No. 10, 1163-1177, (2003).
Engel et al, "Multi-Walled Carbon Nanotube Filled Conductive Elastomers: Materials and Application to Micro Transducers," in 19th IEEE International Conference on Micro Electro Mechanical Systems, 246-249, (2006).
Fagiani et al, "Tactile perception by friction induced vibrations," Tribol. Int., vol. 44, No. 10, 1100-1110, (2011).
Fishel et al, "Bayesian Exploration for Intelligent Identification of Textures," Front. Neurorobotics, vol. 6, (2012).
Fishel et al, "Sensing tactile microvibrations with the BioTac—Comparison with human sensitivity," in 2012 4th IEEE RAS EMBS International Conference on Biomedical Robotics and Biomechatronics (BioRob), 1122-1127, (2012.

(56) References Cited

OTHER PUBLICATIONS

Flanagan et al, "The Role of Internal Models in Motion Planning and Control: Evidence from Grip Force Adjustments during Movements of Hand-Held Loads," J. Neurosci., vol. 17, No. 4, 1519-1528, (1997).

Francomano et al, "Artificial Sense of Slip—A Review," IEEE Sens. J., vol. 13, No. 7, 2489-2498, (2013).

Futai et al, "A flexible micromachined planar spiral inductor for use as an artificial tactile mechanoreceptor," Sens. Actuators Phys., vol. 111, No. 2-3, 293-303, (2004).

Gates, "A Robot in Every Home," Sci. Am., vol. 18, 4-11, (2008).

Gentilucci et al, "Tactile input of the hand and the collrol of reaching to grasp movements," Exp. Brain Res., vol. 114, No. 1, 130-137, (1997).

Goodwin et al, "Sensory Signals in Neural Populations Underlying Tactile Perception and Manipulation," Annu. Rev. Neurosci., vol. 27, No. 1, 53-77, (2004).

Gysin et al, "Coordination of fingertip forces in object transport during locomotion," Exp. Brain Res., vol. 149, No. 3, 371-379, (2003).

Hale et al, "Deriving haptic design guidelines from human physiological, psychophysical, and neurological foundations," IEEE Comput. Graph. Appl., vol. 24, No. 2, 33-39, (2004).

Hammock et al, "25th Anniversary Article: The Evolution of Electronic Skin (E-Skin): A Brief History, Design Considerations, and Recent Progress," Adv. Mater., vol. 25, No. 42, 5997-6038, (2013).

Hammond et al, "Soft Tactile Sensor Arrays for Force Feedback in Micromanipulation," IEEE Sens. J., vol. 14, No. 5, 1443-1452, (2014).

Hammond et al, "Soft tactile sensor arrays for micromanipulation," in 2012 IEEE/RSJ International Conference on Intelligent Robots and Systems (IROS), 25-32, (2012).

Hammond et al, "Toward a modular soft sensor-embedded glove for human hand motion and tactile pressure measurement," in Intelligent Robots and Systems (IROS 2014), 2014 IEEE/RSJ International Conference on, 4000-4007, (2014).

Hayes et al, "Flexible liquid metal alloy (EGaIn) microstrip patch antenna" IEEE Trans. Antennas Propag., 60 (5) 2151-2156, (2012).

* cited by examiner

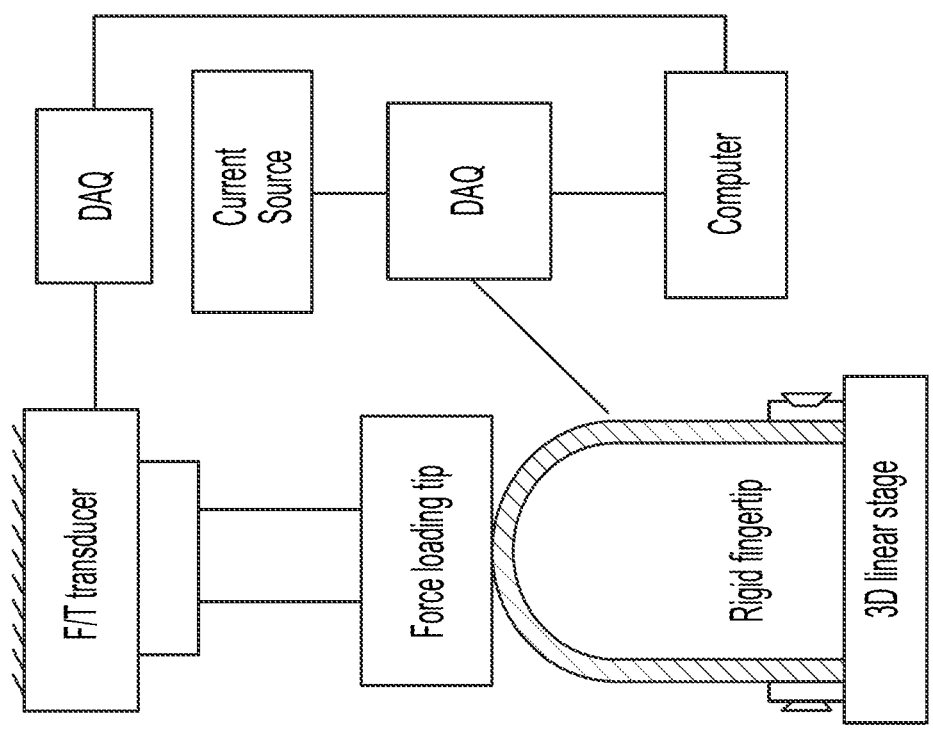
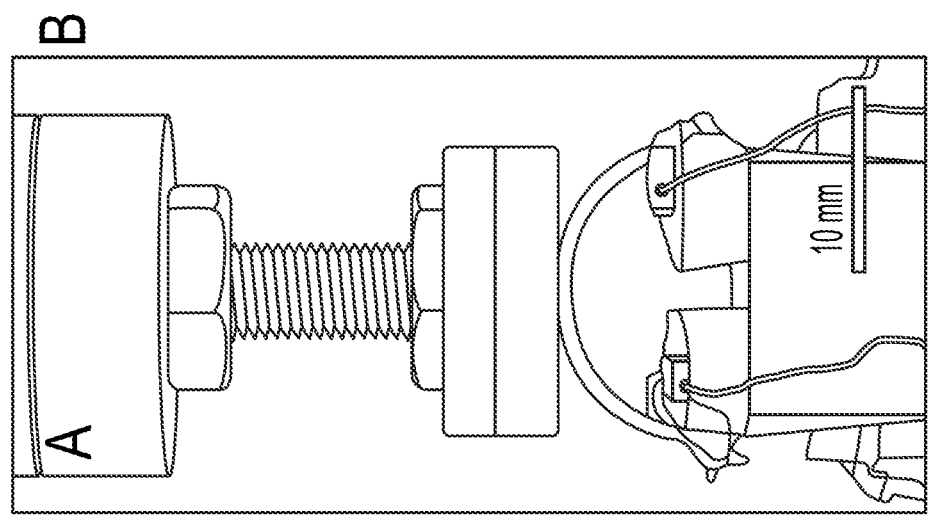
FIG. 15

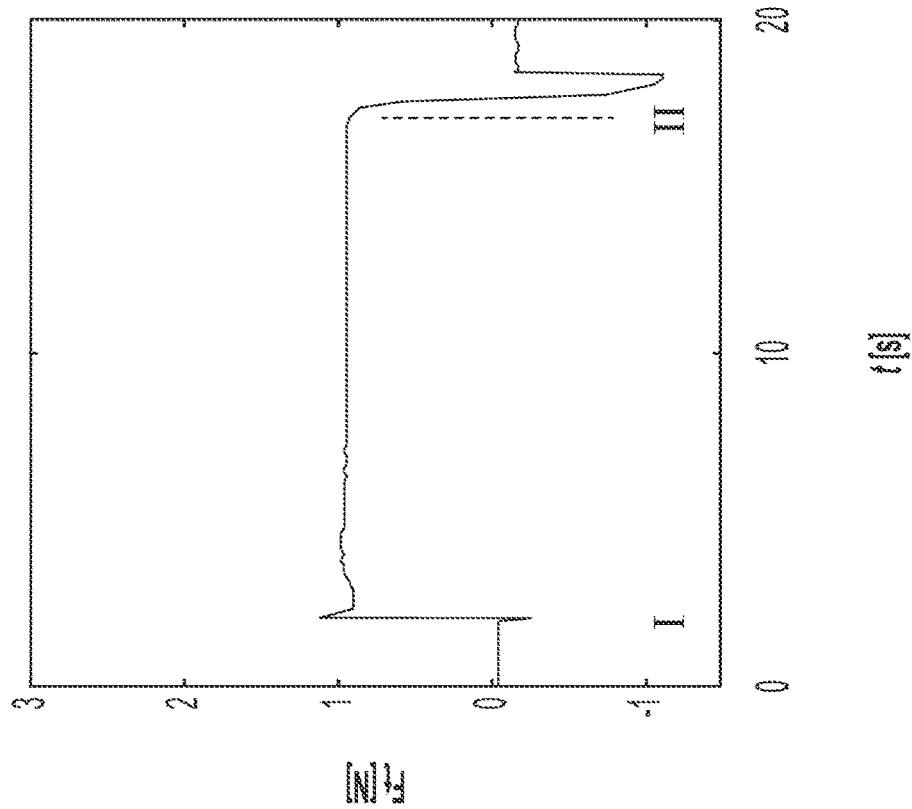
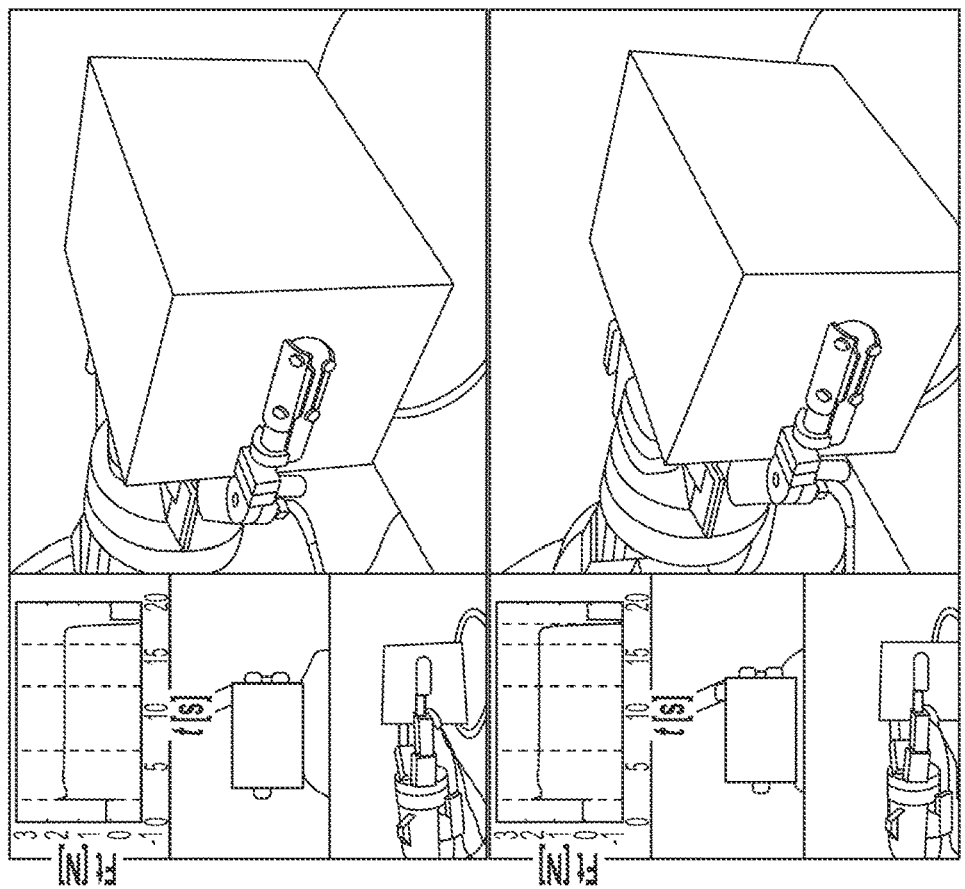
FIG. 28

SOFT SHEAR FORCE RESISTIVE SENSOR EMBEDDED IN ARTIFICIAL SKIN

CROSS REFERENCE TO RELATED APPLICATION

This application is a U.S. National Phase application of, and claims the benefit of, International (PCT) Application No. PCT/US2018/023662, filed Mar. 21, 2018, which claims priority to (i) U.S. Provisional Application No. 62/474,502, filed Mar. 21, 2017, and (ii) U.S. Provisional Patent Application No. 62/570,032, filed Oct. 9, 2017, the contents of all of which are hereby incorporated by reference in their entirety.

GOVERNMENT RIGHTS

This invention was made with government support under Grant Nos. CBET-1264046 and CBET-1461630, awarded by the National Science Foundation. The government has certain rights in the invention.

BACKGROUND

Unless otherwise indicated herein, the materials described in this section are not prior art to the claims in this application and are not admitted to be prior art by inclusion in this section.

Human beings possess the sense of touch so that they can precisely control muscle coordination during tasks such as haptic exploration and object manipulation. The sense of touch is not a precisely defined term and usually categorized regarding the site of sensory inputs into haptic (kinesthetic) and tactile (cutaneous). The term haptic is widely used in the context of touch sensing where a manipulator interacts with the surroundings and resolves external object properties. Haptic sensing is related to displacement and forces of muscles, tendons and joints, while tactile sensing measures spatially resolved displacement and forces from receptors in the skin, usually at the point of contact. In the example of pouring water into a glass, sensory inputs from the finger joints that inform hand posture and position corresponds to haptic. Inputs from the skin that is in contact with the glass and jug that suggest surface properties are tactile.

The tactile sensing capabilities of human beings enable us to explore the surroundings and deduce object surface/volumetric properties. Upon contact, humans perceive an object as warm or cold, rough or smooth, and hard or soft. Humans can determine the object's temperatures, surface textures, mechanical properties, such as hardness, mass distribution, and geometric shapes. Humans can also detect certain tactile events such as changing forces during a hug, incipient slip prevention, and even extract gravitational or inertial effects.

Tactile sensing can be categorized into a few modalities. Normal force sensing is vital in grasp force control, contact location detection and edge detection. Humans regulate grasp force to be 1.2-2 times the minimum force required without slip, which enables holding delicate objects without dropping or damaging them. When the skin is pressed against an object edge, static force mechanoreceptors surrounding the edge respond and resolve the edge with high spatial resolution. Upon contact both normal and shear forces are present and shear force sensing is critical to provide the information of friction in slip detection. It is also of importance in the grasp force regulation in that it reveals the dynamic features of the manipulating object such as slip, rotation, surface friction and inertia. There are also evidence suggesting that the combination of normal and shear force yields surface texture. Vibration sensing is thought to contribute to texture recognition and incipient slip detection. Tactile perception of fine texture as small as a few microns is resolved by vibrations generated while the finger is scanning the surface.

Robot manipulation and human prosthetic hands are important for a variety of reasons. Robotic and prosthetic manipulation with visual perception has shown to be successful in controlled environments. For example, optically controlled robots can aid in the construction of automobiles in engineered and tightly controlled assembly lines. However, the need for precise robot manipulation in applications with unstructured environment is growing. Surgical robots have to precisely distinguish different tissues from their texture and stiffness similar to an experienced surgeon. Prosthetic hands restore appearance and function of the lost body part and the demand is pressing since it is estimated that 41,000 persons in the United States undergo an upper-limb amputation in 2005. Prostheses have been shown to be helpful in daily activities including hygiene, eating, grooming and dressing yet they are challenging to use. Further technical advancement of prosthetic hands is required to improve prosthetic acceptance and quality of life for a wide range of manipulation tasks including manipulating an egg or glassware without crushing or slipping, locating and identifying objects such as a remote control in the dark or a key in the pocket when vision input is hindered.

Tactile feedback is a promising answer to these challenges because it enables precise manipulation such as minimal access surgery and tele-operation in complex environments, reveals surface/volumetric properties of objects, and increases robotic/prosthetic autonomy, such as reflexes. At the beginning of a manipulation, the robot/prosthesis needs to know if and when the object is in contact. Low resolution and often blocked visual information is insufficient without tactile information from contact. During the manipulation, the geometric shape, surface roughness and stiffness of the object can be obtained through tactile sensing, which can be used to construct a well-defined object model and enhance precise manipulation. Grasp forces are monitored and regulated through tactile sensing and slip is prevented by dynamic sensing. Overloading the end effector is also of concern for both the robot system and the manipulating object without tactile feedback, especially in rigid link mechanisms. Failure to measure and exert appropriate amount of force could lead to damage of the manipulating object and/or the end effector itself.

The tactile sensors developed over the past three decades have not yet met the tactile sensing needs of the robotic and prosthetic hands community. A variety of tactile sensors have been developed ranging from rigid MEMS sensor to whole finger sensors and flexible tactile sensing skin. While some sensors are outstanding in a few performance metrics and requirements, much improvement is needed. A useful tactile sensor has to be flexible under large strain and conformable to existing robotic manipulators. In particular, soft sensor designs that produce reliable shear force measurement and address vibration sensing modalities are scarce. A sensitive flexible shear tactile sensor that conforms and integrates into existing fingertips that also measures vibration hasn't been presented. A sensor that meets multiple design criteria and constraints shall be a useful tool for robotics and prosthetics applications. The present subject matter provides sensitive tactile sensing skin that can provide rich tactile information such as normal contact force, shear friction force, or vibration.

SUMMARY

Example sensor devices, sensor systems, and methods of use are described herein. In a first aspect, a sensor device is provided. The sensor device includes (a) a substrate having a first end and a second end, wherein the substrate includes a contact portion, a first sensor portion positioned between the first end of the substrate and the contact portion, and a second sensor portion positioned between the second end of the substrate and the contact portion, wherein the first and second sensor portions are spaced apart and separated by the contact portion, (b) a first strain gauge sensor positioned at the first sensor portion, and (c) a second strain gauge sensor positioned at the second sensor portion, wherein the first end of the substrate and the second end of the substrate are configured to be coupled to a rigid curved surface such that the substrate is configured to conform to the rigid curved surface, and wherein the sensor device is configured such that a force applied to the contact portion of the substrate will be sensed by each of the first strain gauge sensor and the second strain gauge sensor due to a movement of the substrate with respect to the rigid curved surface.

In a second aspect, another sensor device is provided. The sensor device includes (a) a substrate including a contact portion, a first tab extending from the contact portion, a second tab extending from the contact portion in a direction substantially parallel to and opposite from the first tab, a third tab extending from the contact portion in a direction substantially perpendicular to the first and second tabs, and a fourth tab extending from the contact portion in a direction substantially parallel to and opposite from the third tab, (b) a first strain gauge sensor positioned at the first tab, (c) a second strain gauge sensor positioned at the second tab, (d) a third strain gauge sensor positioned at the third tab, (e) a fourth strain gauge sensor positioned at the fourth tab, and (f) a first normal force sensor positioned on the contact portion, wherein a distal end of each of the first tab, the second tab, the third tab, and the fourth tab are configured to be coupled to a rigid curved surface such that the substrate is configured to conform to the rigid curved surface, and wherein the sensor device is configured such that a force applied to the contact portion of the substrate will be sensed by each of the first strain gauge sensor, the second strain gauge sensor, the third strain gauge sensor, the fourth strain gauge sensor, and the first normal sensor due to a movement of the substrate with respect to the rigid curved surface.

In a third aspect, a sensor system is provided. The sensor system includes (a) a sensor device including (i) a substrate having a first end and a second end, wherein the substrate includes a contact portion, a first sensor portion positioned between the first end of the substrate and the contact portion, and a second sensor portion positioned between the second end of the substrate and the contact portion, wherein the first and second sensor portions are spaced apart and separated by the contact portion, (ii) a first strain gauge sensor positioned at the first sensor portion, and (iii) a second strain gauge sensor positioned at the second sensor portion, and (ba rigid curved surface coupled to the substrate such that the first sensor portion and the second sensor portion are non-coplanar with the contact portion, wherein the first end of the substrate and the second end of the substrate are coupled to the rigid curved surface, and wherein the sensor system is configured such that a force applied to the contact portion of the substrate will be sensed by each of the first strain gauge sensor and the second strain gauge sensor due to a movement of the substrate with respect to the rigid curved surface.

In a fourth aspect, a method for detecting a force on a rigid curved surface is provided. The method includes (a) positioning the sensor device of any one of aspects described above on the rigid curved surface, (b) applying the force to the sensor device, and (c) the first strain gauge sensor and the second strain gauge sensor sensing the applied force due to a movement of the substrate with respect to the rigid curved surface to thereby determine a resistance in each of the first strain gauge and the second strain gauge.

These as well as other aspects, advantages, and alternatives, will become apparent to those of ordinary skill in the art by reading the following detailed description, with reference where appropriate to the accompanying drawings.

BRIEF DESCRIPTION OF THE DRAWINGS

FIG. 15 illustrates the external electrical equipment of an experiment, according to an example embodiment.

FIG. 28 shows the snapshots of different manipulation stage and sensor response to the pick and place test, according to an example embodiment.

DETAILED DESCRIPTION

Figure 1:
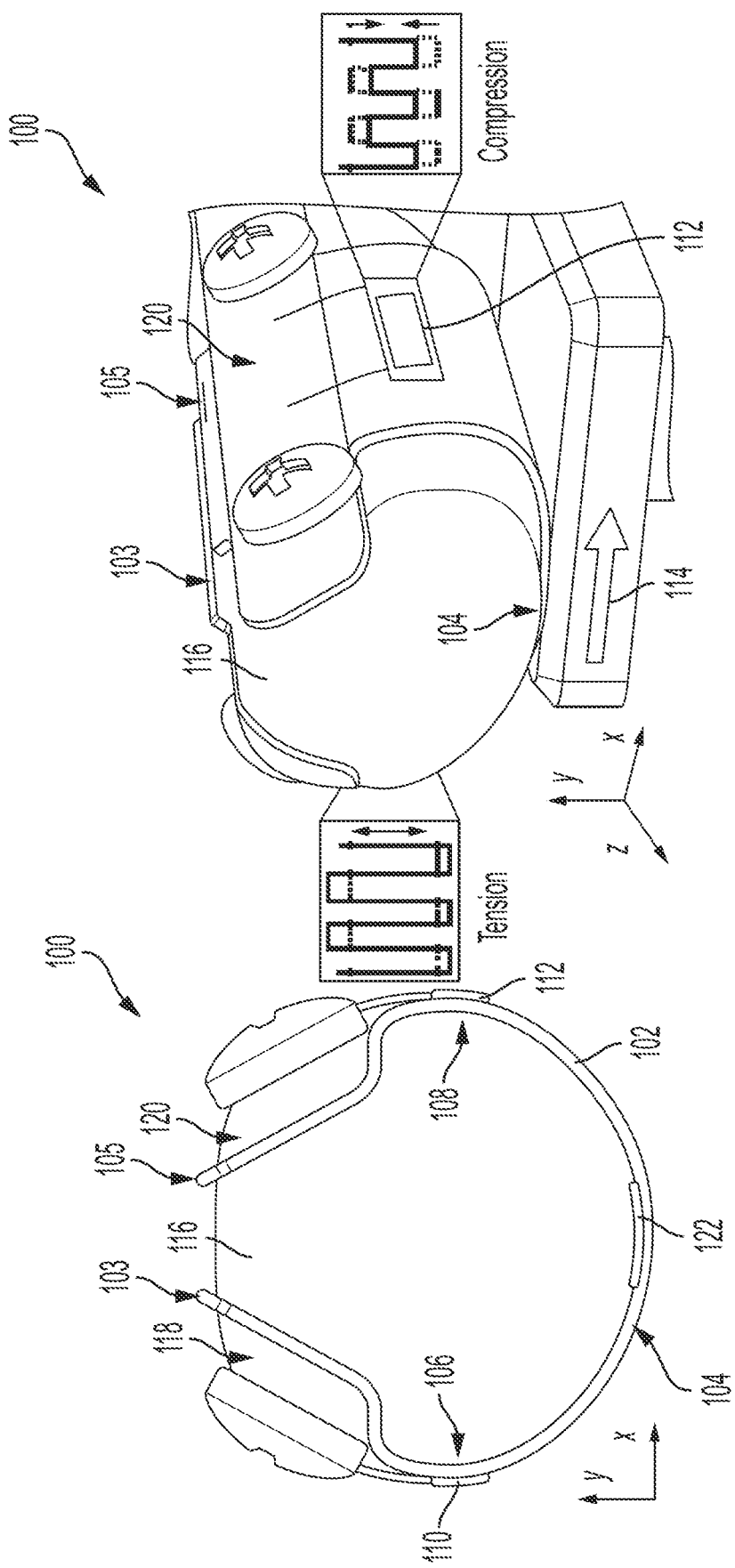
FIGS. 1A-1B illustrate a sensor device, according to an example embodiment.

Example methods and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. In the following detailed description, reference is made to the accompanying figures, which form a part thereof. In the figures, similar symbols typically identify similar components, unless context dictates otherwise. Other embodiments may be utilized, and other changes may be made, without departing from the scope of the subject matter presented herein.

The example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

As used herein, with respect to measurements, "about" means +/−5%.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one embodiment" or "one example" means that one or more feature, structure, or characteristic described in connection with the example is included in at least one implementation. The phrases "one embodiment" or "one example" in various places in the specification may or may not be referring to the same example.

As used herein, a system, apparatus, device, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware, which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

A. OVERVIEW

Example embodiments of the present disclosure include sensor devices, sensor systems, and methods of use thereof. In particular, a bioinspired, thin and flexible liquid metal filled resistive Polydimethylsiloxane (PDMS) microchannel based shear force sensor skin is described herein. In one particular example, the sensor skin is wrapped around a finger-shaped effector and fixed at the location of the nail bed. When the skin is subjected to shear force, regardless of the location of contact, it results in one side of the skin in tension and the other side in compression that buckles and bulges similar to a human fingertip. The tension and compression are measured by embedded liquid metal filled resistive microchannel strain gauges that are strategically placed adjacent to the nail bed. The resistive shear sensing skin is sensitive, precise, capable of capturing dynamic tactile events, and on par with human vibration sensing capabilities. The resistive shear sensing skin is intrinsically flexible and immune to fatigue or other problems of solid-state sensors when subjected to repeated large strain. The sensor devices and systems described herein further measures two dimensions of shear force, spatially resolved normal force, and vibration sensing in the normal and shear force directions. The normal force sensor is based on channel deformation induced resistance change with respect to normal force.

It should be understood that the above examples of the method are provided for illustrative purposes, and should not be construed as limiting.

B. EXAMPLE SENSOR DEVICES AND SYSTEMS

FIGS. 1A and 1B illustrate sensor device 100, according to an example embodiment. The shear sensing skin design is inspired by the layered structure of the human fingertip. Skin consists of epidermis (outermost layer); dermis, and subcutaneous fat tissue. While all of these layers are soft relative to the underlying bone, the subcutaneous fat tissue is much softer than the epidermis and dermis, thus, skin tends to shear and slide with respect to the underlying bone when shear force is applied to the finger pad. This deformation results in tension on one side of the fingerpad and compression on the other side. A shear force can be determined in such a sensor device by leveraging the asymmetry in the strain that occurs across the fingerpad, provided there is little to no Poisson's effect at the strain gauges. The Poisson's effect is negligible when normal forces are not applied directly to the strain gauges.

In particular, as shown in FIG. 1A, the sensor device 100 includes a substrate 102 having a first end 103 and a second end 105. The substrate 102 further includes a contact portion 104, a first sensor portion 106 positioned between the first end 103 of the substrate 102 and the contact portion 104, and a second sensor portion 108 positioned between the second end 105 of the substrate 102 and the contact portion 104. The first and second sensor portions 106, 108 are spaced apart and separated by the contact portion 104. The sensor device 100 also includes a first strain gauge sensor 110 positioned at the first sensor portion 106. The sensor device also includes a second strain gauge sensor 112 positioned at the second sensor portion 108. The first end 103 of the substrate 102 and the second end 105 of the substrate 102 are configured to be coupled to a rigid curved surface 116 such that the substrate is configured to conform to the rigid curved surface 116, as shown in FIGS. 1A and 1B. The sensor device 100 is configured such that a force 114 applied to the contact portion 104 of the substrate 102 will be sensed by each of the first strain gauge sensor 110 and the second strain gauge sensor 112 due to a movement of the substrate 102 with respect to the rigid curved surface 116, as illustrated in FIG. 1B.

Figure 2:
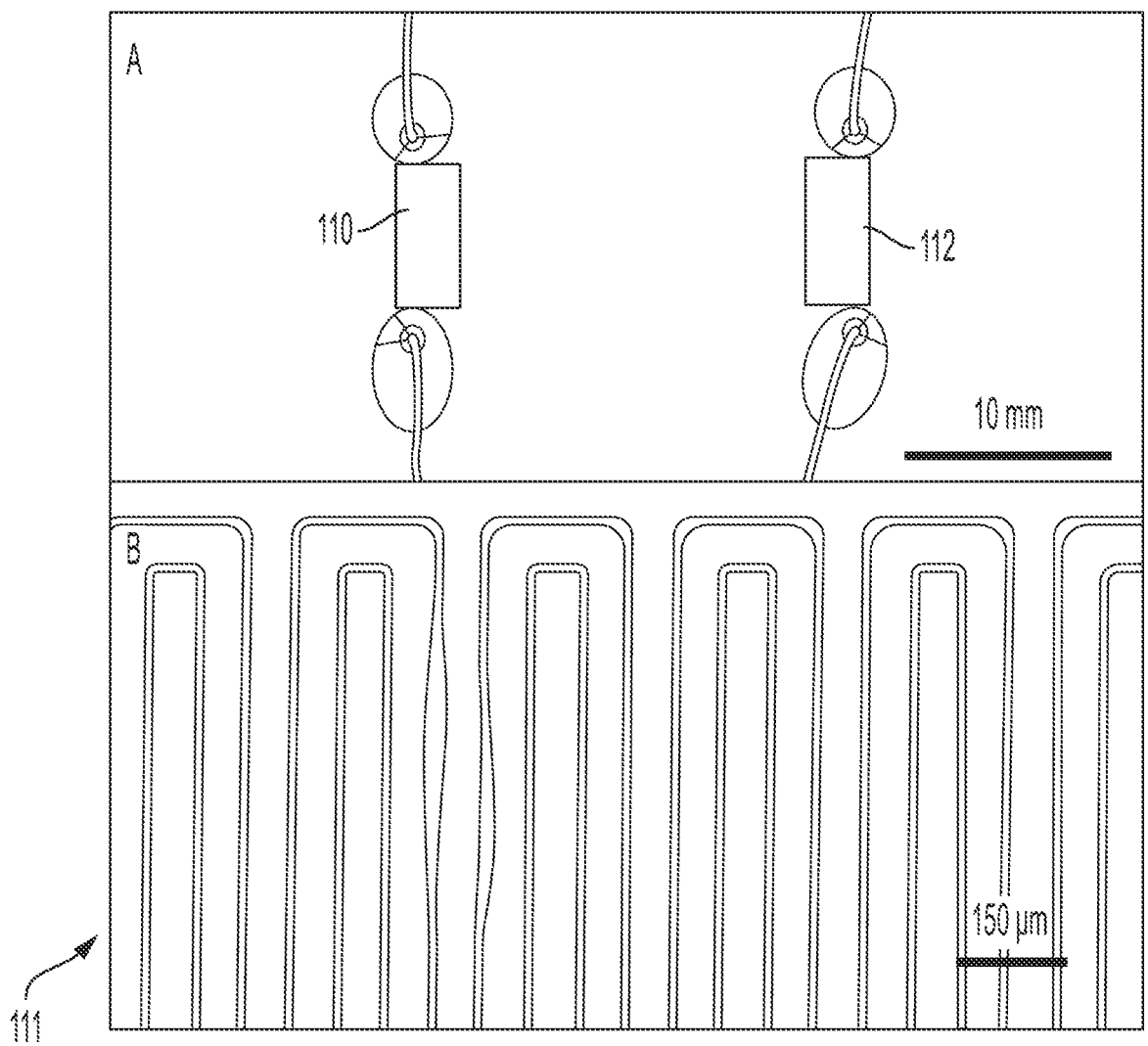
FIG. 2 illustrates example strain gauge sensors, according to an example embodiment.

The first strain gauge sensor 110 and the second strain gauge sensor 112 may take a variety of forms. In one example, each of the first strain gauge sensor and the second strain gauge sensor include a plurality of conductive pathways 111. In one example, the plurality of conductive pathways 111 comprise a plurality of channels with a conductive liquid metal positioned therein. The plurality of conductive pathways 111 may be flexible. In one particular example, each of the first strain gauge sensor 110 and the second strain gauge sensor 112 include a plurality of liquid metal filled microchannels, as shown in FIG. 2. In one particular example, the liquid metal filled microchannels comprise eGaIn filled microchannel strain gauges. Other strain gauges are possible as well. As shown in FIG. 2B, the strain gauge sensor microchannel design is a compromise between signal to noise ratio, power consumption, and microfabrication constraints. Considering N strips each of length L forming a strain gauge with total width W, the total length of the conductor consists of NL in the longitudinal direction and W in the transverse direction. Since N>>1, the transverse part can be ignored and the total resistance is approximately ρNL/(wh). The resistance change is proportional to longitudinal deformation. The power consumption of the strain gauge is $V^2/R=V^2wh/\rho NL$ where V is the applied voltage. The measured resistance change can be related to strain using the gauge factor $F=\Delta R/R_0/\varepsilon$, where $\Delta R$ is the change of resistance, $R_0$ is the resistance at the un-deformed state, and $\varepsilon$ is the strain. A uniaxial tensile stress with linear elasticity at small strain yields, $$\frac{\Delta R}{R_0} = \frac{1+\varepsilon}{(1-\upsilon\varepsilon)^2} - 1 \approx (1+2\upsilon)\varepsilon$$

where ν is Poisson's ratio of the material. The Poisson's ratio of an incompressible elastomer is 0.5 which results in a gauge factor of PDMS encapsulated liquid metal gauge is estimated at (1+2ν)=2.

These equations show that it is advantageous to maximize the sensor resistance because it minimizes the sensor power consumption and results in greater measured sensor response. Large sensor resistance can be achieved with small channel cross-section dimensions; however, there could be a practical limit to the minimum channel cross-section dimensions because larger filling pressures and better sealing techniques are required to fill the channels with liquid metal as microchannel dimensions become smaller. In one particular example, the width of the microchannels of the first strain gauge sensor 110 and the second strain gauge sensor 112 are 50 μm width and height and an approximately 210 mm long serpentine channel made of N=70 strips that are L=3 mm long. The nominal resistance of each strain gauge is approximately 25Ω.

As shown in FIGS. 1A-1B, the substrate 102 may comprise a flexible material configured to conform to a rigid curved surface 116. In one particular example, the substrate 102 comprises polydimethylsiloxane (PDMS). As such, the substrate 102 may be at least partially flexible. Other materials for the substrate 102 are possible as well. In one example, the contact portion 104 comprises at least half of a surface area of the substrate 102. In one example, each of the first strain gauge sensor 110 and the second strain gauge sensor 112 are embedded in the substrate 102. In another example, each of the first strain gauge sensor 110 and the second strain gauge sensor 112 are positioned on an outer surface of the substrate 102. In yet another example, each of the first strain gauge sensor 110 and the second strain gauge sensor 112 are positioned on an inner surface of the substrate 102.

In one example, conventional soft lithography fabrication techniques may be used to create 50 μm microchannels in PDMS for the first and second strain gauge sensors 110, 112. The master for the serpentine channel may be fabricated by first spin coating SU-8 2025 photoresist at 1500 rpm onto a 4 in. silicon wafer. The wafer may be soft baked by ramping up to 95° C. at 120° C./hr for 7 mins and cooling to room temperature at 240° C./hr. The master may be exposed for 60 s in a broad wavelength aligner whose intensity is 8.88 mW/cm² at 365 nm. Then the wafer may be post baked by ramping to 95° C. at 300° C./hr, for 7 mins and then cooled to room temperature at 300° C./hr. The master may then be developed for 6 mins and hard baked at 150° C. to improve mechanical stability. Trichloro(1H,1H,2H,2H-perfluorooctyl)silane may be evaporated onto the master in a desiccator to reduce the adhesion between PDMS and the mold. The thickness of the pattern on the master was measured to be 50 μm by a stylus profilometer.

In one particular example, PDMS with a 10:1 elastomer to curing agent ratio be used. Each half of the PDMS layer may be fabricated using a two-step spin coating process by first spin coating at 500 rpm for 60 s, curing at 80° C. for 1 hour in a desiccator under vacuum, and repeating to get a 0.3 mm thick layer. The patterned layer may be peeled from the wafer and cut into desired shape of 47 mm by 20 mm with serpentine strain gauges that have a total sensor area of 7 mm by 3 mm. Reservoirs for each strain gauge may be created by punching the patterned layer with a 710 μm cutting edge diameter, tin coated stainless steel puncher. The patterned PDMS film may be bonded to a 0.3 mm thick flat piece of PDMS, fabricated by spin coating PDMS on a blank wafer, using 30 s of oxygen plasma treatment with a 500~600 mTorr pressure and RF power of 30 W. The patterned PDMS film may be brought into contact with the flat PDMS film immediately after treatment and visual inspection for air entrapment. The assembly may be elevated to 80° C. for 1 hour to increase the bonding strength. For the integrated sensor, a 100 g weight may be placed to apply uniform pressure across the sensor area in order to promote bonding strength. eGaIn (Gallium Indium Tin Eutectic) may be injected into each strain gauge with a 22 gauge blunt needle. Two hundred fifty micron diameter copper wires may be placed into each reservoir and sealed by dispensing uncured PDMS over the reservoirs and copper wires. The assembly may be brought to 80° C. for 1 hr in an oven to cure the PDMS that seals the reservoirs and adheres the copper wires to the PDMS film. FIG. 2 shows the fully assembled artificial skin embedded with eGaIn-filled microchannel strain gauge sensors 110, 112.

Further, as shown in FIGS. 1A-1B, the sensor device 100 may also include a first mounting portion 118 positioned on the substrate 102. The first mounting portion 118 is positioned between the first end 103 of the substrate 102 and the first sensor portion. The sensor device 100 may also include a second mounting portion 120 positioned on the substrate 102. The second mounting portion 120 is positioned between the second end 105 of the substrate 102 and the second sensor portion 108. The first mounting portion 118 and the second mounting portion 120 mount the substrate 102 to a rigid curved surface 116. As shown in FIGS. 1A-1B, the first mounting portion 118 and the second mounting portion 120 may comprise a bracket with screws that are positioned into the rigid surface 116. However, the first mounting portion 118 and the second mounting portion 120 may take a variety of forms, including mounting brackets, adhesive, stitches, or clamps, as non-limiting examples. In one particular example, the rigid curved surface 116 comprises an end effector of a robotic device. In another embodiment, the rigid curved surface 116 may comprise any surface on the body of a robotic device or a human. Other surfaces are possible as well. In another example, the sensor device 100 is mounted to a surface that is not curved. For example, the sensor device 100 may be mounted to a building, bridge, aircraft, or other structure to detect tension, compression, and/or vibration forces. Other use cases for the sensor system 100 are possible as well.

Figure 3:
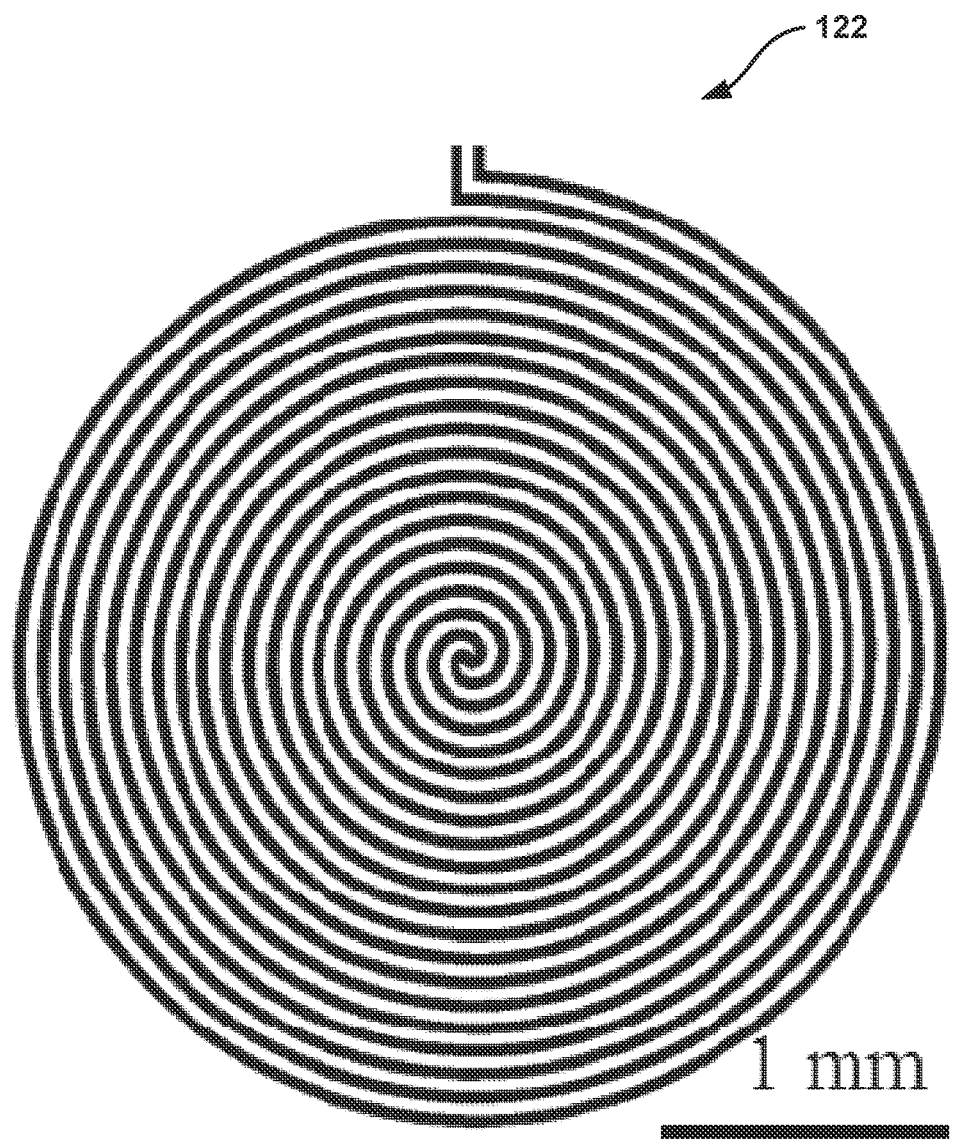
FIG. 3 illustrates an example normal force sensor, according to an example embodiment.

The sensor device 100 may further include a normal force sensor 122 positioned on the contact portion 104. In one particular example, the normal force sensor 122 comprises a spiral microfluidic architecture, as shown in FIG. 3. Spiral resistive normal force sensors 122 tend to be more robust against electromagnetic noise and are easier to fabricate because they only consists of a single layer microfluidic architecture. The design shown in FIG. 3 modifies existing spiral normal force sensors to fit finger-sized end effectors and reduced the geometry to enhance dynamic range. The arithmetic spiral curve is used to allow constant separating distance between the channels. As shown in FIG. 3, the spiral microfluidic architecture consists of two arithmetic spiral curve connected at the center, with inlet and outlet on one side of the spiral. The resistance of the channel is a function of sensor total radius, channel spacing and dimension.

The sensor resistance of the normal force sensor 122 is $$R = \rho \frac{l}{A}$$

with ρ as resistivity, l as total channel length, A as the cross section area. It is advantageous to maximize the normal force sensor resistance to minimize power consumption and greater measured sensor response. The channel dimension is 50 μm width and height in the goal of fabricating defect free channels that can be filled using pressure. The size of the sensor is constrained by the geometry of the fingertip. The diameter of the normal force sensors may be about 3 mm.

As shown in FIG. 1, the substrate 102 around a rigid curved surface 116 (in this case, an artificial fingertip) and is fixed with the first and second mounting portions 118, 120 near the top of the rigid curved surface 116 at a location proximal to the perimeter of a human finger nail bed. The eGaIn filled microchannel strain gauge sensors 110, 112 are located in the substrate 102, adjacent to the first and second mounting portions 118, 120. The interface between the rigid curved surface 116 and flexible substrate 102 may be lubricated so that the flexible substrate 102 can more easily slide with respect to the rigid curved surface 116. When the substrate 102 is subject to shear force 114 at the location of fingerpad, as shown in FIG. 1B, the substrate 102 slides relative to the rigid curved surface 116 at the contact portion 104, putting the fore and aft sides of the substrate 102 in compression (buckling) and tension, respectively. The asymmetric strain pattern allows us to uniquely correlate the difference between the strains to the amount of shear force applied on the rigid curved surface 116.

The substrate 102 can be designed such it is soft to shear displacement but stiff to tensile displacement using modified geometry or anisotropic material. Thus, for a given shear displacement, the z-direction as shown in FIGS. 1A and 1B will generate less reaction forces, concentrating the strain to the sensors 110, 112 and increasing sensor sensitivity. In one particular example, the substrate 102 comprises an anisotropic material that has low shear modulus but is strong in the direction of tension, for example by using fibers. In one particular example, the fibers are arranged such that a longitudinal axis of the fibers are parallel to a length of a long axis of the substrate 102 (e.g., pointing form the first end 103 to the second end 105 of the substrate 102). Other embodiments for providing a substrate that is soft to shear displacement but stiff to tensile displacement are possible as well.

In one example, the sensor device 100 is part of a sensor system that includes the sensor device 100 and the rigid curved surface 116. In such an example, the sensor device includes all of the features described above, including (i) a substrate 102 having a first end 103 and a second end 105, wherein the substrate 102 includes a contact portion 104, a first sensor portion 106 positioned between the first end 103 of the substrate 102 and the contact portion 104, and a second sensor portion 108 positioned between the second end 105 of the substrate 102 and the contact portion 104, wherein the first and second sensor portions 106, 108 are spaced apart and separated by the contact portion 104, (ii) a first strain gauge sensor 110 positioned at the first sensor portion 106, and (iii) a second strain gauge sensor 112 positioned at the second sensor portion 108. The first end 103 of the substrate 102 and the second end 105 of the substrate 102 are coupled to the rigid curved surface 116 such that the substrate 102 conforms to the rigid curved surface 116. The rigid curved surface 116 is coupled to the substrate 102 such that the first sensor portion 106 and the second sensor portion 108 are non-coplanar with the contact portion 104. The sensor system is configured such that a force 114 applied to the contact portion 104 of the substrate 102 will be sensed by each of the first strain gauge sensor 110 and the second strain gauge sensor 112.

Figure 4:
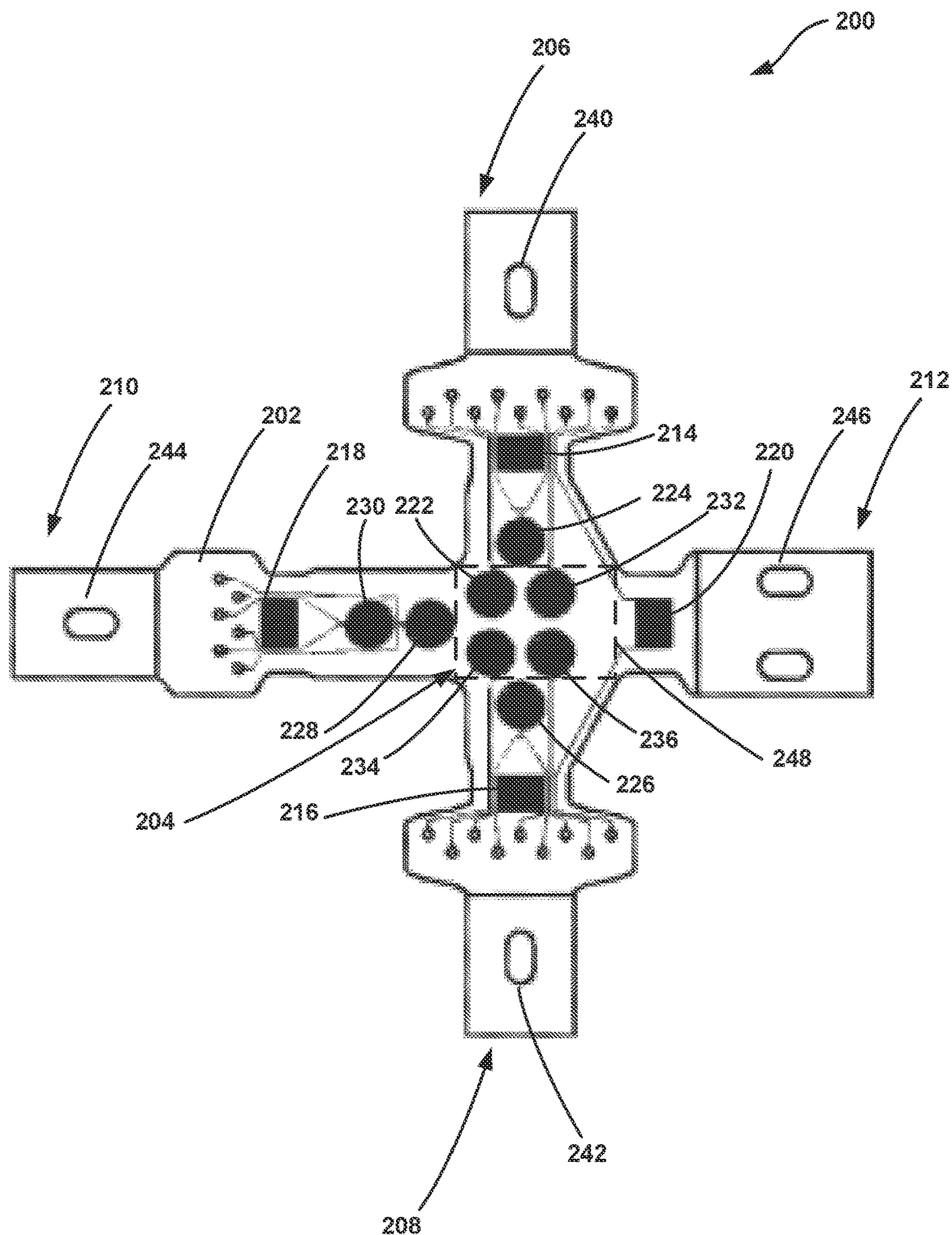
FIG. 4 illustrates another sensor device, according to an example embodiment.

FIG. 4 illustrates another sensor device 200, according to an example embodiment. As shown in FIG. 4, the sensor device 200 may include a substrate 202 including a contact portion 204, a first tab 206 extending from the contact portion 204, a second tab 208 extending from the contact portion 204 in a direction substantially parallel to and opposite from the first tab 206, a third tab 210 extending from the contact portion 204 in a direction substantially perpendicular to the first and second tabs 206, 208, and a fourth tab 212 extending from the contact portion 204 in a direction substantially parallel to and opposite from the third tab 210. The sensor device 200 may further include a first strain gauge sensor 214 positioned at the first tab 206, a second strain gauge sensor 216 positioned at the second tab 208, a third strain gauge sensor 218 positioned at the third tab 210, and a fourth strain gauge sensor 220 positioned at the fourth tab 212. The sensor device 200 may further include a first normal force sensor 222 positioned on the contact portion 204. A distal end of each of the first tab 206, the second tab 208, the third tab 210, and the fourth tab 212 are configured to be coupled to a rigid curved surface 238 such that the substrate 202 is configured to conform to the rigid curved surface 238. The sensor device 200 is configured such that a force applied to the contact portion 204 of the substrate 202 will be sensed by each of the first strain gauge sensor 214, the second strain gauge sensor 216, the third strain gauge sensor 218, the fourth strain gauge sensor 220, and the first normal force sensor 222 due to a movement of the substrate 202 with respect to the rigid curved surface 238.

As shown in FIG. 4, the sensor device 200 may further include a second normal force sensor 224 positioned between the first strain gauge sensor 214 and the contact portion 204. The sensor device 200 may further include a third normal force sensor 226 positioned between the second strain gauge sensor 216 and the contact portion 204. The sensor device 200 may further include a fourth normal force sensor 228 positioned between the third strain gauge sensor 218 and the contact portion 204. The sensor device 200 may further include a fifth normal force sensor 230 positioned between the third strain gauge sensor 218 and the fourth normal force sensor 228. The sensor device 200 may further include one or more additional normal force sensors positioned on the contact portion 204. In particular, as shown in FIG. 4, the one or more additional normal force sensors positioned on the contact portion 204 may comprises a sixth normal force sensor 232 positioned on the contact portion 204, a seventh normal force sensor 234 positioned on the contact portion 204, and an eighth normal force sensor 236 positioned on the contact portion 204.

As such, the contact portion 204 has 2 by 2 normal force sensor layout. The ulnar and radial first and second tabs 206, 208 contain 1 normal force sensor and 1 strain gauge sensor. The proximal fourth tab 212 contains a strain gauge sensor only and the distal third tab 210 contains two normal force sensors because there is a high interest in the normal force in this region where the fingertip interact with objects.

Figure 5:
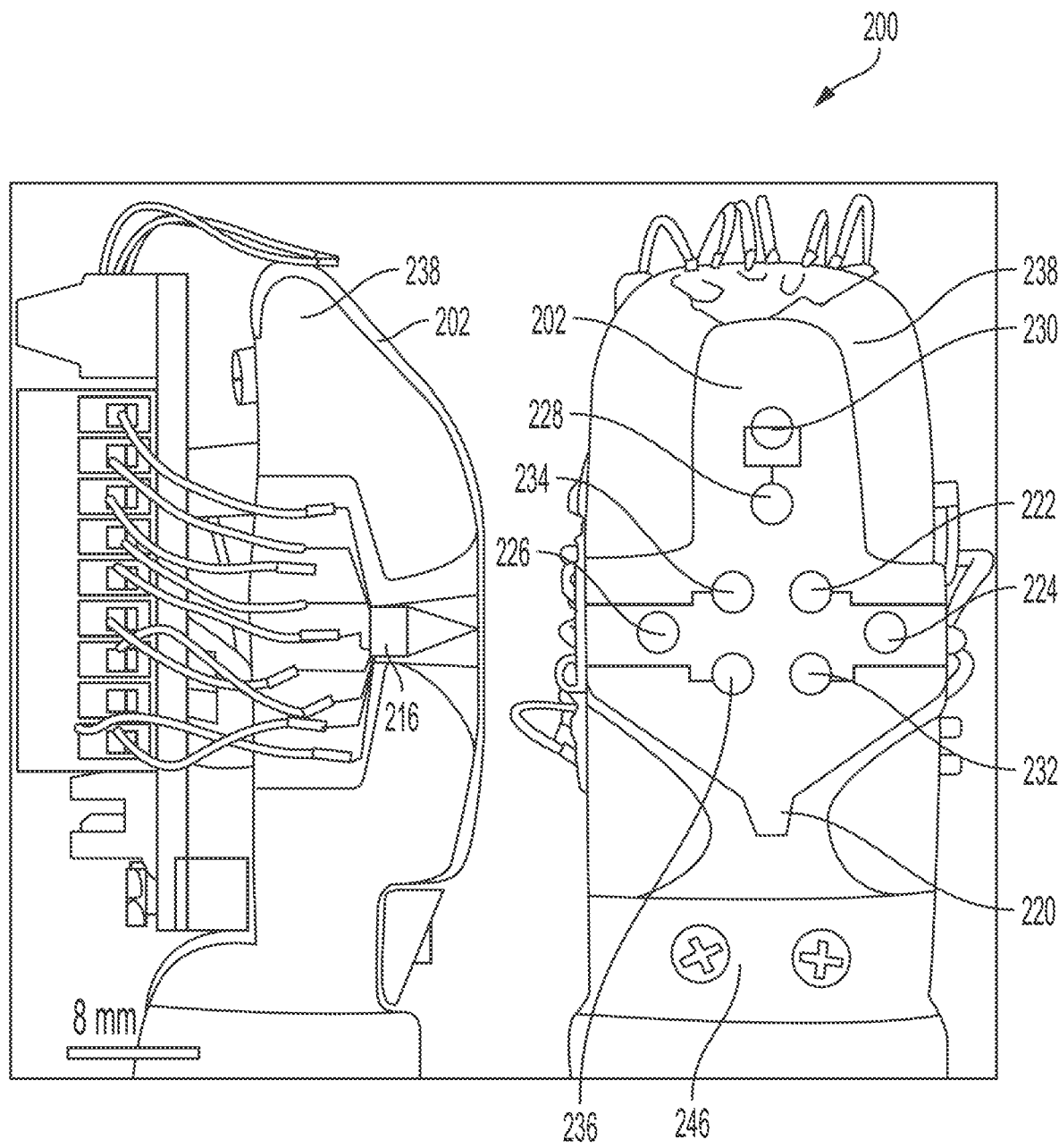
FIG. 5 illustrates the sensor device of FIG. 4 positioned on a rigid curved surface, according to an example embodiment.

As discussed above, the substrate 202 may comprise a flexible material configured to conform to a rigid curved surface 238, as shown in FIG. 5. In one particular example, the substrate 202 comprises polydimethylsiloxane (PDMS). Other materials for the substrate 202 are possible as well. In one example, the contact portion 204 comprises at least half of a surface area of the substrate 202. In one example, each of the sensors are embedded in the substrate 202. In another example, each of the sensors are positioned on an outer surface of the substrate 202. In yet another example, each of the sensors are positioned on an inner surface of the substrate 202. Each of the strain gauge sensors and the normal force sensors may be similarly arranged to the strain gauge sensors 110, 112 and normal force sensors 122 described above in relation to the sensor device 100.

As shown in FIGS. 4-5, the sensor device 200 may further include a first mounting portion 240 positioned on the first tab 206 of the substrate 202. The first strain gauge sensor 214 is positioned between the first mounting portion 240 and the contact portion 204. The sensor device 200 may further include a second mounting portion 242 positioned on the second tab 208 of the substrate 202. The second strain gauge sensor 216 is positioned between the second mounting portion 242 and the contact portion 204. The sensor device 200 may further include a third mounting portion 244 positioned on the third tab 210 of the substrate 202. The third strain gauge sensor 218 is positioned between the third mounting portion 244 and the contact portion 204. The sensor device 200 may further include a fourth mounting portion 246 positioned on the fourth tab 212 of the substrate. The fourth strain gauge sensor 220 is positioned between the fourth mounting portion 246 and the contact portion 204. Each of the mounting portions 240, 242, 244, 246 are used to mount the substrate to the rigid curved surface 238. As discussed above, in one example the rigid curved surface 238 comprises an end effector of a robotic device.

The mounting portions 240, 242, 244, 246 may take a variety of forms, as discussed above. In particular, the mounting portions 240, 242, 244, 246 may comprise any structure configured to mount the sensor device 200 to a surface, such as the rigid curved surface 238. As shown in FIG. 4, the mounting portions 240, 242, 244, 246 may comprise through holes in the substrate 202, through which fastening mechanisms may pass to thereby secure the sensor device 200 to the rigid curved surface 116 an/or 238 as shown in FIGS. 1 and 5 respectively.

The four tabs 206, 208, 210, 212 connecting to the contact portion 204 of the substrate 202 can be designed such that they are soft to shear displacement but stiff to tensile displacement using modified geometry or anisotropic material. Thus, for a given shear displacement, tabs of orthogonal direction will generate less reaction forces, concentrating the strain to the co-linear tabs and increasing sensor sensitivity. One proposal is to create a softened region 248, as shown in FIG. 4. The softened region 248, represented by the four dotted lines in FIG. 4, may represent punched holes that reduce local stiffness of the substrate 204. Another approach is to use anisotropic material at the softened region 248 that has low shear modulus but is strong in the direction of tension, for example by using fibers. The softened region 248 enables the contact region 204 to slide more easily with respect to the rigid curved surface 238. Additionally, surface treatment may be implemented so that the friction coefficient between the substrate 202 and the rigid curved surface 238 can be greatly reduced. For example, a lubricant may be positioned between the substrate 202 and the rigid curved surface 238.

The sensor resistance is $R=\rho l/A$ with $\rho$ as resistivity, l as total channel length, A as the cross section area. It is advantageous to maximize the normal force sensor resistance to minimize power consumption and greater measured sensor response. The channel dimension is 50 µm width and height in the goal of fabricating defect free channels that can be filled using pressure. The size of the sensor is constrained by the geometry of the fingertip. Then the substrate 202 was then fitted to allow conformal wrapping and sensor dimension was determined accordingly depending on the available geometry space. The diameter of the normal force sensors may be about 3 mm, the length and width of the shear force sensors may be about 3 mm and 4 mm respectively. This resulted in a normal force sensor channel that has an overall length of approximately 126 mm long and shear force sensor that is approximately 120 mm long serpentine channel made of N=40 strips that are L=3 mm long. These dimensions are for examples only, and are not meant to be limiting. The calculated nominal resistance of each strain gauge is approximately 15Ω, which is verified in experiments.

Figure 6:
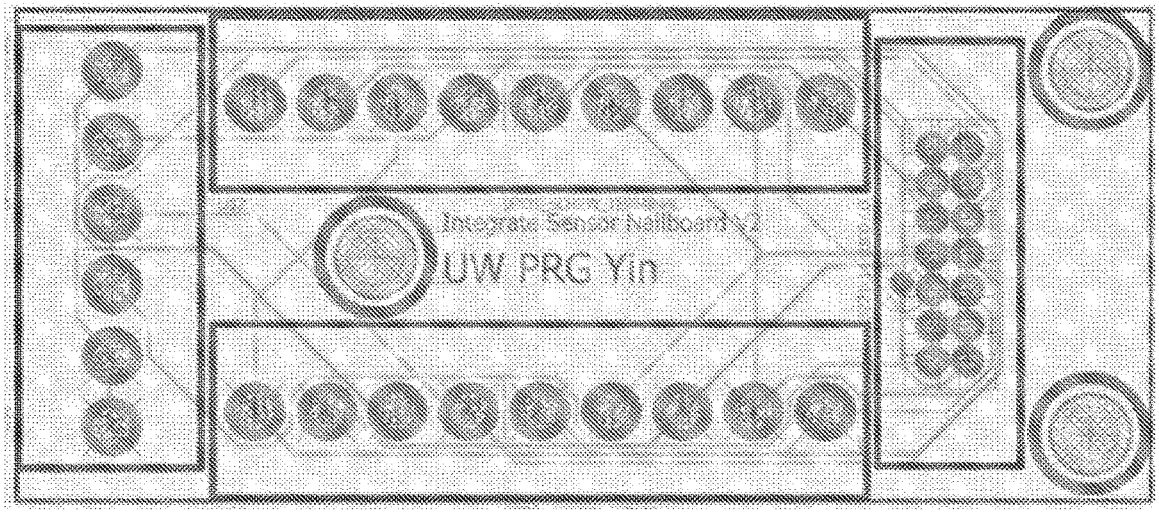
FIG. 6 illustrates a printed circuit board for use with the sensor device of FIG. 4, according to an example embodiment.
Figure 7:
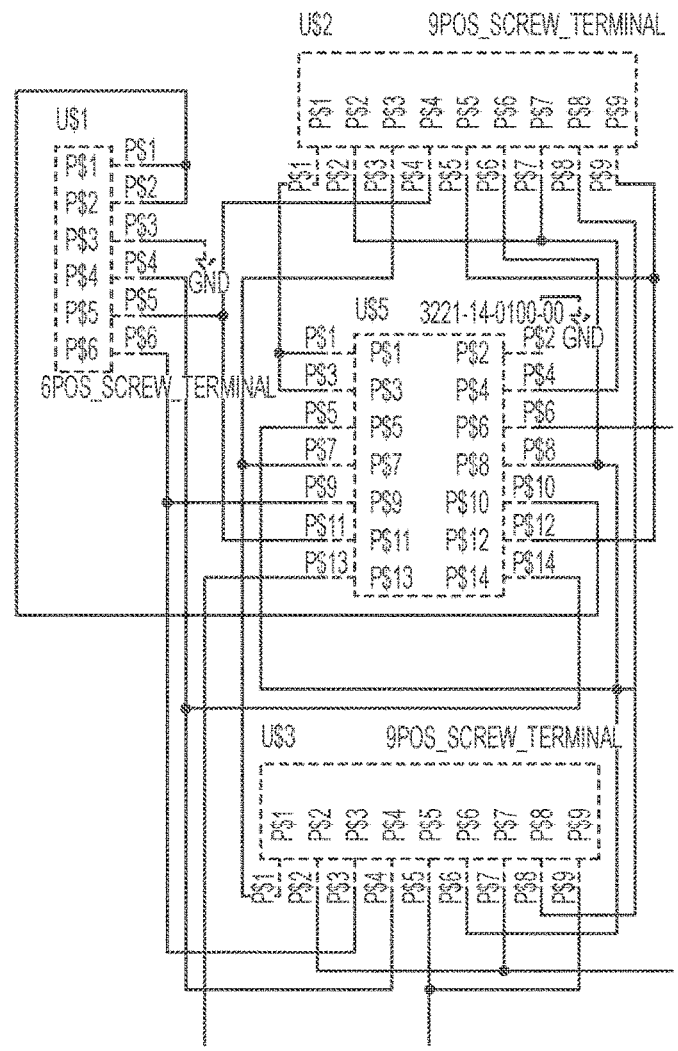
FIG. 7 is a schematic of the printed circuit board of FIG. 6, according to an example embodiment.
Figure 24:
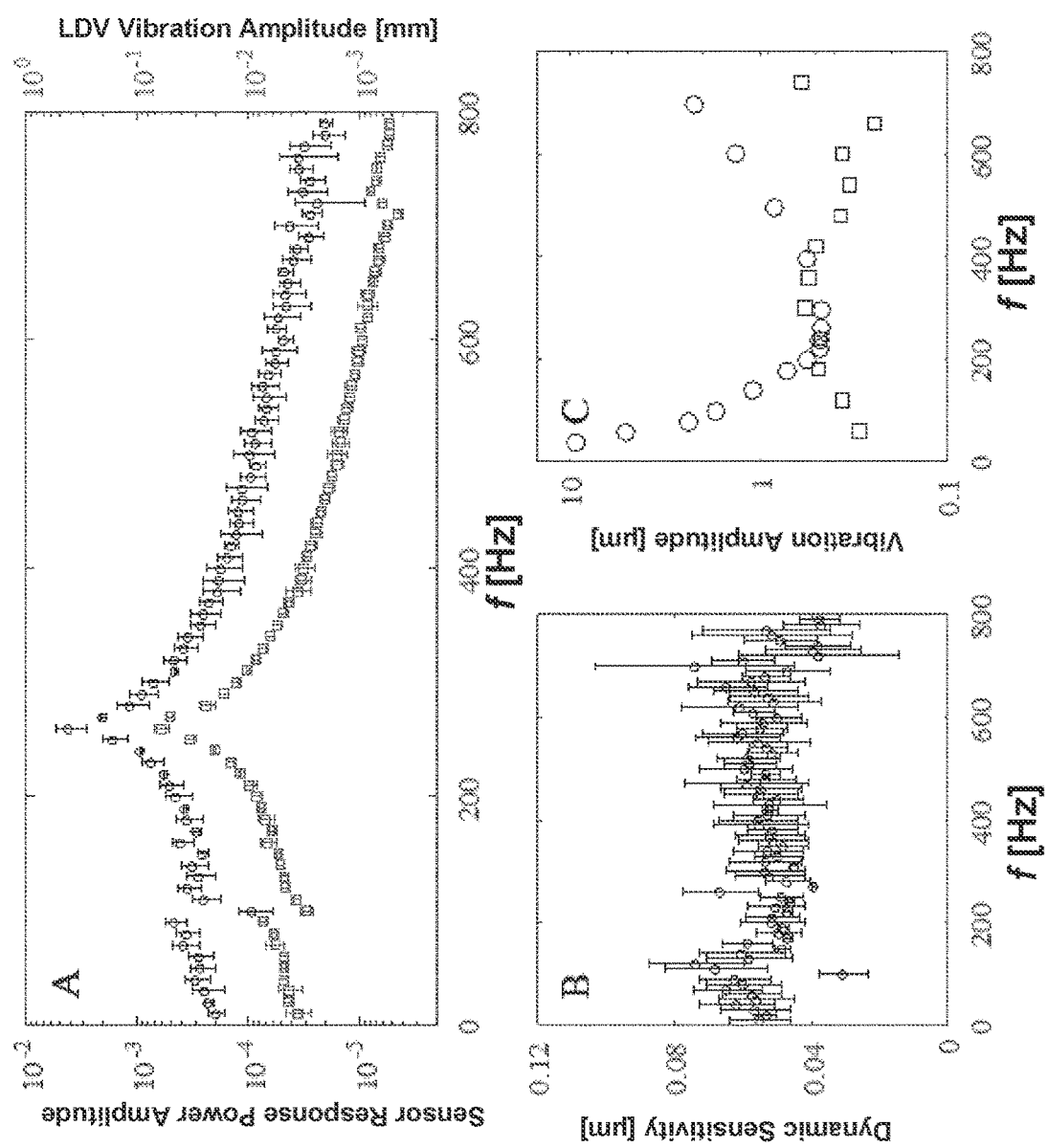
FIG. 24 shows the normalized shear response power magnitude and laser Doppler vibrometer vibration amplitude as a function of actuation frequencies, according to an example embodiment.

Increasing number of sensors also resulted in larger number of lead wires. There are 12 sensors in the example shown in FIGS. 4-5, and 24 reservoirs that require lead wire connection in this design. To increase robustness of the electrical connection originating from the reservoirs, 32 gauge flexible multi-strand lead wires may be used to connect reservoirs to external electrical equipment. FIG. 6 shows the custom printed circuit board (PCB) located at the nail bed used to receive electrical connections from the reservoirs, connect all resistors in serial and relay the signal to data aquisition devices via multiple conductor cable. Twenty four lead wires are fed into the board via terminal blocks. The board completes serial connection of all resistive taxels and output. A 14-conductor ribbon cable with 0.64 mm pitch is selected to relay sensor signal for its flexibility and compact size. DC current of 5 mA is applied to the PCB and all resistors, and the DAQ system measures the voltage difference across each of all 12 resistors. FIG. 7 shows the PCB board schematics.

In one example, the sensor device 200 is part of a sensor system that includes the sensor device 200 and the rigid curved surface 238. In such an example, the sensor device includes all of the features described above. The rigid curved surface 238 is coupled to the substrate 202 such that each of the first tab 206, the second tab 208, the third tab 210, and the fourth tab 212 are non-coplanar with the contact portion 204, as shown in FIG. 5. The sensor system is configured such that a force applied to the contact portion 204 of the substrate 202 will be sensed by each of the sensors due to a movement of the substrate with respect to the rigid curved surface.

C. EXAMPLES OF METHODS

Figure 8:
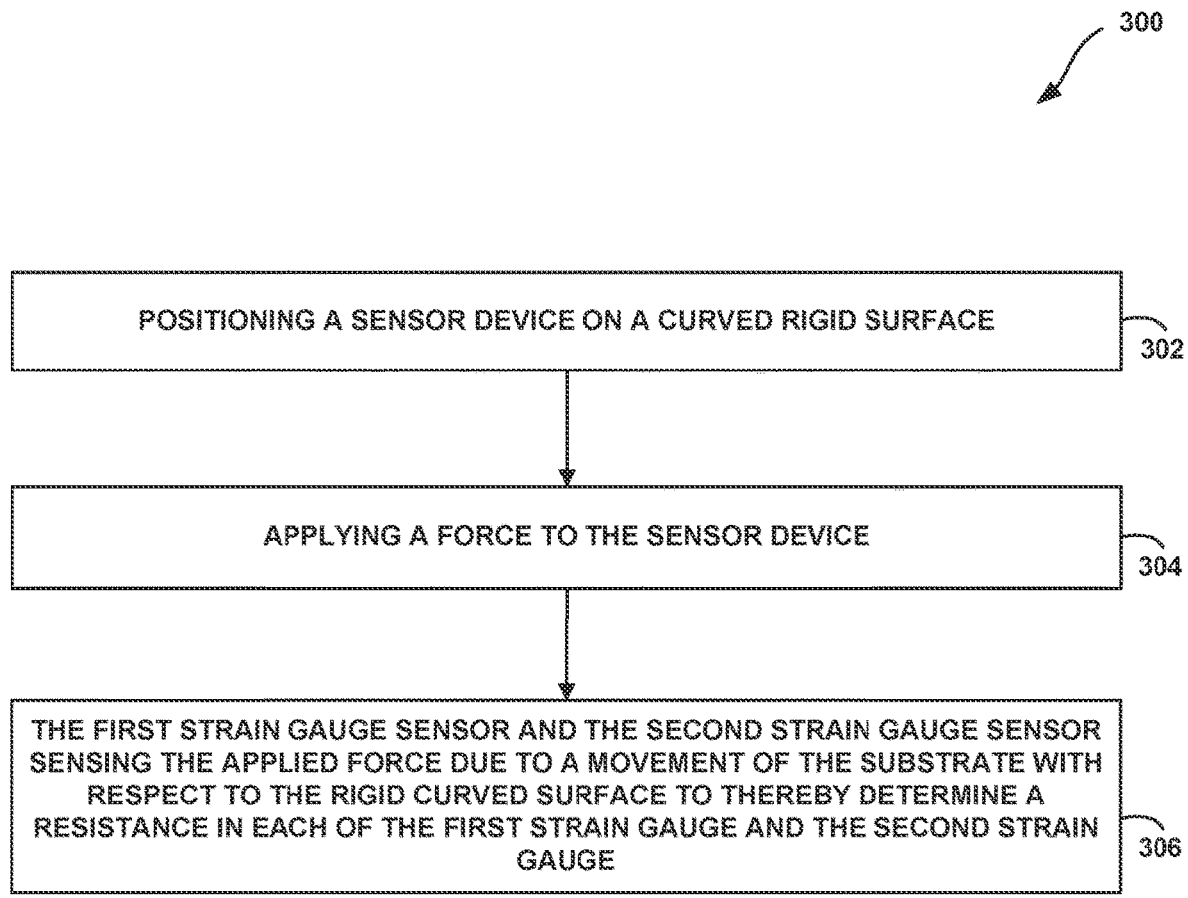
FIG. 8 is simplified flow chart illustrating a method, according to an example embodiment.

FIG. 8 is a simplified flow chart illustrating method 300 for detecting a force on a rigid curved surface. Although the blocks in FIG. 8 are illustrated in a sequential order, these blocks may also be performed in parallel, and/or in a different order than those described herein. Also, the various blocks may be combined into fewer blocks, divided into additional blocks, and/or removed based upon the desired implementation.

Further, while the methods described herein are described by way of example as being carried out by a wearable computing device, it should be understood that an exemplary method or a portion thereof may be carried out by another entity or combination of entities, without departing from the scope of the invention.

In addition, the flowchart of FIG. 8 shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer-readable medium, for example, such as a storage device including a disk or hard drive. The computer-readable medium may include non-transitory computer-readable medium, for example, such as computer-readable media that stores data for short periods of time like register memory, processor cache and Random Access Memory (RAM). The computer-readable medium may also include non-transitory media, such as secondary or persistent long term storage, like read only memory (ROM), optical or magnetic disks, compact-disc read only memory (CD-ROM), for example. The computer-readable media may also be any other volatile or non-volatile storage systems. The computer-readable medium may be considered a computer-readable storage medium, for example, or a tangible storage device.

For the sake of example, one or more steps of the method 300 shown in FIG. 8 will be described as implemented by a computing device. It should be understood that other entities, such as one or more servers, can implement one or more steps of the example method 300.

At block 302, the method 300 includes positioning the sensor device 100, 200 of any one of the embodiments described above on a rigid curved surface. As discussed above, the sensor device may be positioned on the rigid curved surface in a variety of ways. In one example, the sensor device includes one or more mounting portions used to couple the sensor device to the rigid curved surface, as discussed above. The mounting portion(s) of the sensor device may be configured to receiving a fastening mechanism to thereby secure the sensor device to the rigid curved surface. The sensor device may be permanently or temporarily positioned on the rigid curved surface.

At block 304, the method 300 includes applying the force to the sensor device. The force applied to the sensor device may comprise a shear force, or a vibrational force as examples. At block 306, the method 300 includes the first strain gauge sensor and the second strain gauge sensor sensing the applied force due to a movement of the substrate with respect to the rigid curved surface to thereby determine a resistance in each of the first strain gauge and the second strain gauge. In the example where the force applied to the sensor device comprises a shear force, a difference between the determined resistance in the first strain gauge sensor and the determined resistance in the second strain gauge sensor is used to determine the shear force applied to the contact portion of the sensor device.

As discussed above, the rigid curved surface may comprise an end effector of a robotic device. In such an example, the determined shear force may be used as an input to cause the robotic device to perform one or more functions. For example, if the determined shear force exceeds a threshold value, the robotic device may determine that an object that is being held by the robotic device is slipping from its grasp. In response, the robotic device may set the object down. In another example, if the determined shear force exceeds a threshold value, the robotic device may use a second end effector to support the object the robotic device is holding. In yet another example, if the determined shear force exceeds a threshold value, the robotic device may increase a squeeze force to better secure the object in its grasp. Other functions are possible as well.

D. EXPERIMENTAL EXAMPLES

Example 1—Numerical Simulation of Shear Sensor Skin

Steady, two-dimensional finite element solid mechanics models with linear elasticity to predict the sensor response to various normal and shear force loading conditions were developed. These models were used to determine the appropriate placement of the strain gauges to obtain linear, high sensitivity sensor response that is independent of the applied normal force. The model was composed of two domains: one for the rigid fingertip core and one for the PDMS artificial skin. Young's modulus and Poisson's ratio of the fingertip were set to be 3.2 GPa and 0.3, respectively, in order to represent a rigid plastic material such as acrylic. An assumption was made that the PDMS skin was uniformly linear elastic and incompressible with a Young's modulus of 1.292 MPa and a Poisson's ratio of 0.5 (0.49 to avoid numerical difficulties).

Figure 9:
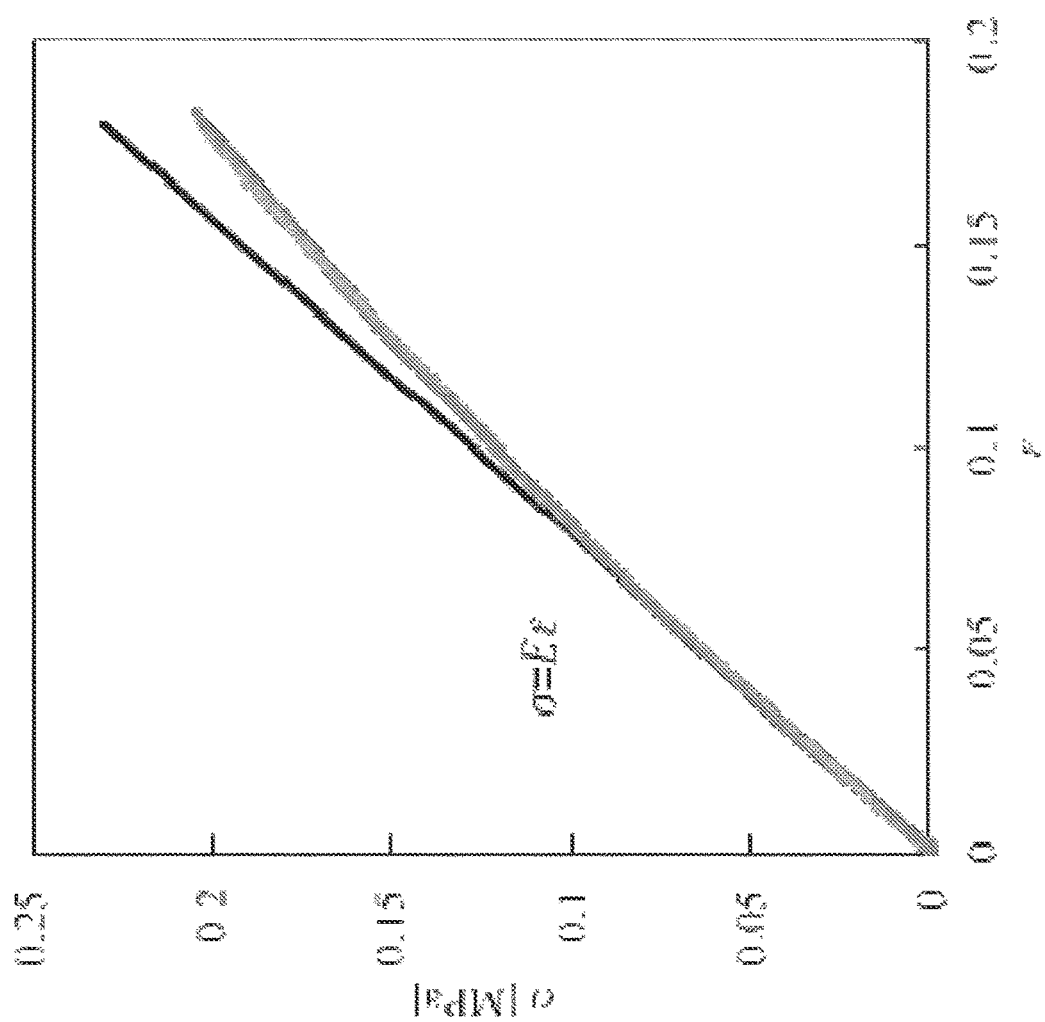
FIG. 9 is a graph showing the stress-strain relationship for strains under 20% for seven independent tensile tests on two specimens, according to an example embodiment.

The mechanical properties of the PDMS material were determined experimentally by an electromechanical universal test machine. We prepared PDMS in the same way as in the device fabrication. The specimens were formed into a type C dogbone in accordance with the ASTM D412 standard. FIG. 9 shows the stress-strain relationship for strains under 20% for seven independent tensile tests on two specimens. The Young's modulus of the PDMS was found to be 1.29 MPa through linear regression of the stress-strain curve for strains under 5%. It was in close proximity with 1.53 MPa reported by Schneider et al., who measured the same PDMS product for five samples. The difference in measured stiffness is likely due to the fact that our PDMS samples were cured at a lower temperature than that used by Schneider et al. It is known that the stiffness of the PDMS increases at higher curing temperatures.

Linear elasticity was used to describe the stress-strain relation at the strain levels considered in the model. Throughout the modelling study, the maximum strain level was 9% and the true stress deviated from the linear estimation by less than 5.5%. A hyperelastic model, such as Mooney-Rivlin, would be more accurate for describing strain softening at high loads; however, linear elasticity at lower loads is sufficient to validate the design and provide general guidelines for selecting sensor parameters such as spatial location, gauge size, channel dimension, etc.

We assumed that the strain gauges would not alter the PDMS material stiffness. The boundaries where the artificial skin was fastened to the fingernail were specified as fixed. The boundaries between the rigid fingertip and flexible PDMS skin were designated as non-penetrable contact. The skin can slide relative to the fingertip with a static Coulomb friction coefficient of 0.04 that was determined from experiments where a strip of PDMS was pulled horizontally until slip occurred relative to a lubricated acrylic surface. The normal force was actuated by a known weight, and the horizontal friction force was recorded by a 6-axis force/torque transducer. A linear regression analysis was performed and the slope, representing the static coefficient of friction, was estimated to be 0.04 from three independent trials. The nonzero y-intercept of the linear regression line was attributed to surface adhesion and was modeled in the numerical simulation accordingly.

The contact between the skin and stimulus (object contacting the fingertip) was not considered because, according to Saint-Venant's Principle, the sensor response is equivalent to that of a uniform boundary load at the contact location as long as the contact is sufficiently far from the sensor location. Since the friction force between the skin and rigid fingertip is path-dependent, the loads in both normal and shear direction in the model were applied in the same order as the experiments. The normal force is first applied and shear force increases from zero to the value of normal force in 0.1 N increments. Four cases were examined where normal forces are 0.5 N, 1 N, 1.5 N, and 2 N.

The rigid fingertip core was meshed with free triangular elements and the PDMS skin with mapped quadrilateral mesh elements. The maximum element size in the skin domain was set at 0.14 mm. The total number of elements was 1648 and minimum quality was 0.85 [120]-[122]. Further mesh refinement did not alter the results, suggesting that the mesh was sufficiently resolved. In post-processing, the strain in the circumferential direction was evaluated to strategically place the strain gauges in the location that yielded linear response, largest sensitivity, and independence to applied normal force at the bottom of the fingertip. The normalized sensor response was defined as, $$\widetilde{\Delta R} = \Delta R_1/R_{1,0} - \Delta R_2/R_{2,0} = F(\varepsilon_1 - \varepsilon_2),$$

where $R_{1,0}$ and $R_{2,0}$ are radial and ulnar strain gauge resistances when there is zero load, $\Delta R_1$ and $\Delta R_2$ are changes of resistances with respect to $R_{1,0}$ and $R_{2,0}$, respectively, and $\varepsilon_1$ and $\varepsilon_2$ are surface averaged tangential strain at the strain gauge locations, respectively. The normalized sensor response was calculated and plotted against shear force at different normal force levels.

Figure 11:
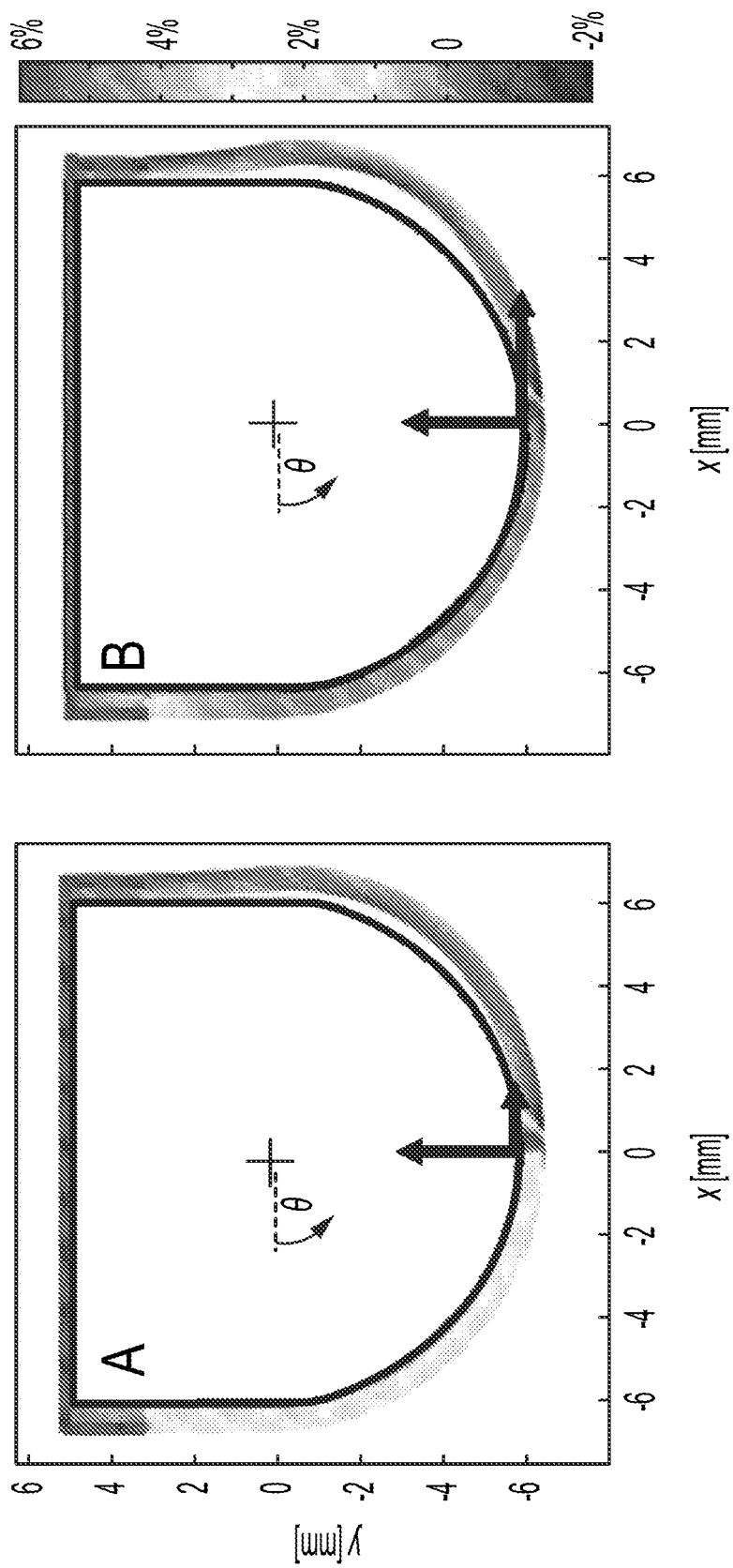
FIG. 11 shows the strain distribution contour with a 1 N normal force and shear forces 0.5 and 1 N, according to an example embodiment.

The simulation results are drawn from cases with four normal forces: 0.5 N, 1 N, 1.5 N and 2 N. In each case, the normal force is applied first and shear force increases from zero in increment of 0.1 N. FIG. 11 shows the strain distribution contour with a 1 N normal force and shear forces 0.5 and 1 N. In each case, the normal force was applied first and then the shear force was increased from zero in increments of 0.1 N. In both cases, a circumferential tensile strain develops on the tail-side of the shear force vector (−x direction in FIG. 1) while a circumferential compressive strain develops on the head-side of the shear force vector (+x direction in FIG. 1). The magnitude of tensile strain is larger than that of compressive strain due to buckling of the compressed region of the sensor skin. The stretching and compression of the sensor skin is asymmetric, resulting in an overall increase in skin length that results in a separation of the sensor from the rigid core, which is analogous to a bulging finger pad under significant shear stress. A large magnitude tensile strain forms at the location that the normal force is applied (0,−6.35) due to Poisson's effect.

Figure 12:
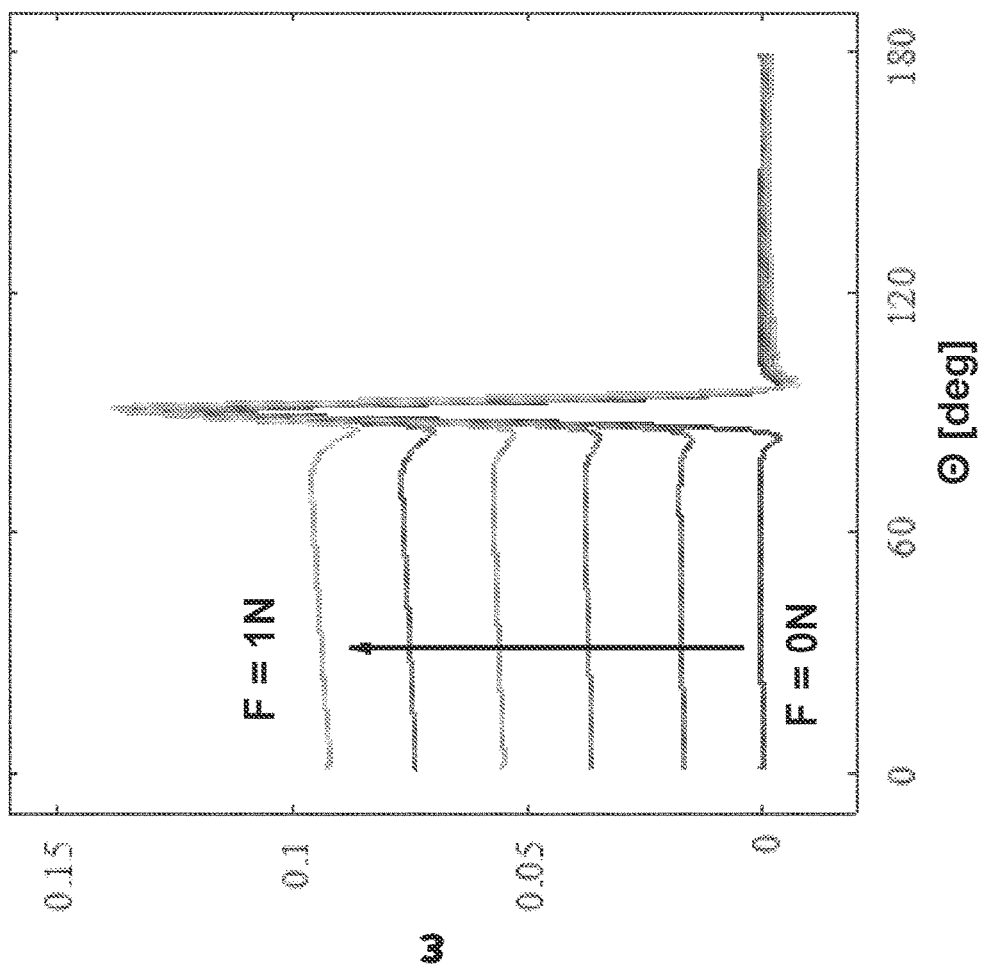
FIG. 12 shows the circumferential strain as a function of angular position at a normal force of 1 N and shear force ranging from 0 to 1 N, according to an example embodiment.

FIG. 12 shows the circumferential strain, $\varepsilon_{\theta\theta}$, as a function of angular position at a normal force of 1 N and shear force ranging from 0 to 1 N. When there is only a normal force, the circumferential strain is nonzero only at the point of contact ($\theta=90$) due to the Poisson's effect. When a shear force is applied, relatively constant tensile and compressive strains develop on the tail- ($\theta<90°$) and head-side ($\theta>90°$) on the respective sides of the shear force vector. The circumferential strain is near zero on the compressive side $\theta>90$. Circumferential strain in the tensile region ($\theta<90°$) is a strong function of shear force yet a weak function of angular position (<4%). According to the classical belt friction problem, the circumferential strain should decrease from the point of contact to the proximity of the fixed boundary due to friction; however, with the static friction coefficient of 0.04, there is no significant variation with position. This suggests that the sensors could be positioned anywhere along the sensor skin, without sacrificing sensitivity, as long as they are sufficiently far from the point of contact with physical objects where they might be influenced by Poisson's effect. Placing the sensors near the nail bed reduces the probability of the sensors being subjected to interference from normal forces and makes room for other sensor modalities, such as normal force or temperature, which might benefit from close proximity to the point of contact.

Figure 10:
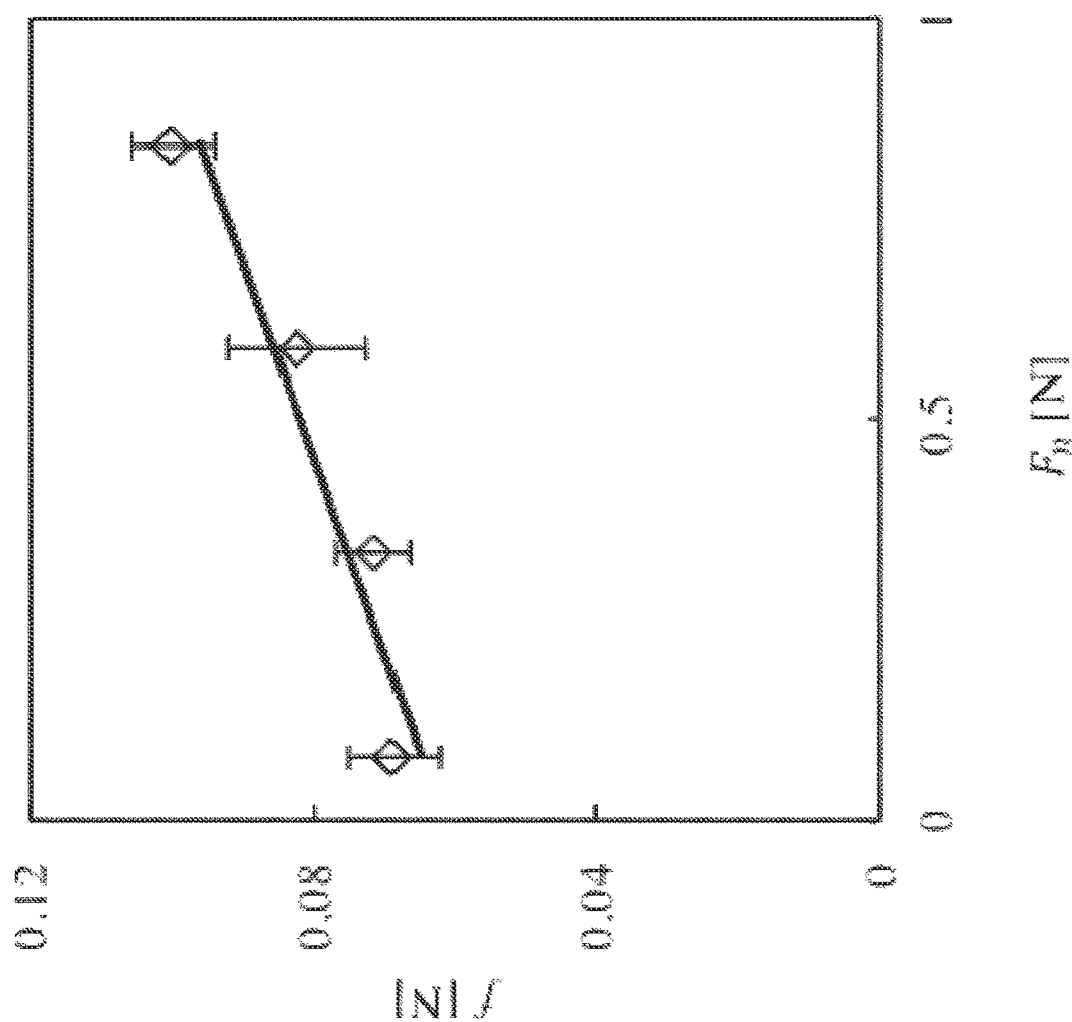
FIG. 10 is a graph showing the circumferential strain at the location of the strain gauge, according to an example embodiment.

The shear sensor skin sensitivity can be estimated using a simple analytical model with a few assumptions to validate the numerical simulation results. Considering the skin with uniform cross section, negligible friction with underlying finger core, uniform strain distribution across z direction as indicated in FIG. 10, the circumferential strain at the location of the strain gauge can be simply represented as $F_t/EA$, where $F_t$ is the applied shear force at the fingerpad, E is Young's modulus of the PDMS, A is the cross section area. The normalized sensor response is $(F_t \cdot F)/(EA)$ where F is the gauge factor. The sensitivity is then $$F/(EA)=0.088\ N^{-1}.$$

Figure 13:
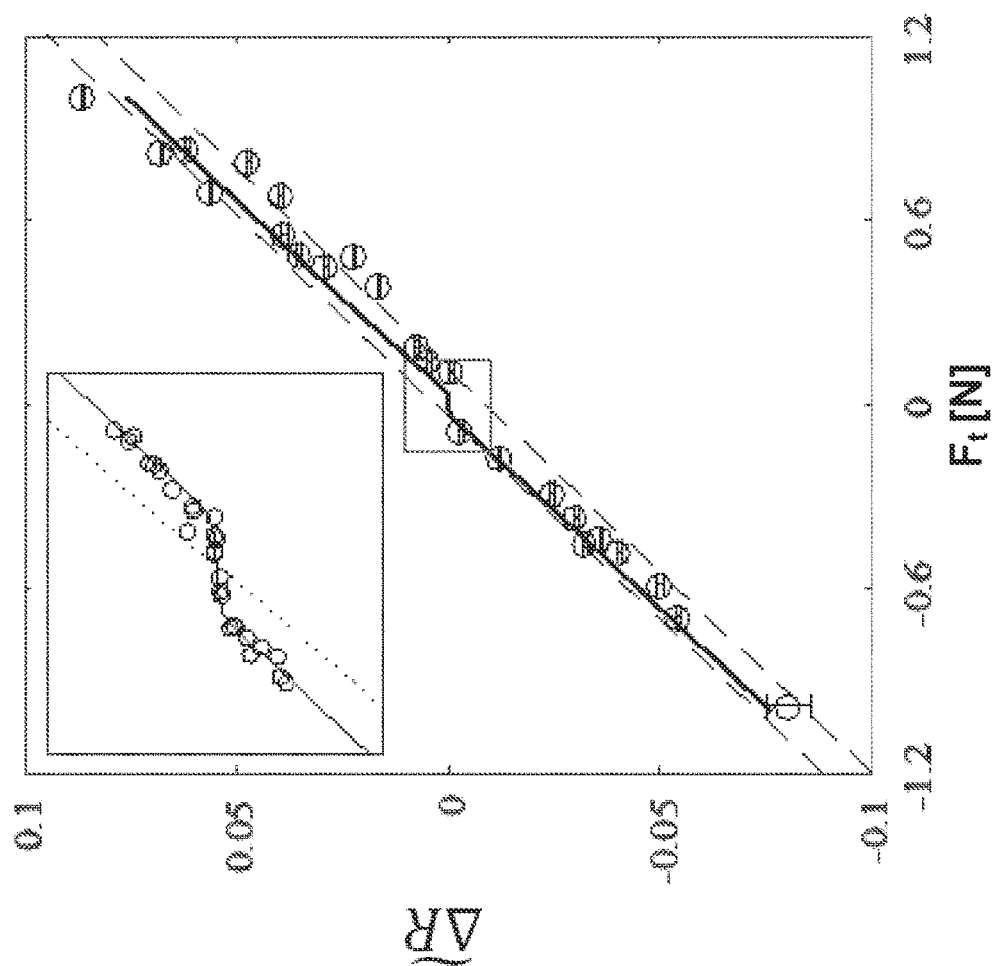
FIG. 13 shows the predicted normalized sensor response as a function of the applied shear force for 1 N of normal force, according to an example embodiment.
Figure 14:
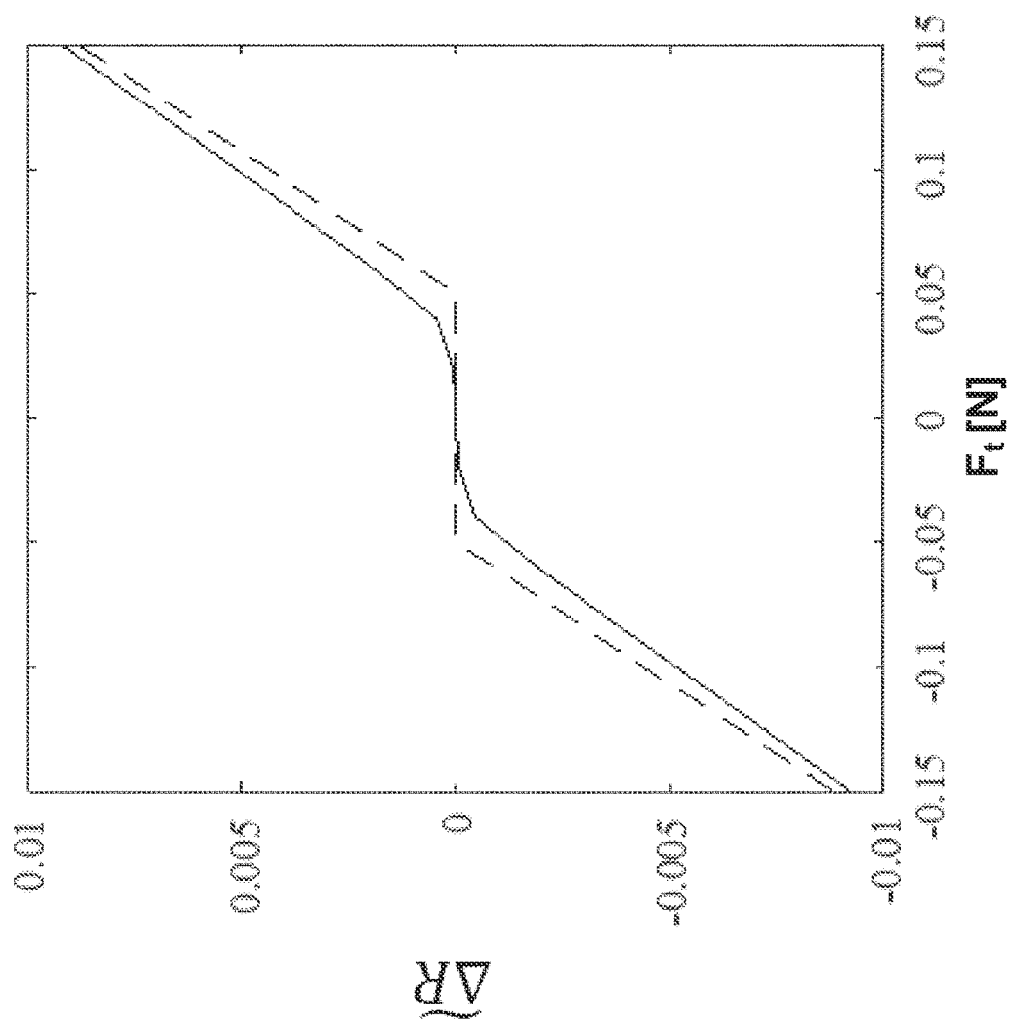
FIG. 14 shows an analytical prediction of a normalized sensor response as a function of the applied shear force for 1 N of normal force, according to an example embodiment.

FIG. 13 shows the predicted normalized sensor response, $\widetilde{\Delta R}$, as a function of the applied shear force for 1 N of normal force. The simulations show that the sensor response is linear with applied shear force over most of the small shear forces examined here. The inset of FIG. 13 shows the predicted normalized sensor response as a function of the applied shear force over a smaller range of shear forces (<0.15 N) to elucidate the sensor deadband due to the friction between the sensor skin and the rigid core. The sensor response remains at zero before the shear force overcomes the static friction force and the skin is free to slip against the rigid core, thus the deadband region increases with the normal force. At moderate normal forces of 1 N and friction coefficient as 0.04, prediction was made that the minimum shear force measurement to be the product of two quantities as 0.04 N and similar threshold of 0.05 N is determined from experiments. The simulation is further compared with simple analytical predictions in FIG. 14, showing good agreement of the deadband prediction as well as the sensitivity at high shear forces.

The slope of normalized sensor response with respect to the applied shear force throughout the working range is defined as the sensitivity. Table 1 shows that the predicted sensitivity for several applied normal forces ranging from 0.5 N to 2 N is 7.8%/N. The predicted sensitivity does not change with the applied normal force, suggesting that the response of the shear sensor, in the light touch regime, is independent of the applied normal force. This is advantageous because the shear force can be resolved without knowledge of the normal force.

TABLE 1

| Normal force [N] | Sensitivity [$N^{-1}$] | |
| --- | --- | --- |
| | Computation | Experiment |
| 0.5 | 0.078 | 0.078 |
| 1.0 | 0.078 | 0.076 |
| 1.5 | 0.078 | 0.080 |
| 2.0 | 0.078 | 0.080 |
| Average | 0.078 | 0.078 |

Example 2—Static and Dynamic Characterization of a First Sensor Device

Static Characterization

The shear sensor was mounted on a three-dimensional linear stage to evaluate its performance under controlled normal and shear force loading, as shown in FIG. 15. Three manual linear stages were assembled with right angle brackets to form three translational degrees of freedom, and were then fixed to an optical breadboard. The stages were actuated manually with adjustment screws and Vernier micrometers. A rotational stage was incorporated to enable fine-tuning of the direction of force loads and ensure that shear force loads were parallel to the fingertip surface tangent. Two acrylic plates were used to fasten the artificial skin to the radial and ulnar aspects of an artificial fingertip that was fabricated from an acrylic half-round with length of 20 mm and diameter of 12 mm. The fingertip was rigidly attached to the stage. The copper wires originating from the sensor reservoirs were soldered to 8 mm by 8 mm copper pads that were placed beside the plastic fingertip, adjacent to the sensor reservoirs. The copper pads provide stress relief for attachment to the external electronic equipment.

The interface between the PDMS film and acrylic half-round was lubricated by gear oil. A force/torque (F/T) transducer was mounted above the sensor to provide an independent measure of the forces applied to the sensor skin. The force transducer was attached to a loading tip that consisted of a 14 mm diameter cylindrical acrylic plate. The stage supporting the sensor skin was manually actuated to displace the sensorized fingertip relative to the force loading tip. Normal and shear force profiles were simultaneously measured by the sensor skin and force transducer.

FIG. 15 shows the external electrical equipment. The two sensor strain gauges were connected in series with a source meter applying 5 mA DC current. According to a simple convection analysis, Joule heating should not result in an increase of temperature of more than 5° C. The voltages were measured across each strain gauge using a low frequency data acquisition card at 10 Hz for static characterization or a high frequency data acquisition card for dynamic tests of stepwise unloading and vibration. Customized LabView program collects the voltages and displays the sensor resistance response.

Figure 16:
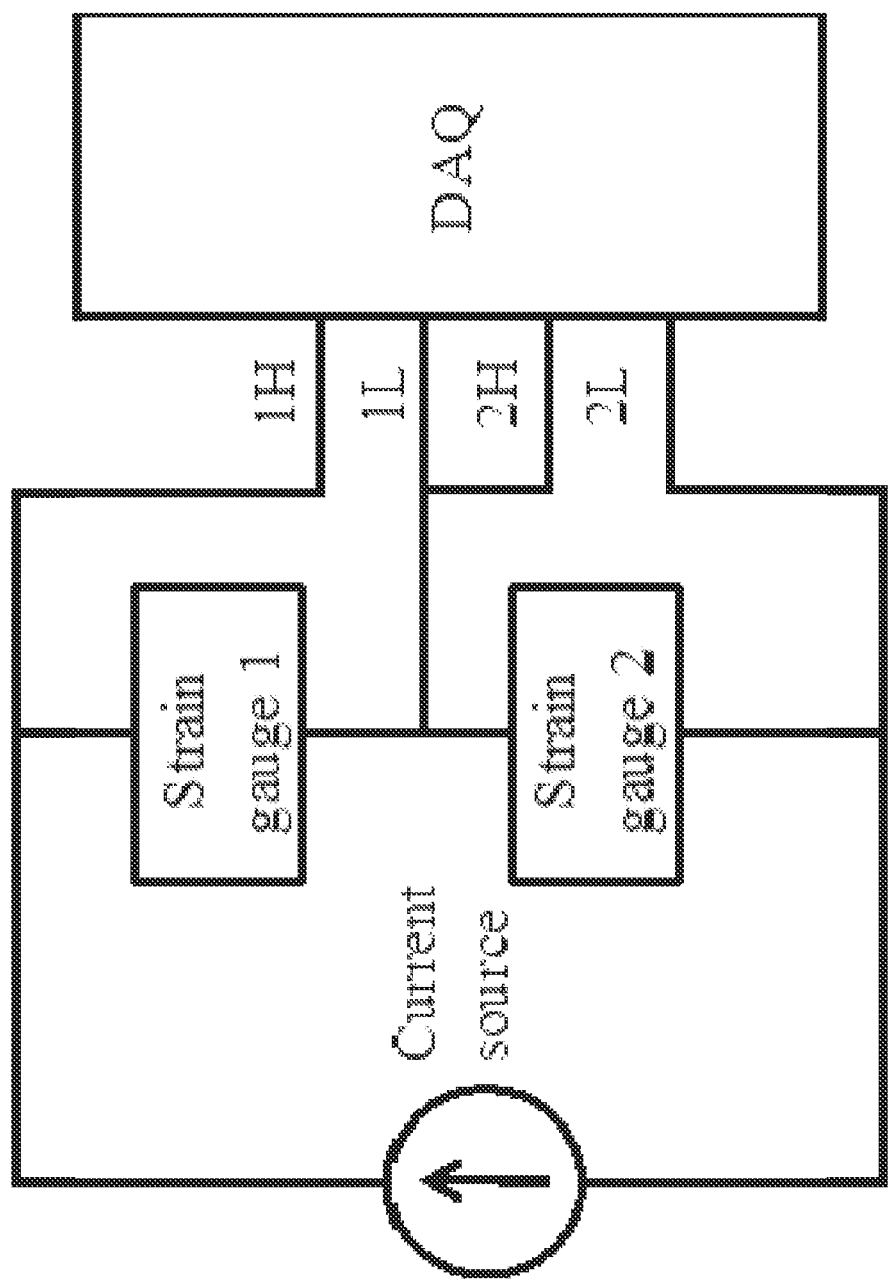
FIG. 16 illustrates the circuit diagram of the data acquisition system used to collect the strain gauges' response, according to an example embodiment.

FIG. 16 shows the circuit diagram of the data acquisition system used to collect the strain gauges' response. The two strain gauges in the shear sensor skin are connected in series and a constant current is applied from a current source. The voltages across each strain gauge are measured by a DAQ device using differential input. Wires from gauge 1 are fed to the corresponding high end (1H) and low end (1 L) of the first DAQ channel, and those from gauge 2 to the second channel (2H and 2 L). The strain gauge resistances are calculated using the measured voltages and the known current using Ohm's Law.

In the static characterization experiments, normal force was applied by moving the stage vertically and then stepwise increased shear forces (0.1 N increments) by moving the stage horizontally. Each data point was averaged over 1 second. The resistances without load were measured before each loading scenario for normalization during that loading scenario only using the equation on page 24. Dynamic measurements of impulse unloading, incipient slip, and vibration were also taken.

Figure 17:
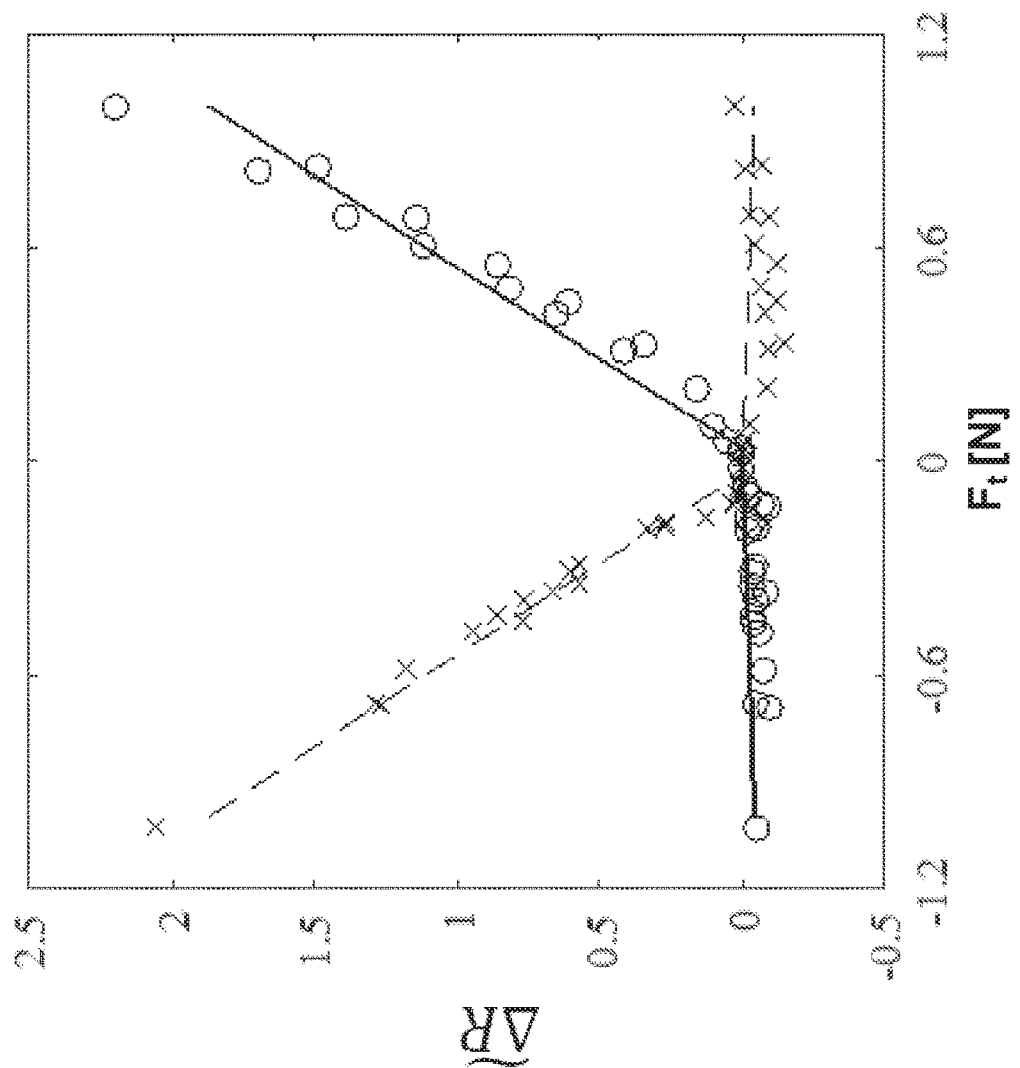
FIG. 17 shows measurements of the normalized sensor response as a function of the shear force with a 1 N normal force, according to an example embodiment.

FIG. 17 shows measurements of the normalized sensor response as a function of the shear force with a 1 N normal force. The measurements agree well with the predicted response with average deviations less than 8%. The sensor's response is repeatable with repetitive shear force up to 5 N and starts to respond at 0.04 N as predicted, with 1 N applied normal force due to static friction. The simulations show that the minimum shear force is required to overcome static friction and exhibit a linear response to applied shear force depending on the friction coefficient and applied normal force. The noise floor was defined as the standard deviation of the normalized sensor response over a 1 s measurement interval at a constant shear force value. Using this definition, the average noise floor is 1.6 mN, which results in a dynamic range (with a maximum of 5 N) of more than 10-bits. The sensor was subjected to various normal forces with no applied shear force, which should not result in any measured shear force if the sensor is properly decoupled, and show that the sensor reports a normalized sensor response of less than 1.24E-4 (or 1.45 mN), which is less than the noise floor. The drift of the sensor is evaluated by the standard deviation of the sensor response to a constant shear force load over time. The sensor was loaded with $F_n$=0.5 N and $F_t$=0.15N for 1 hr and data were collected at 0.01 Hz. The standard deviation of the normalized sensor response is 1.48E-4 (or 1.73 mN). The precision of the shear sensor skin is characterized by a prediction interval that was calculated to be ±0.0802 N at 95% confidence. The prediction interval is derived from the linear regression analysis as the range in which a future measurement might fall at a certain confidence level. It reflects the confidence in the resolved shear force and the static calibration and is determined by, $$\pm t_{\frac{\alpha}{2}, n-2} S_{yx} \sqrt{1 + \frac{1}{n} + \frac{(x_{n+1} - \bar{x})^2}{\sum (x_i - \bar{x})}},$$

where x and y are $\widetilde{\Delta R}$ and $F_t$ respectively, $t_{\alpha/2, n-2}$ is the t value that corresponds to a confidence level of (1-α) with n-2 degrees of freedom, n is the number of data points, and $S_{yx}$ is the standard error of the estimate.

FIG. 17 shows that the data points are scattered while the error bar is much small than the marker itself. Such discrepancy between resolution and accuracy is usually referred to as hysteresis among resistive based devices. The accuracy of the sensor describes the variation of sensor response among independent trials and reflects the confidence of the resolved shear force. It is derived from the prediction interval calculated from the linear regression analysis of the static characterization. The prediction interval is determined to be 0.04 N at confidence level of 68% and 0.08 N at 95%.

The responses of two strain gauges are presented separately as a function of shear force as the change of their resistance ΔR being either $R_1$-$R_{1,0}$ or $R_2$-$R_{2,0}$ with respect to resistances with zero load indicated by the subscript 0. FIG. 17 shows a plot of change of resistance versus shear force experimentally (markers) and computationally (lines) to both positive and negative, x-direction shear forces (respective to FIG. 1). When shear force is in the positive x-direction, the strain gauge on the tail-side of the shear force vector is in tension and presents strong linear relationship. The strain gauge on the head-side of the shear force vector is in compression and experiences negligible strain magnitude due to buckling. Such behavior is observed in both simulation and experiments. These results show that the strain sensor that is in tension generates nearly all the normalized signal response as it is defined as $\widetilde{\Delta R} = \Delta R_1/R_{1,0} - R_2/R_{2,0}$. The part of skin under compression buckles and results in negligible strain.

Figure 18:
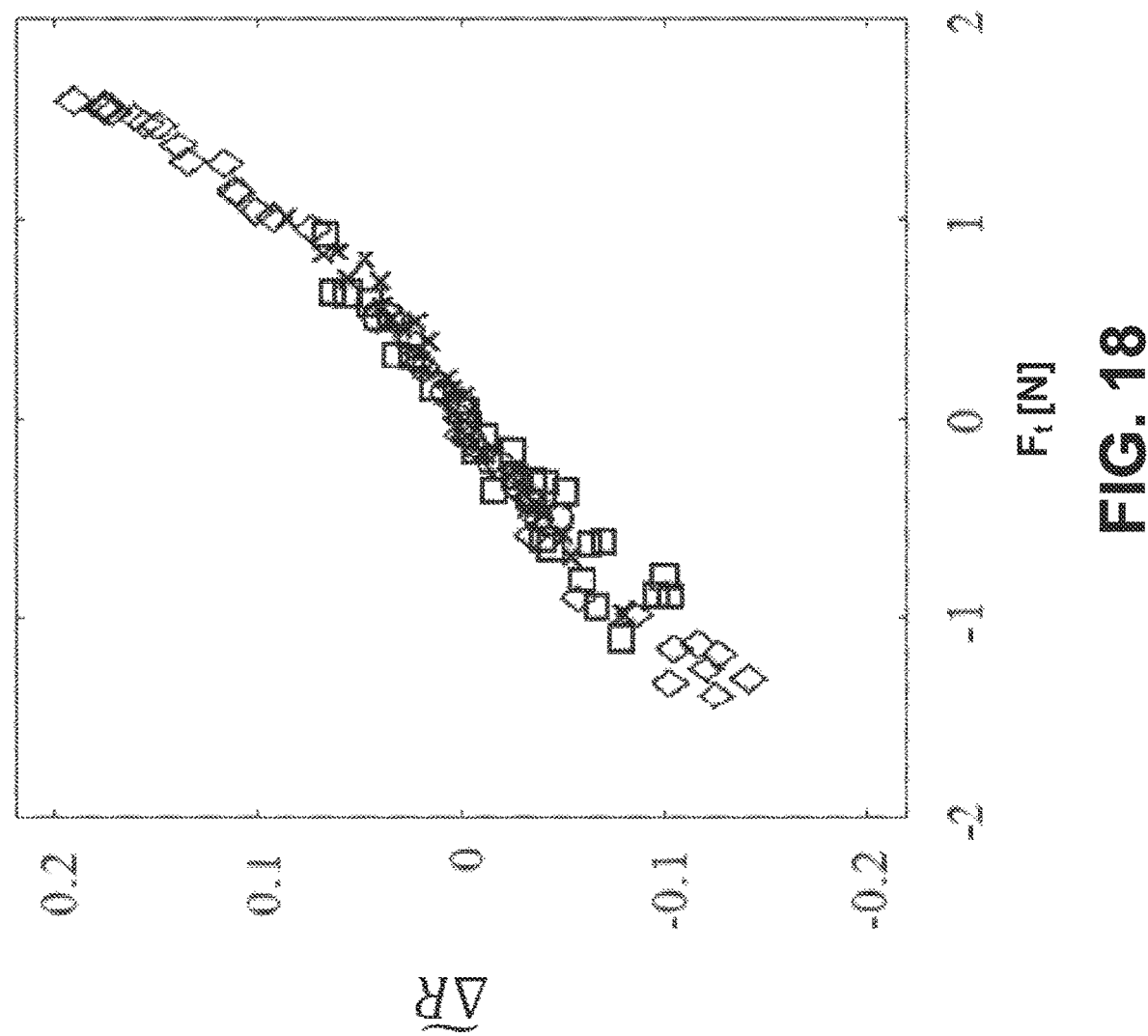
FIG. 18 shows the normalized sensor response as a function of the shear force for different applied normal forces, according to an example embodiment.

FIG. 18 shows the normalized sensor response as a function of the shear force for different applied normal forces. This setup was executed over a larger range of shear forces (±1.6 N) than is shown in FIG. 17 and exhibits a nonlinear response at higher shear forces. At shear forces greater than 1.2 N, the slope of the data increases, resulting an increase in the sensor sensitivity. Linear regression over this entire range of applied shear forces results in an error less than 30% at high shear force levels. For simplicity, linear fits were applied to determine the sensitivity for shear force magnitude less than 1.2 N, provided in Table 1. These values agree well with the model predictions within 5%. If desired, a nonlinear fit can be implemented to better represent the sensor response at high shear force levels, as shown below in FIG. 19.

The nonlinearity observed at higher shear forces is due to the nonlinear mechanical properties of PDMS at high strain as well as the stress variation in the out-of-plane dimension (z-direction) becoming non-negligible for larger shear forces. The reduction of PDMS stiffness at high strain partially explains the increase in measured sensitivity at high shear forces. As shown in FIG. 9, PDMS starts to soften at approximately 9% strain, and its deviation from linear elasticity can be as much as 14% at 20% strain. In addition, two-dimensional simulation assumed a line load at the center of the fingerpad (considering a 2D simulation is infinite in the third (z) dimension), whereas in the experiments only part of the skin in the z direction (as defined in FIG. 1) is loaded. Local high strain occurred in the y dimension that the simulation did not take into consideration.

This work is concentrated in the light touch region with small force levels; however, a more comprehensive model for a wider range of forces should likely include a 3D hyperelastic mechanical finite element model to capture the observed increase of sensitivity at high shear and normal forces. The experimental data only shows shear force of up to 1.6 N in the light touch regime; however, the sensor is capable of measuring higher level of shear force. Unlike many capacitive sensors that saturates at some stimulation level, resistive strain gauge sensors continue to respond until mechanical failure. A simple tensile analysis yields that the PDMS artificial skin would break mechanically at 25 N of shear force. During one trial where the sensor is continuously loaded until failure, the last reported resolved shear force is 10 N.

Figure 19:
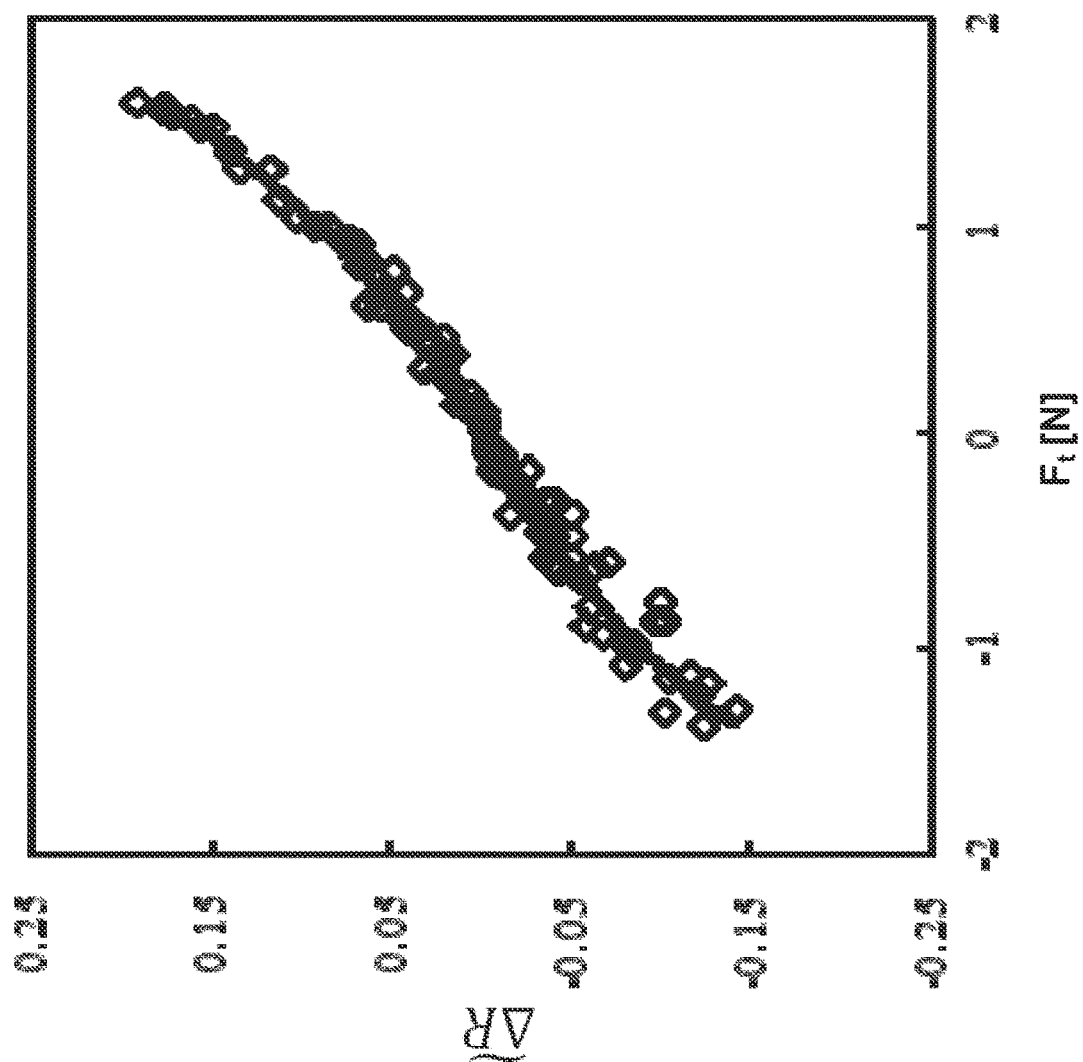
FIG. 19 shows a non-linear fit of the normalized sensor response with respect to shear force at normal force of 0.5 N, 1 N, 1.5 N and 2 N, according to an example embodiment.

An example of non-linear fit of the normalized sensor response with respect to shear force at normal force of 0.5 N, 1 N, 1.5 N and 2 N is presented in FIG. 19. The solid line shows a third order polynomial fit of $\widetilde{\Delta R} = 0.0146 F_t^3 + 0.0009 F_t^2 + 0.0741 F_t$ with a $R^2$ value of 0.981. Using this fit average error reduced to less than 4%.

The above experiments are all performed at room temperature of around 25° C. In order to evaluate the sensor sensitivity variation with respect to temperature, the sensor is calibrated under $F_n = 1$ N at elevated temperature of 40° C. using a heat gun. The temperature was verified by a thermocouple mounted adjacent to the shear sensor skin. FIG. 19 shows normalized sensor response as a function of shear force at both temperatures. The sensor response overlaps and no change of sensitivity can be observed above the data variation. Linear regression showed less than 2% of sensitivity change. The sensor response suggests that the sensitivity is likely weak function of temperature and the calibration does not change within the typical in-hand manipulation environment. The change of resistivity of eGaIn for the 15° C. temperature raise is approximately 1.1%. The apparent strain induced by thermal expansion is governed by PDMS instead of eGaIn because relatively large reservoirs on the ends of the channels accommodate any excessive liquid metal. Linear thermal expansion coefficient of PDMS is $3.2E-4°\ C.^{-1}$, therefore the apparent strain for the 15° C. temperature raise is less than 0.5%. Such variances induced by temperature changes are much less than the uncertainty observed in the experiments.

Figure 20:
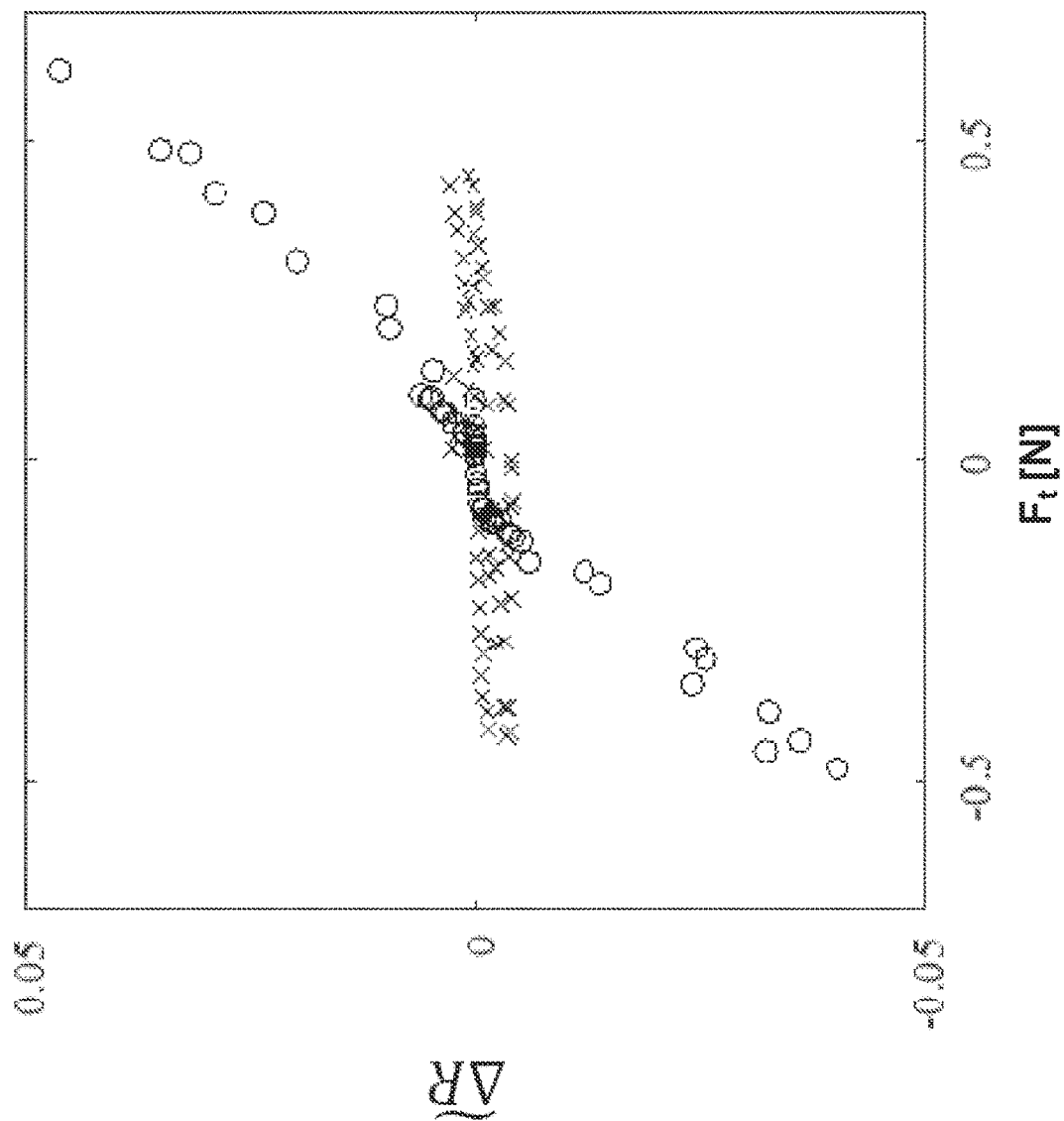
FIG. 20 shows experimental normalized sensor response as a function of the applied shear force, according to an example embodiment.

Experiments with the shear force applied in the distal/proximal direction with 1N of normal force were conducted. FIG. 20 shows experimental normalized sensor response as a function of the applied shear force. The shear sensor skin shows marginal, 0.004 N-1, sensitivity to distal/proximal shear force, which is less than 5% of its sensitivity to radioulnar direction shear force.

Dynamic Characterization

Disclosed herein is a flexible microfluidic shear force sensor skin that is capable of measuring dynamic shear force and vibration. It was confirmed that the sensor skin is able to resolve shear forces in benchtop experiments of stepwise unloading and slip as well as detect vibration for displacements as small as 0.43 μm and frequencies as large as 660 Hz.

Similar to the static characterization section, the shear sensor was mounted on a three-dimensional linear stage to evaluate its performance under controlled normal and shear force, as shown previously for benchtop characterization experiments. Two acrylic plates were used to fasten the artificial skin to the two sides of an artificial fingertip that was fabricated from an acrylic half-round with length of 20 mm and diameter of 12 mm. The fingertip was rigidly attached to the stage. The interface between the PDMS film and acrylic half-round was lubricated by gear oil. A force/torque (F/T) transducer was mounted above the sensor to provide an independent measure of the forces applied to the sensor skin. The force transducer was attached to a loading tip that consists of either a steel bolt with a 4.8 mm diameter tip or a 14 mm diameter cylindrical plate with 120 grit sandpaper. The stage supporting the sensor skin was manually actuated to generate displacement and results in normal and shear force profiles which are simultaneously measured by the sensor skin and force transducer. The gauge voltages across each strain gauge were measured using a low frequency data acquisition card at 10 Hz for incipient slip tests and applications on robotic manipulator. A high frequency data acquisition card at 52 kHz for stepwise unloading and vibration tests was used. The normalized sensor response was defined as, $\widetilde{\Delta R} = \Delta R_1/R_{1,0} - \Delta R_2/R_{2,0}$, where $R_{1,0}$ and $R_{2,0}$ are radial and ulnar strain gauge resistances when there is zero load, $\Delta R_1$ and $\Delta R_2$ are changes of resistances with respect to $R_{1,0}$ and $R_{2,0}$, respectively.

Figure 21:
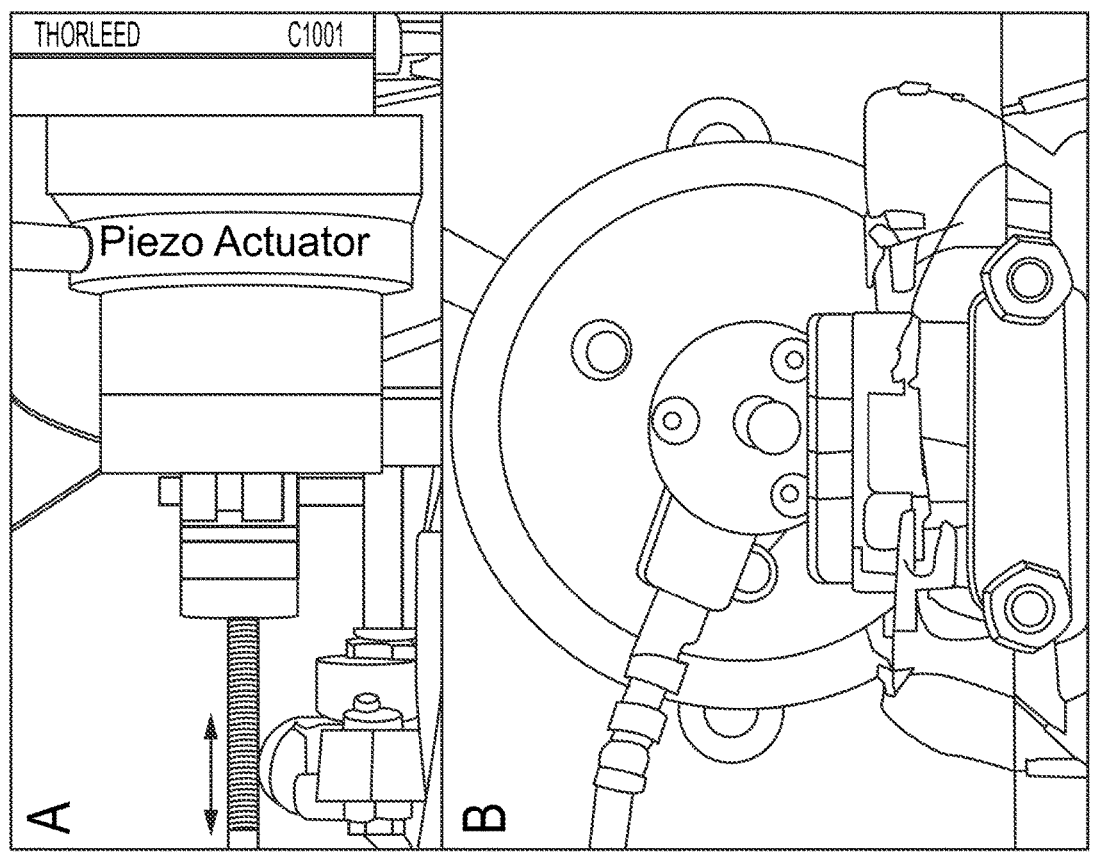
FIG. 21 shows the benchtop controlled vibration test apparatus used in an experiment, according to an example embodiment.

In order to assess the sensor performance with dynamic tactile events, benchtop dynamic measurements were carried out of the sensor output under tactile events of impulse unloading, incipient slip, and controlled vibration. For the impulse unloading, the sensor with a given normal and shear force was first loaded and then abruptly lowered away from the loading tip to generate a rapid unloading event. For the insipient slip tests, the sensor was loaded with prescribed normal force and then we increased lateral stage displacement so that the sensor slips from the load tip and finally loses contact. FIG. 21 shows the benchtop controlled vibration test apparatus. The shear sensing skin with a piezo actuator coupled to a 10-32 stainless steel bolt as the loading tip was actuated A laser Doppler vibrometer measured the vibration amplitude of the loading tip. The displacement and shear sensor response signal power spectrum is calculated by fast Fourier transform (FFT) and the power in the 2 Hz window around the actuation frequency is integrated as the signal power magnitude.

Stepwise Unloading

Figure 22:
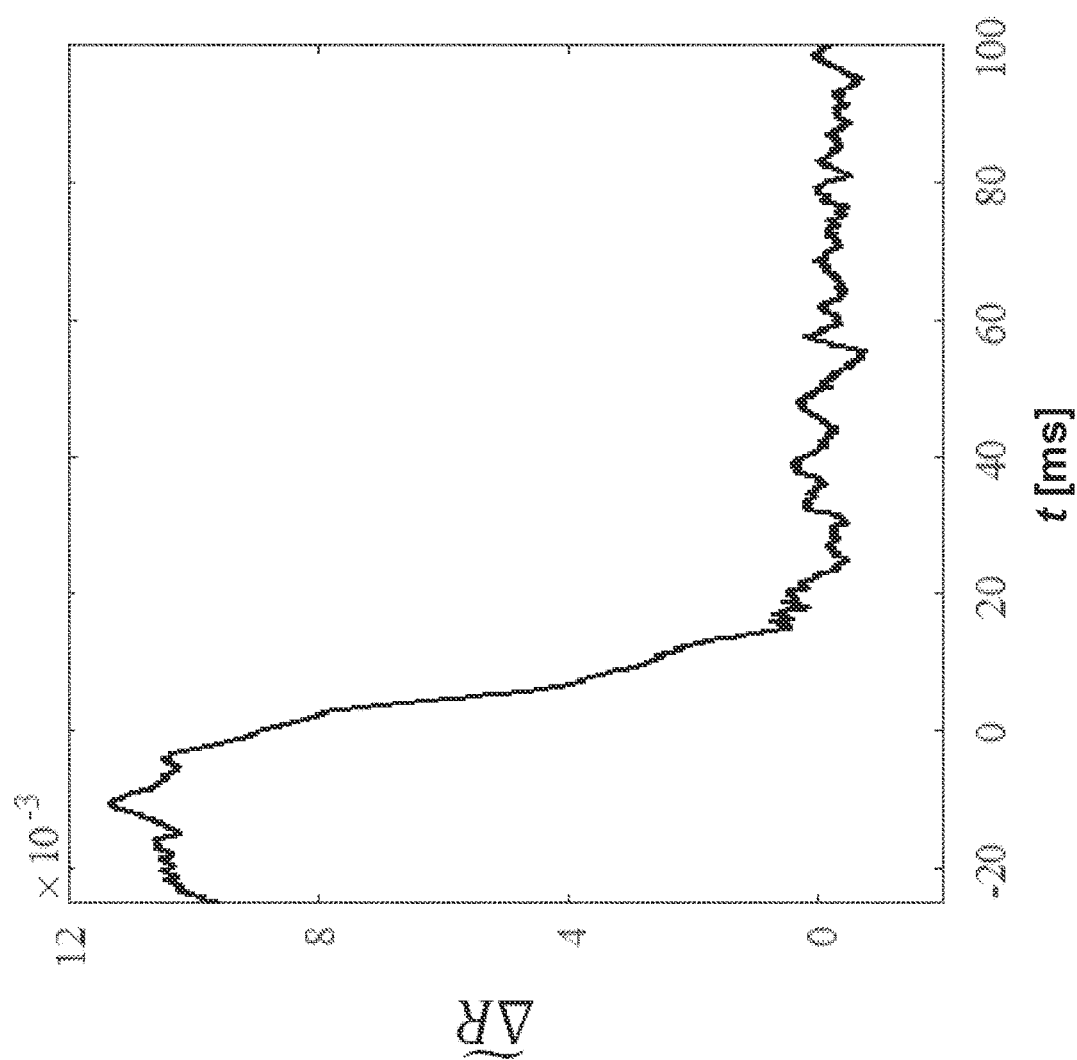
FIG. 22 shows the normalized sensor response as a function of time during an impulse stepwise unloading event, according to an example embodiment.

The stepwise unloading benchtop experiment is conducted by loading the sensor with normal and shear forces and then the sensing skin is suddenly withdrawn, step-wise, from contact with the loading tip. FIG. 22 presents the normalized sensor response as a function of time during an impulse stepwise unloading event. The reported shear force originates at roughly 0.15 N and drops exponentially to zero in less than 20 ms. An exponential decrease is expected considering that the response is an overdamped dynamic system with a stepwise input. An exponential curve was fitted to the response curves of three trials and find an average time scale (inferred from base of the natural logarithm) of 7.1 ms. This data informs that the shear force sensor may be capable of capturing dynamics of up to 70 Hz, which is sufficient to temporally resolve shear force in dynamic applications such as grasp regulation or friction force monitoring.

Incipient Slip Response

Figure 23:
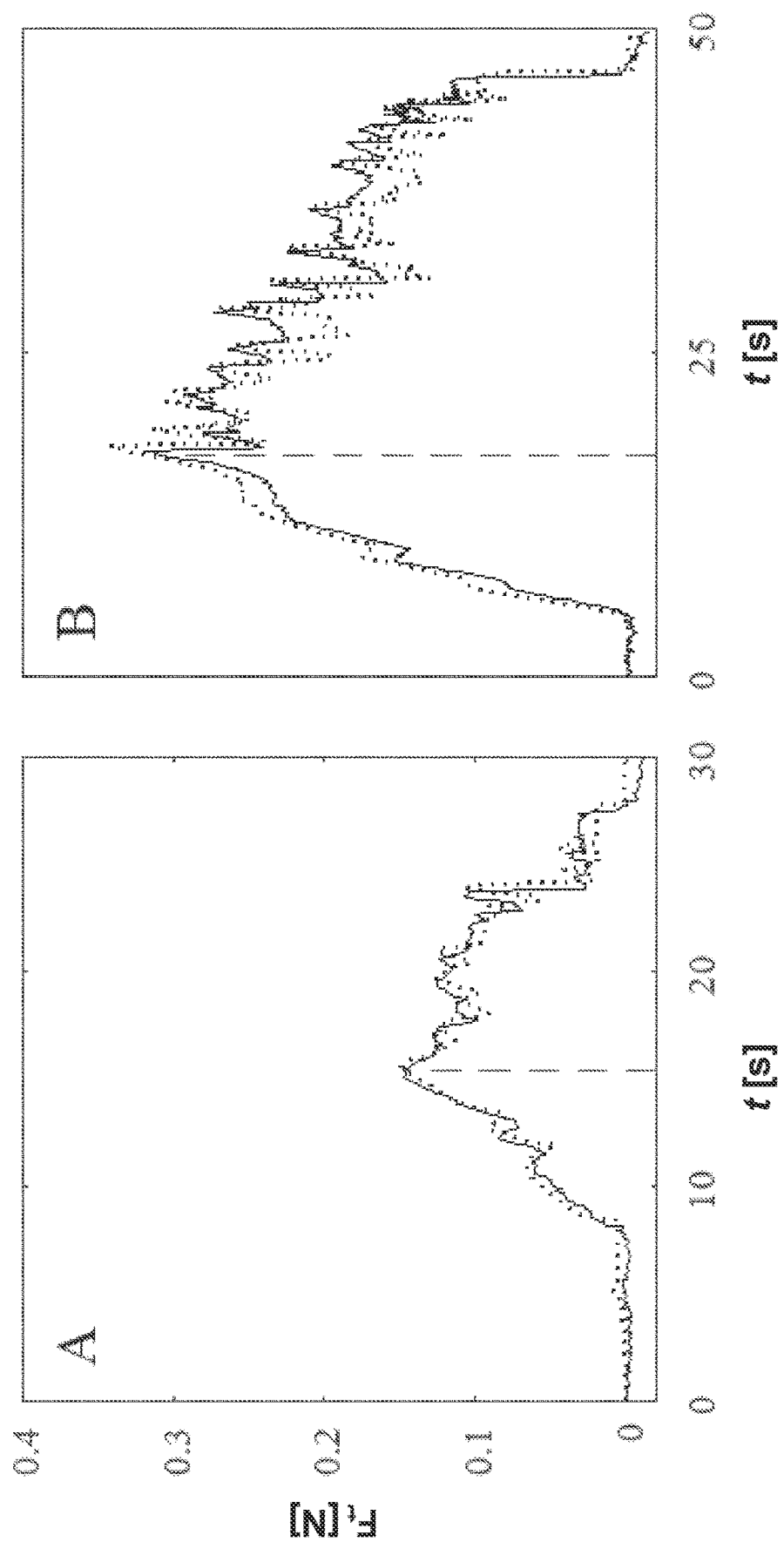
FIG. 23 shows the temporal response of the shear force sensor with lateral continuous displacement of the stainless steel and sandpaper loading tips, according to an example embodiment.

FIG. 23 shows the temporal response of the shear force sensor with lateral continuous displacement of the stainless steel and sandpaper loading tips. A normal force of 0.2 N was applied and then loading tips are translated until slip occurs and then loses contact. The resolved shear force was calculated using resistance measurement and sensitivity determined by previous static characterization experiments. As the loading tip begins to move, the measured load from both the sensing skin and the F/T transducer increase similarly until slip occurred and results in a gradual decrease in the measured shear force. The shear force continuously decreases after slip because the contact area decreases with further translation of the circular cross section loading tip. When the loading tip is no longer in contact with the sensor, the shear force returns to zero, showing little hysteresis. Throughout the slip event the measured shear force matched with reference force measured by the F/T transducer, indicating that the shear force reported by the shear skin is accurate. A useful application of a shear force tactile sensor is to detect slip and is crucial in many manipulation tasks such as grasp control. The decreasing measured shear force could be used as indicator of incipient slip and trigger actuation such as increasing torques at certain joints to re-establish the grip. The normal force was 0.2 N in either case, but higher maximum shear force of 0.34 N is recorded with the sandpaper loading tip compared to 0.15 N with stainless steel one. This is likely due to the greater coefficient of friction of PDMS-sandpaper relative to PDMS-stainless steel. In a controlled slip event, such as sliding along surface to examine the texture, the friction coefficient can be inferred by shear and normal force sensing. Prior knowledge of friction coefficient as well as its real-time monitoring have been shown to be essential in grasping fragile objects.

Controlled Vibration

In the controlled vibration tests, a piezo actuator was used to generate oscillating displacement. The displacement is measured by a laser Doppler vibrometer (LDV). FIG. 24A shows the normalized shear response power magnitude and LDV vibration amplitude as a function of actuation frequencies. Both the response and LDV vibration amplitude increases to the maximum as the frequency reaches the actuating system's resonance frequency at 260 Hz, then decreases as frequency continues to increase. The resonances at 105 Hz and 260 Hz diminish the ability of the experimental setup to adequately characterize sensor's dynamic response at these frequencies. The sensor response magnitude is above the noise floor (2.4E-5) for frequencies below 800 Hz. In these experiments the maximum frequency measured is limited by the piezo-actuated vibration amplitude at high frequencies.

Figure 25:
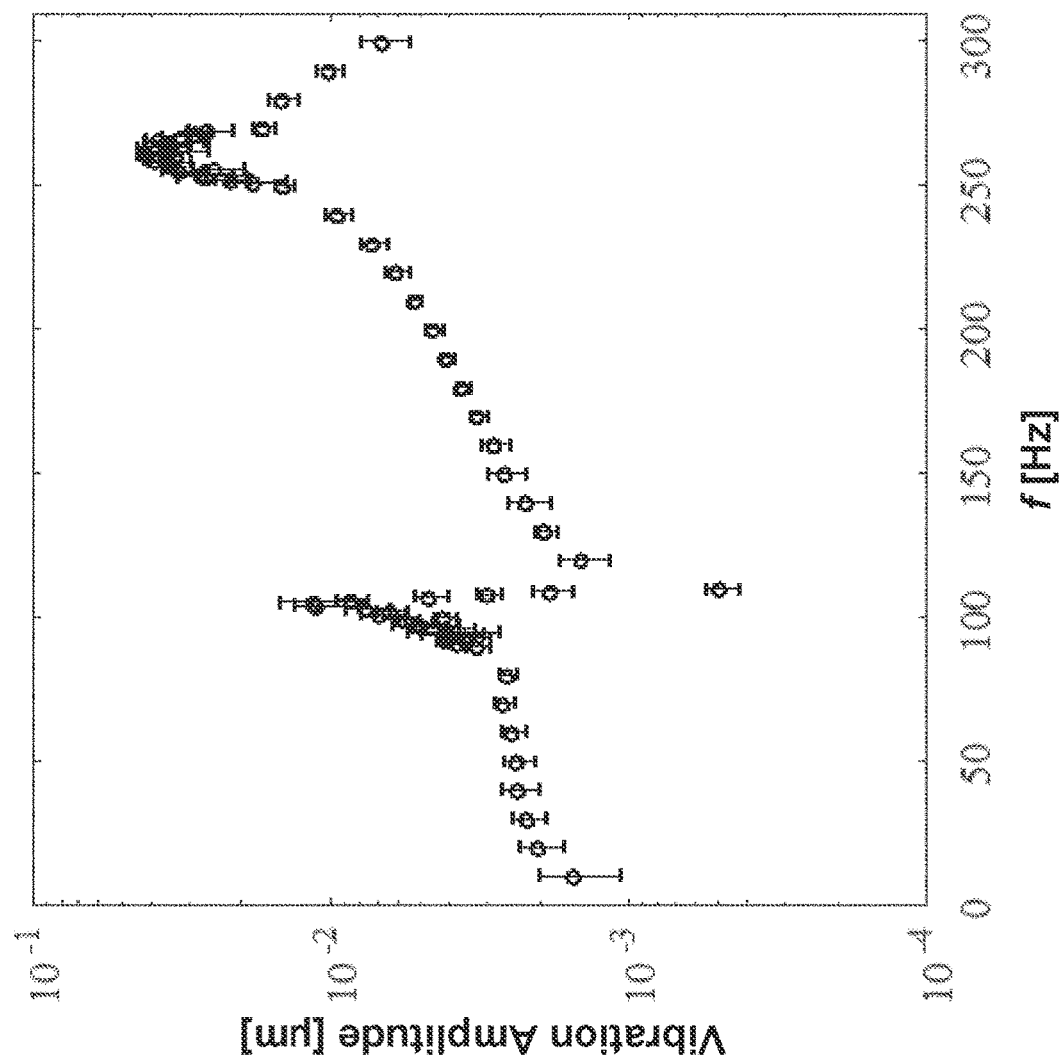
FIG. 25 shows actuated displacement measure by laser Doppler vibrometer with concentration at these frequencies, according to an example embodiment.

FIG. 24B further shows sensor dynamic sensitivity as the quotient of shear sensor response magnitude and actuated displacement magnitude measured by LDV shown in FIG. 24A. The dynamic sensitivity stays relatively constant showing that the sensor is able to faithfully measure the amplitude of a periodic displacement for a wide range of frequencies below 800 Hz, which is the limit of current piezo actuator to provide sufficient displacement amplitude at high frequencies. The peaks around 100 Hz and 260 Hz in FIG. 24A indicate natural frequencies of the actuating system. FIG. 25 shows actuated displacement measure by LDV with concentration at these frequencies. The actuated input clearly presents two peaks around these frequencies and is significantly higher than the rest by almost an order of magnitude. Such great input might drive the sensor skin into non-linear region and deviate from the linear assumption to calculate the dynamic sensitivity as the quotient of the sensor response amplitude and actuating vibration amplitude. Future work may shift these natural frequencies higher so that the characteristic of the actuating vibration amplitude will be constant throughout the bandwidth of interest. Preliminary results shows indication that increasing the stiffness and decreasing the mass of the actuating system would increase the natural frequency.

Figure 26:
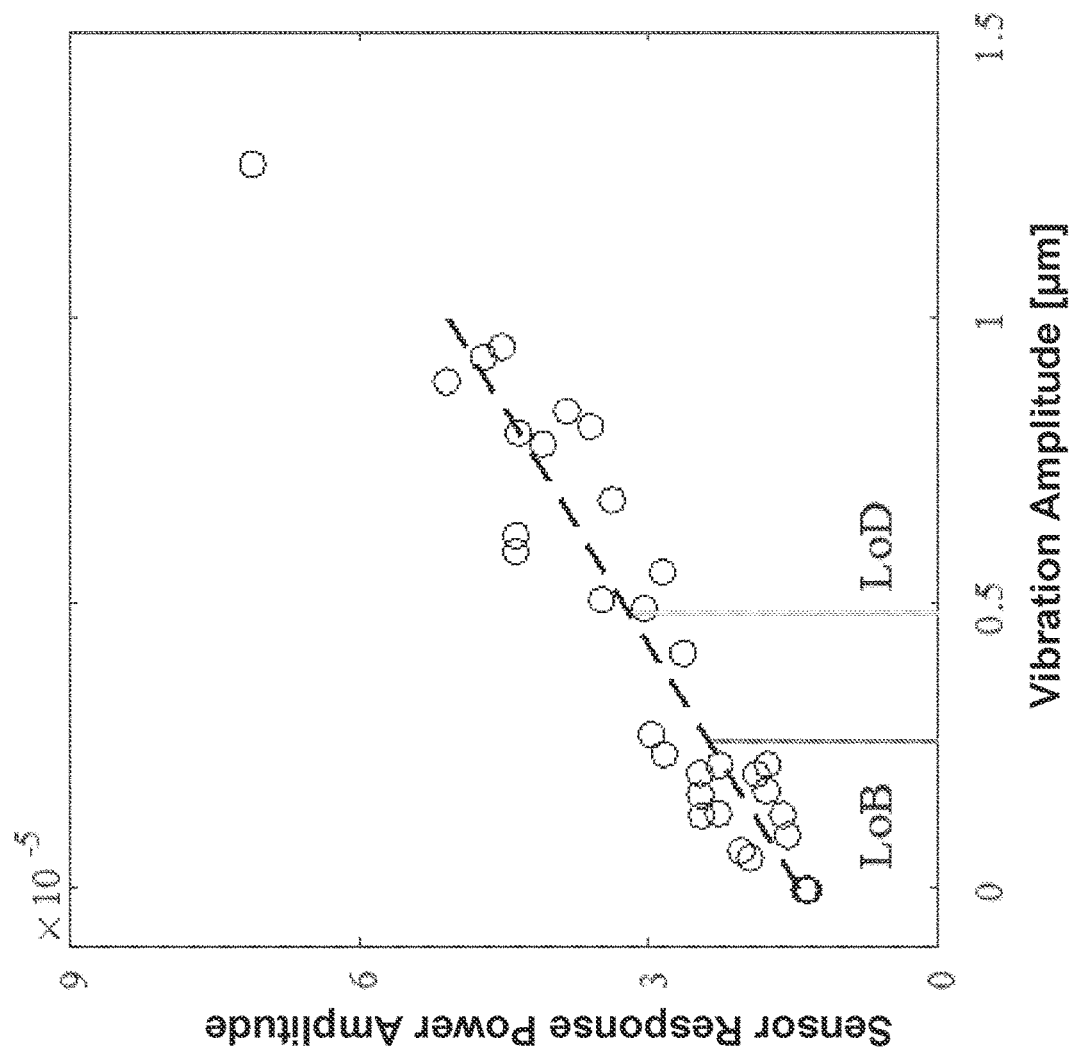
FIG. 26 shows sensor response signal power with respect to laser Doppler vibrometer vibration amplitude at 240 Hz, according to an example embodiment.

The limit of detection (LoD) is defined as the lowest amplitude of vibration that can be reliably detected and differentiated from zero vibration amplitude and represents the vibration detection threshold of the shear sensor skin. FIG. 26 shows sensor response signal power with respect to LDV vibration amplitude at 240 Hz. The sensor showed linear response to a variety of vibration amplitude and linear regression is performed to convert sensor response power to vibration amplitude. The limit of blank (LoB) (red line) is calculated from the sensor response with no vibration excitation as $\mu+1.645\sigma_B$, where $\mu$ and $\sigma_B$ are respectively mean and standard deviation of sensor response with no excitation. Limit of detection (LoD) (green line) is calculated from a few low amplitude trials as LoB+1.645 $\sigma_S$, where $\sigma_S$ is the standard deviation from low amplitude trials. The LoDs are calculated from all frequencies of interest and presented in FIG. 24C.

Shear sensor skin vibration detection threshold is determined for all frequencies of interest and presented in FIG. 24C and compared to human vibration sensitivity from Fishel and Loeb. FIG. 24C shows that a human's ability to perceive vibration decreases from 10 microns at low frequency to a minimum of 0.47 microns at 260 Hz where it increases linearly, but remains under a few microns at 700 Hz. The maximum frequency vibration that a human can tactilely sense is roughly 800~1000 Hz. The shear sensing skin's detection threshold is relatively constant in the range of 0.3-0.6 microns across from 0-800 Hz. The shear sensing skin outperforms human within 0-140 Hz and 500-800 Hz, and roughly equivalent to the average human between 140 and 500 Hz. Overall, the shear sensor is on equivalent or better than to human vibration sensing capabilities below 800 Hz.

Example 3—Field Tests of the First Sensor Device

Figure 27:
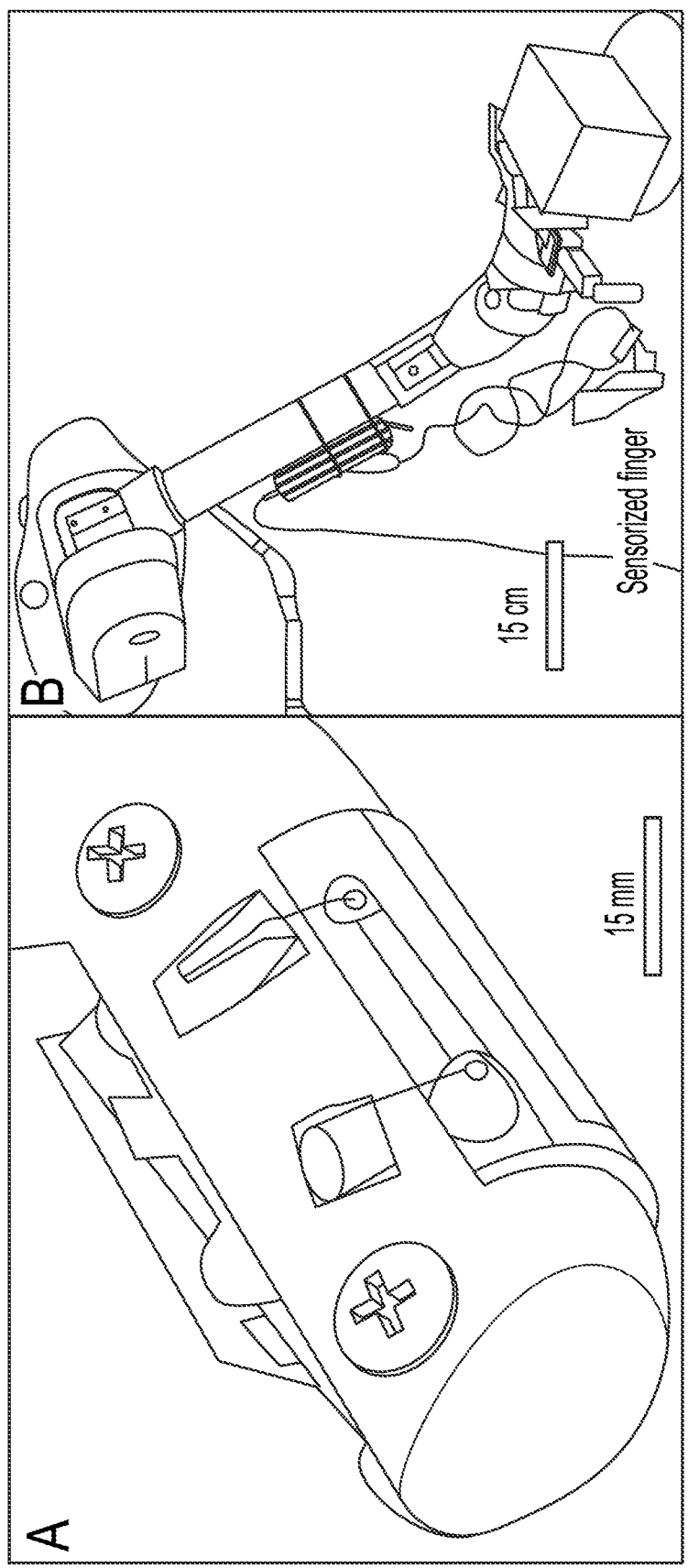
FIG. 27 shows the sensor mounted on an artificial fingertip which is attached to a robotic manipulator, according to an example embodiment.

The shear force sensor potential of providing critical tactile event cues in robotic applications and its robustness in more realistic operating conditions using a robotic manipulator and object manipulation was demonstrated and is disclosed herein. In applications, the sensor needs to be robust to electromagnetic interferences generated by robotic manipulator. The shear sensing skin robustly reported tactile events while the robotic arm performed several manipulation tasks including pick and place, drop, and handoff. FIG. 27 shows the sensor mounted on an artificial fingertip that is attached to a BarrettHand robotic manipulator Pick and place, drop and handoff object manipulation experiments were performed on a box (15.8×10.5×9.8 cm, 204 g) to examine the sensor response to various grasp and slip conditions. All three tests began with the robotic manipulator grasping the box with a three-finger grip. The sensorized finger was on one side and the other two fingers on the opposite side. For the pick and place test, the manipulator lifted the box vertically 2.5 cm (over the 8 seconds), returned the box to 2 mm below its original position (at the same rate), and then released the fingers. For the drop test, the manipulator lifted the box vertically and then slowly opened its grasp until the box fell. For the handoff test, the manipulator lifted the box while a human operator applied forces to the box in the vertical direction. The manipulator was then signaled to release the grip on the box.

FIG. 28 shows the snapshots of different manipulation stage and sensor response to the pick and place test. The measured shear force response is zero before finger made contact with the object, then increases to a constant value around 1 N when the effector grasps and lifts the box. The shear sensor accurately measured half of the box's total weight of 2 kg m/s$^2$. Note the initial overshoot in the shear force due to the acceleration of lifting the box. The sensor response is constant throughout the duration of grasp until the manipulator returned the box to the operating platform by pushing slightly into the platform. Pushing the box into the platform is captured by the shear force sensor as a negative shear force (III) before it returned to around zero when the manipulator released the box.

Figure 29:
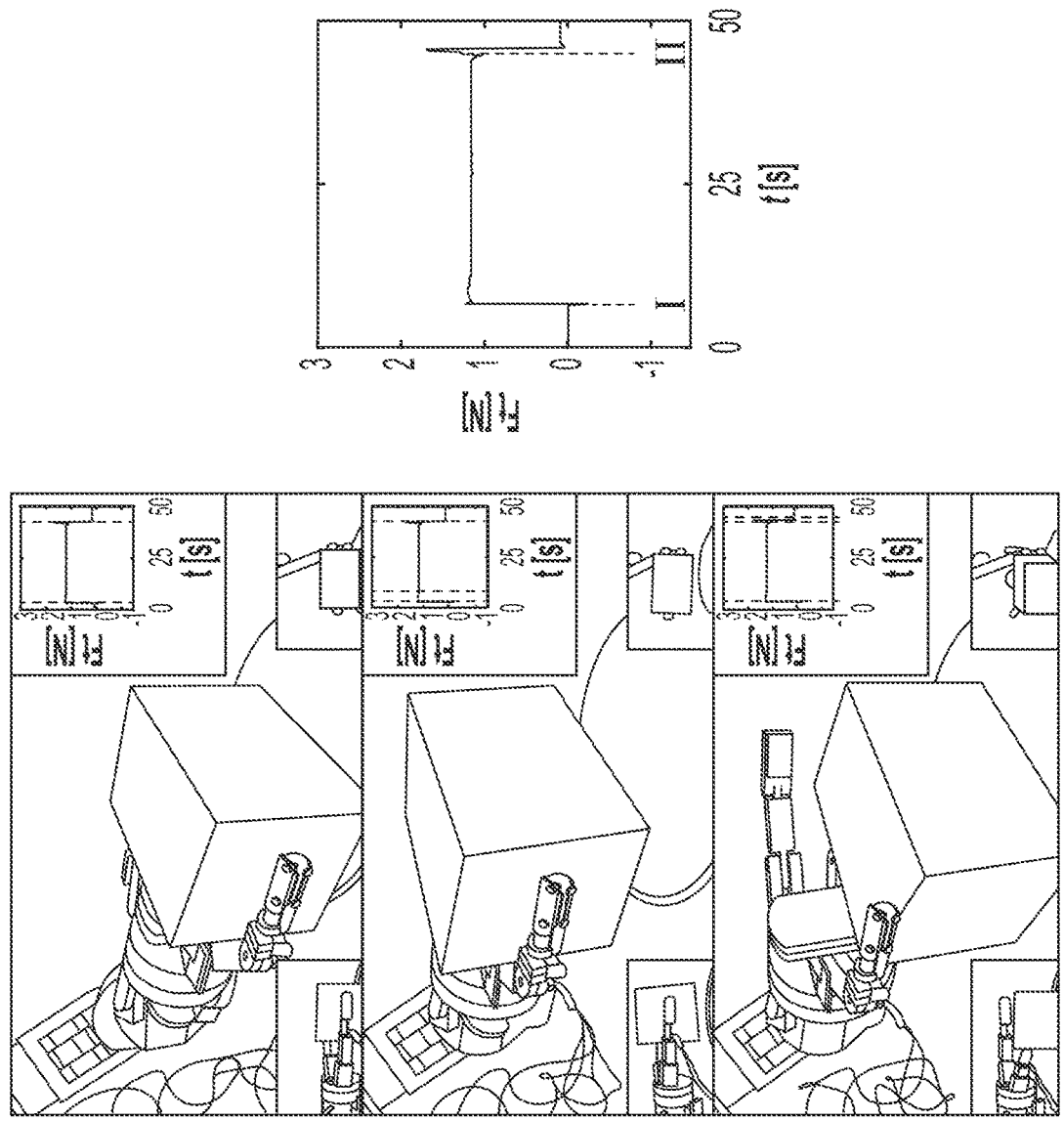
FIG. 29 shows pick and drop tests, according to an example embodiment.

In the pick and drop tests, shown in FIG. 29, the shear force increases from zero to approximately 1N when the object is picked up (I). As the grasp is slowly opened, the object begins to slip and the shear force fluctuates and finally decreases to approximately zero when the object is completely released and falls away (II). The fluctuation during the release first slightly decreases, due to the object's transient vertical acceleration, and then rapidly increases to approximately 1.5 N. We interpret this sharp increase to the box shifting its pose within the grasp. As the grasp is gradually opened, the object slips from the lower stock finger and twists, reforming contact with the sensorized finger and the top stock finger at a new angle as the distance between these fingers has increased. In this new configuration, the symmetry of the force distribution is broken because the box is tilted and the lower stock finger is no longer in contact with the object and applies no force.

Figure 30:
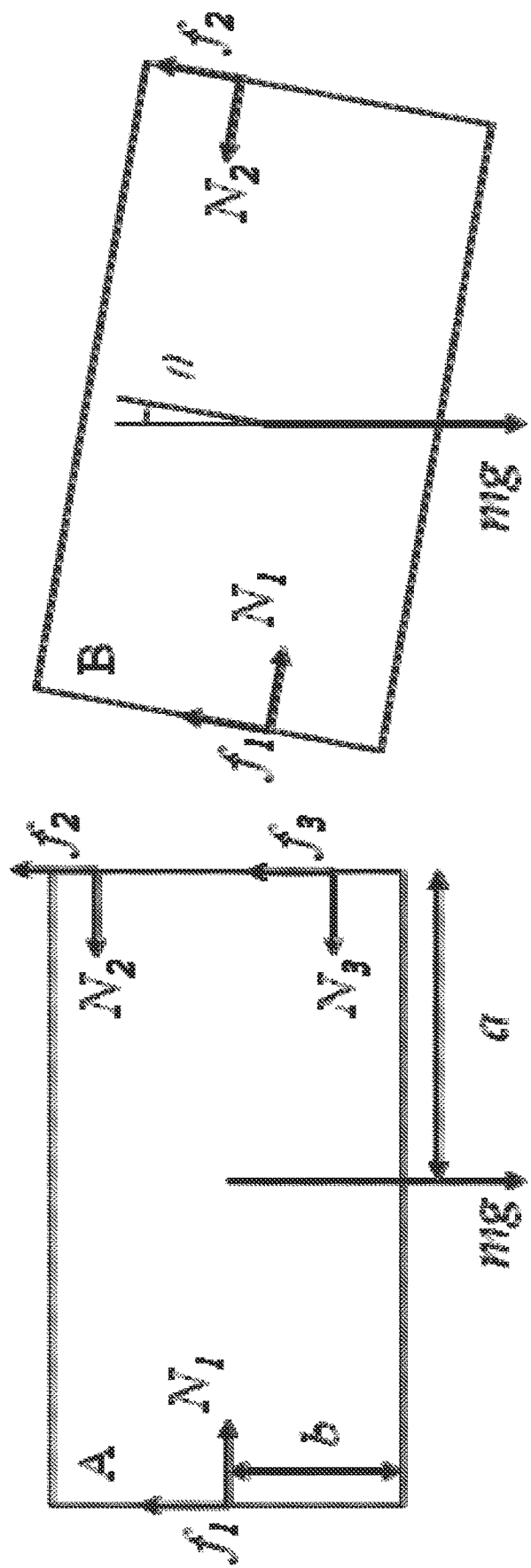
FIG. 30 shows free body diagrams of the manipulating box, according to an example embodiment.

FIG. 30A shows the free body diagram of the manipulating box when it's in contact with three fingers during lift. FIG. 30B shows the manipulating box tilted and is in contact with only two fingers, the sensorized finger at location 1 and the top stock finger at location 2. N and f represents normal force and friction force at each location, a and b are geometry measurements, m is the mass of the object. At steady state the sum of the forces are zero, so that:

$$N_1 + mg \sin\theta = N_2, \quad (1)$$

$$f_1 + f_2 = mg \cos\theta, \quad (2)$$

Sum of moment is zero, so that:

$$(N_1 + N_2)b + f_2 a = f_1 a \quad (3)$$

The finger-object contact at location 2 is slipping, therefore according to Coulomb's friction law $$f_2 = \mu_2 N_2, \quad (4)$$

$$1, 2, 4 \rightarrow f_1 + \mu_2 N_1 = (\cos\theta - \mu\sin\theta)mg \quad (5)$$

$$1, 2, 3 \rightarrow f_1 = (2N_1 + mg\sin\theta)\frac{b}{a} + \mu_2(N_1 + mg\sin\theta) = \left(\frac{2b}{a} + \mu_2\right)N_1 + \left(\frac{b}{a} + \mu_2\right)mg\sin\theta \quad (6)$$

Plug 6 into 5

$$N_1 = \frac{mg\left(\cos\theta - \left(2\mu_2 + \frac{b}{a}\right)\sin\theta\right)}{\frac{2b}{a} + 2\mu_2}, \quad (7)$$

Plug 7 into 6

$$f_1 = mg\left(\frac{\left(\cos\theta + \left(2\mu_2 + \frac{b}{a}\right)\sin\theta\right)\left(\frac{2b}{a} + \mu_2\right)}{\frac{2b}{a} + 2\mu_2} + \left(\frac{b}{a} + \mu_2\right)\sin\theta\right) = \frac{mg}{2\left(\frac{b}{a} + \mu_2\right)}\left(\left(\frac{2b}{a} + \mu_2\right)\cos\theta - \frac{b}{a}\mu_2\sin\theta\right) \quad (8)$$

When $\theta \rightarrow 0$, $f_1 \approx \frac{\frac{2b}{a} + \mu_2}{\frac{2b}{a} + 2\mu_2} mg$ The mass of the object m=204 g. The friction coefficient was estimated to be 0.7~1.6. Therefore $f_1$ is estimated to be 1.28~1.47 N. Such results are in close proximity from the experimental observations of pick and drop test. The conclusion is that the measured shear force is larger than half of the object weight when stationary and estimated to be 1.3~1.5 N, which is confirmed by experimental results. As the grasp is further released, the box can no longer sustain its position by tilting and loses contact with all the fingertips, and the measured shear force rapidly decreases to near zero.

Figure 31:
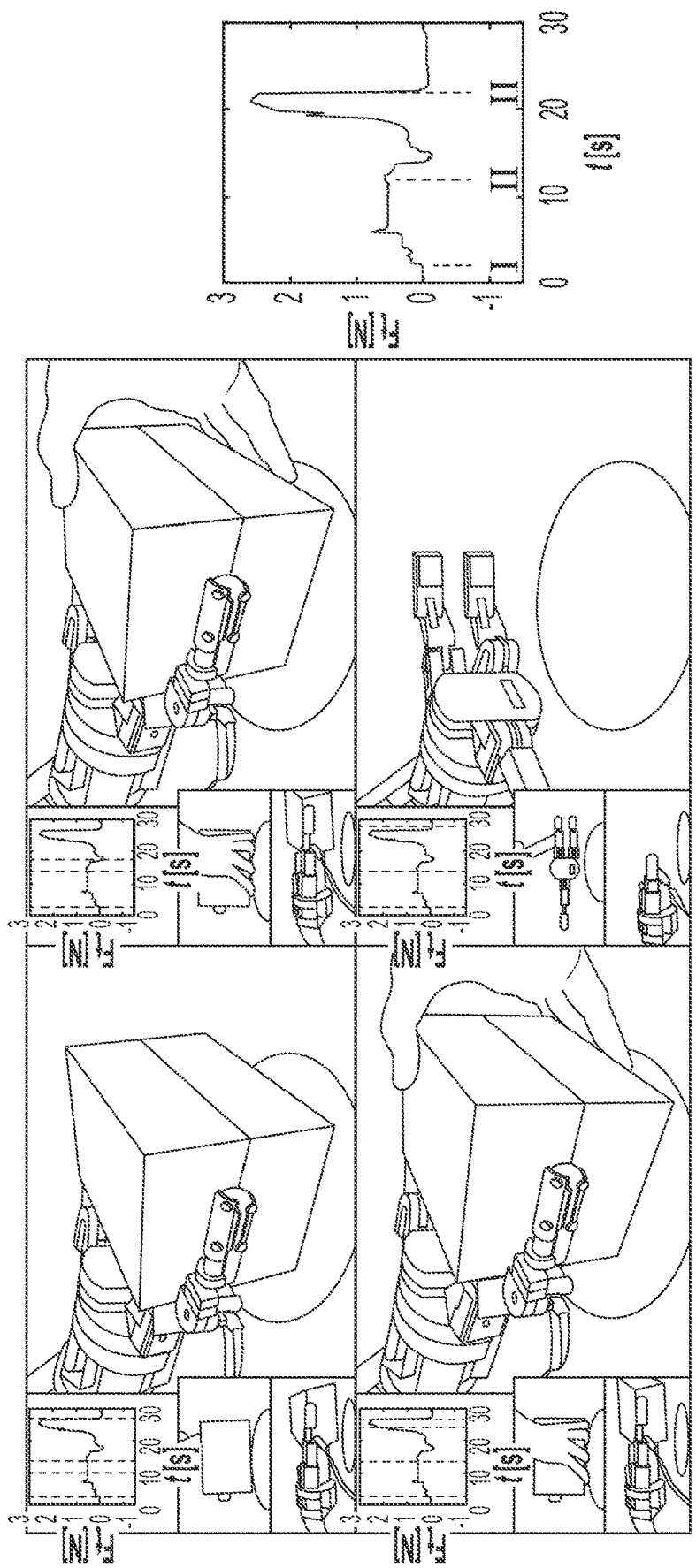
FIG. 31 shows the snapshots of different manipulation stage and the sensor response when the robotic hand transfers the box to a human hand and then releases its grip, according to an example embodiment.

FIG. 31 shows the snapshots of different manipulation stage and the sensor response when the robotic hand transfers the box to a human hand and then releases its grip. In these handoff tests, after the box was lifted (I), the shear force sensor reported varying shear force when both the manipulator and human hand are interacting with the object (starting from II). In this case the shear force is dependent on the dynamics of the manipulating object. Depending on the direction and magnitude of the force applied by the human, the shear force that the sensor reported fluctuated. At the end of the handoff process the manipulator released the grasp on command and shear force returned to approximately zero (III). In all three tests the measured shear force returns to approximately zero with some hysteresis that might be a result of friction and adhesion between the sensor skin and plastic fingertip surface. The shear sensing skin's performance in the above tasks showed its ability to obtain information about shear force on the fingertip and thus finger-object interactions. The change of shear force indicates occurrence of tactile events such as grasping and slipping. Through such information, the sensor can also provide insight into human-robot interactions as shown in the handoff tests.

Example 4—Static and Dynamic Characterization of a Second Sensor Device

Static Characterization

Figure 32:
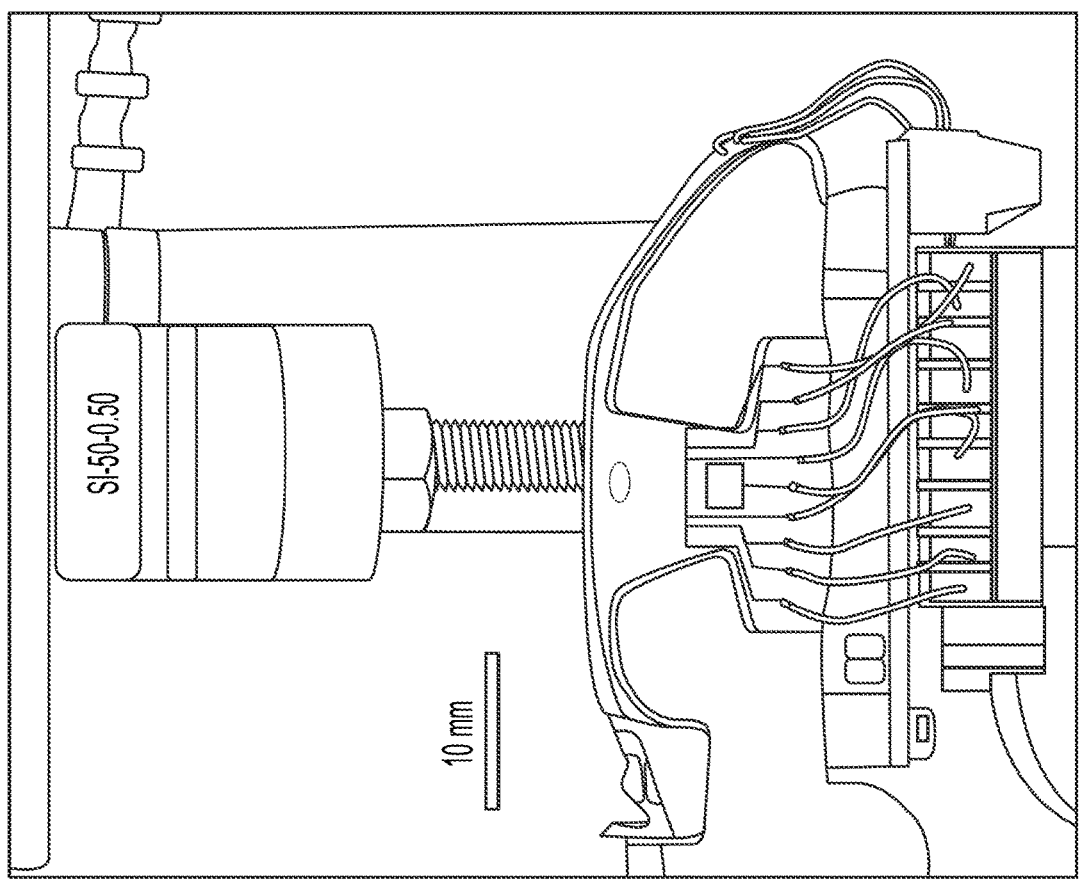
FIG. 32 shows the experimental apparatus, according to an example embodiment.
Figure 33:
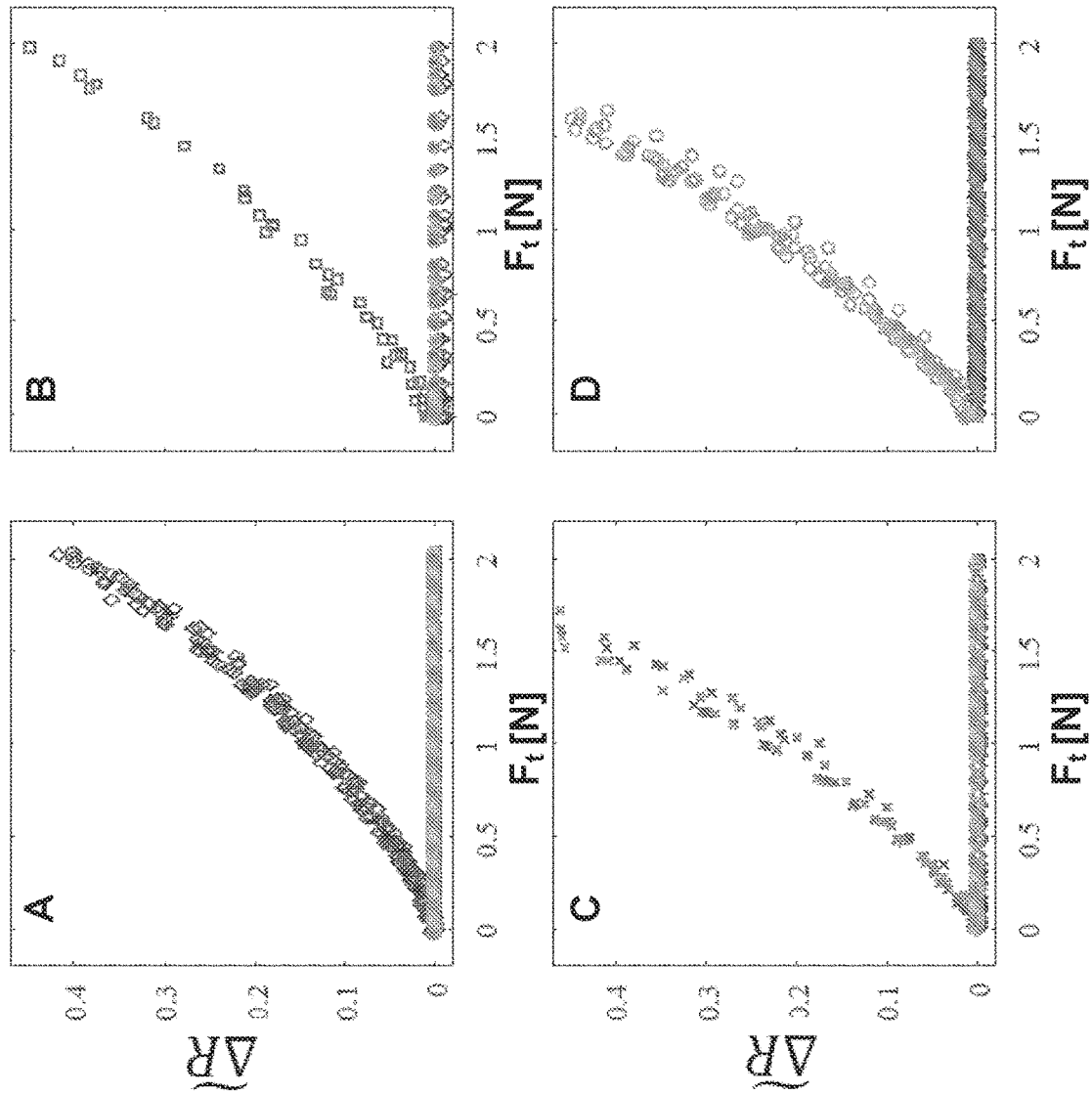
FIG. 33 shows normalized sensor responses plotted against measured normal force from force transducer, according to an example embodiment.

Static characterization tests were performed on the four center normal force sensors using similar procedure as Example 2. A 10-32 bolt is used as the force loading tip to apply normal force to an individual normal force sensor. FIG. 32 shows the experimental apparatus. During each test, normal force is loaded stepwise to 2N in increments of 0.1 N. Four normal force sensors located at the center of the fingerpad are characterized and the normalized sensor responses are calculated and plotted against measured normal force from force transducer in FIG. 33 as different markers. Each panel represents the scenario where normal force is applied to a single sensor. Each taxel showed weak nonlinear response. Neighboring taxels showed negligible response, indicating little cross-talk and interference.

Figure 34:
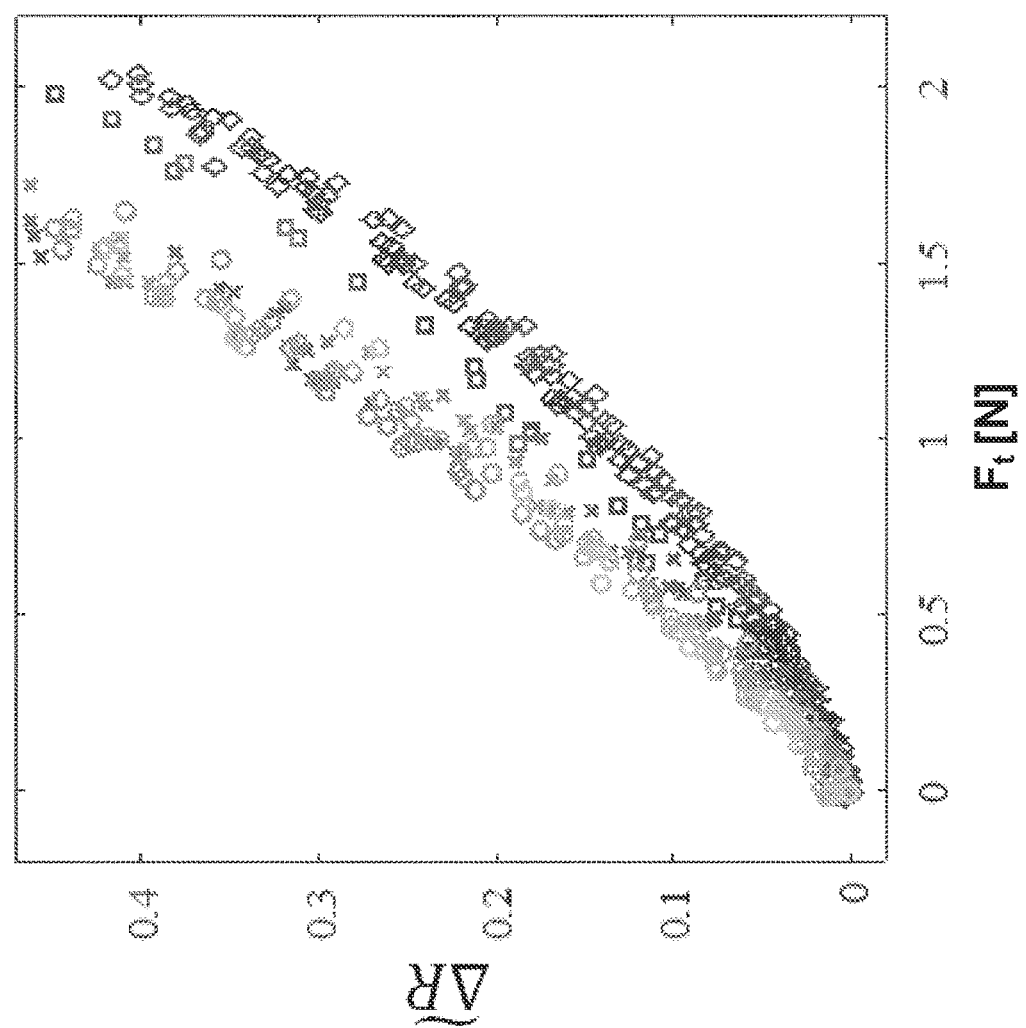
FIG. 34 shows calibration curves as normalized sensor response with respect to normal force, according to an example embodiment.

FIG. 34 shows calibration curves as normalized sensor response with respect to normal force for all four taxels. Sensitivities for the taxels are tabulated in Table 2. The difference in sensitivity may be the result of slight difference of geometry due to spatial non-uniformity during fabrication or small deviations of the alignment of the loading tip. Using the standard deviation of each data point and a linear regression, the resolution is determined as 5 mN. Considering the upper limit as 5 N, the normal sensor skin can be characterized as a 10-bit.

TABLE 2

| Taxel number | Sensitivity [N$^{-1}$] |
|---|---|
| 1 | 0.13 |
| 2 | 0.16 |
| 3 | 0.21 |
| 4 | 0.22 |
| Average | 0.18 |

Figure 35:
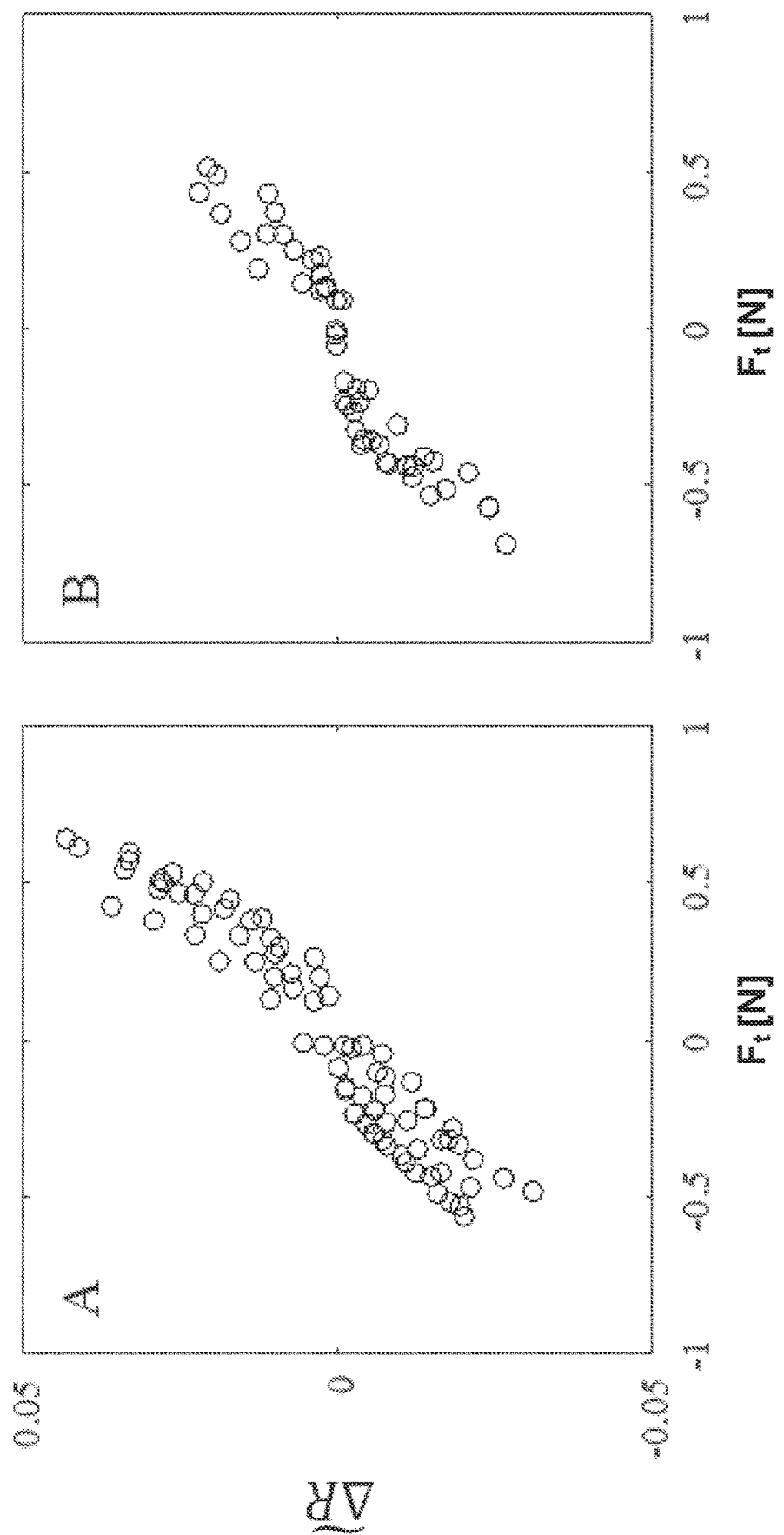
FIG. 35 shows the shear force sensor response with respect to shear force in distal/proximal and radial/ulnar direction, according to an example embodiment.

The shear force sensor response was characterized in static experiments similar to the ones for the single shear sensor. The force loading tip applies 0.5 N of normal force before it is laterally displaced while the force reading from reference transducer and shear force sensing units are recorded. FIG. 35 shows the shear force sensor response with respect to shear force in distal/proximal and radial/ulnar direction. Both direction of shear force sensing presented monotonic response, while the radialiulnar direction showed larger deadband. Sensitivity is characterized by the slope of the linear regression and is 4.7%/N for distal/proximal direction and 3.2%/N for radial/ulnar direction. The average sensor noise floor is 3.13E-4. Considering maximum force of 5 N the shear sensor dynamic range is around 500, or 9-bit. The difference of sensitivity and deadband between this sensor and the single dimension one might be the result of several confounding factors. First, the sharp change of surface tangent at the corners on radial/ulnar side might hinder the skin from sliding freely and applying strain to the location of the sensing taxels. The shear force sensors are located away from the center fingerpad area and located on the side of the finger where the surface radius of curvature is small (except the proximal direction gauge). They are also adjacent to the reservoirs where the skin thickness is increased due to the sealing required fixing lead wires to the reservoirs. The combined effect of locally increased thickness and small radius of curvature is that the skin cannot adhere to the surface well. In addition, there are two dimension of shear force sensing and the shear force at the fingerpad in one direction is no longer balanced by the tab in that direction alone, but also the orthogonal direction. For example shear force in radial/ulnar direction also induces shear strain in the proximal/distal tab of the skin. Therefore the strain experience by the radial/ulnar tab that is translated into sensor resistive change by the shear force sensor there is reduced.

Controlled Vibration

Figure 36:
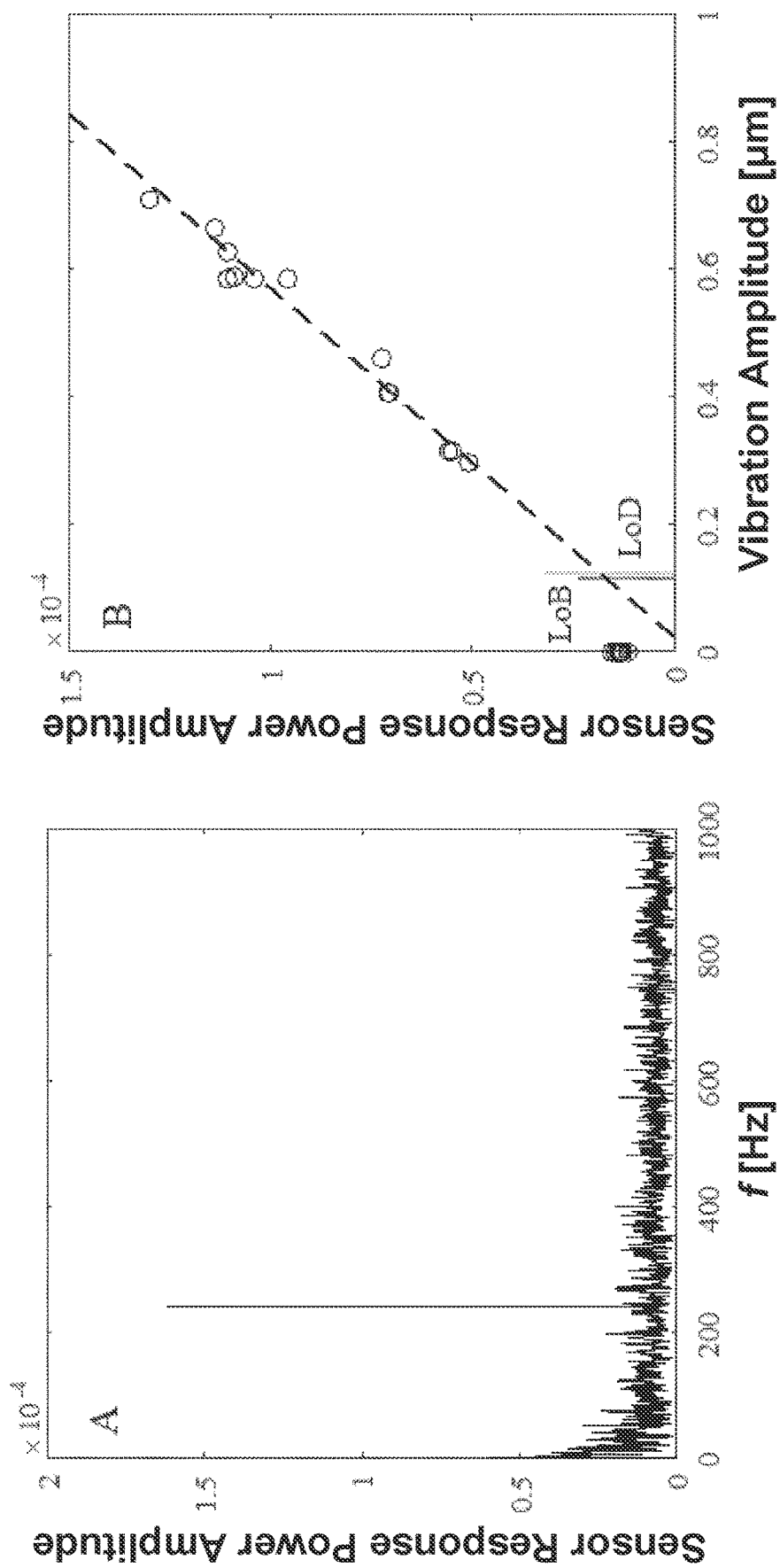
FIG. 36 shows a representative fast Fourier transform plot, according to an example embodiment.

Vibration sensing using the normal force sensors is characterized similarly to Example 2 above except that the oscillating displacement is actuating the normal force sensors. The loading tip applied normal force of 0.5 N first, measured by normal force using previous calibration. Then vibration in the normal direction is actuated using the piezo actuator at different frequencies and amplitudes. FIG. 36A shows a representative FFT plot where a single peak is found at the actuating frequency of 240 Hz. The power spectrum is integrated within 2 Hz window centered at the actuating frequency. The results are called normal force sensor response power for sensor response FFT and vibration amplitude for LDV measurement FFT. FIG. 36B shows the normal force sensor vibration sensing calibration, which is the plot of these two variables. The sensitivity is the slope of the calibration, describing sensor response per unit vibration amplitude. Limit of detection (LoD) is defined in the same way as Example 2 and considered detection threshold for the normal force sensor vibration sensing.

Figure 37:
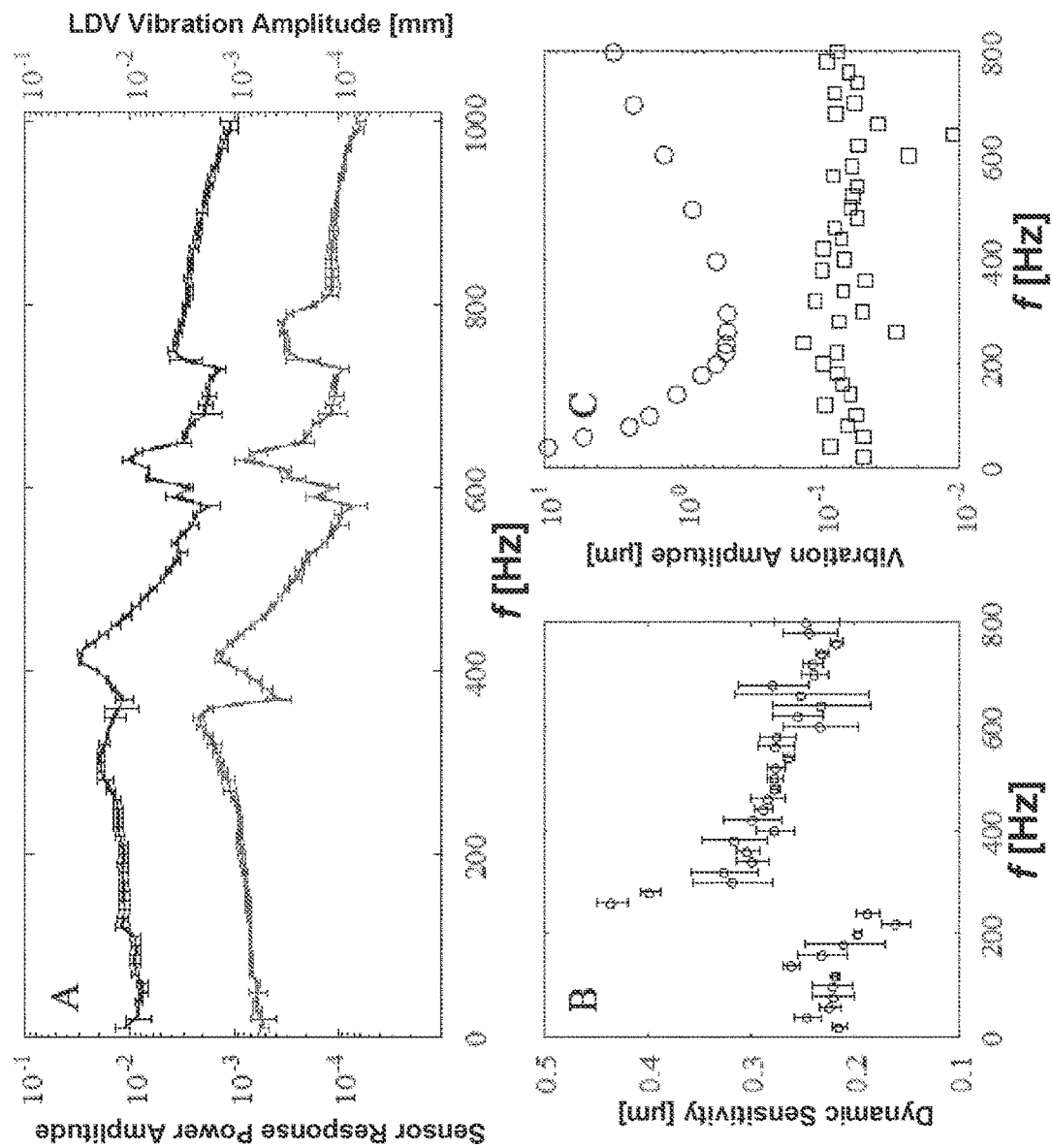
FIG. 37 shows sensor response power and laser Doppler vibrometer measured vibrating displacement with respect to frequency, according to an example embodiment.

FIG. 37A shows sensor response power and LDV measured vibrating displacement with respect to frequency. Both the response and LDV vibration amplitude increases to the maximum as the frequency reaches the actuating system's natural frequency at 410 Hz, then decreases as frequency continues to increase. The sensor response magnitude is above the noise floor (less than 1E-4, not shown) for frequencies below 1 kHz. FIG. 37B shows dynamic sensitivity as the quotient of the sensor response and the vibration amplitude measured by LDV. The sensor shows relatively constant sensitivity below 200 Hz, a primary resonance at 260 Hz, and gradually rolls off until 1 kHz. FIG. 37C shows the sensor vibration detection threshold using limit of detection and its comparison to human sensing capabilities. The sensor is superior to human vibration sensing up to 800 Hz by almost one order of magnitude. There is no large variation of the threshold, which is below a few hundred nanometers up to 800 Hz. Such vibration sensing capabilities can be expected from all normal force sensing units distributed on the fingertip.

E. CONCLUSION

The above detailed description describes various features and functions of the disclosed systems, devices, and methods with reference to the accompanying Figures. In the Figures, similar symbols typically identify similar components, unless context dictates otherwise. The illustrative embodiments described in the detailed description, Figures, and claims are not meant to be limiting. Other embodiments can be utilized, and other changes can be made, without departing from the scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

We claim:

1. A sensor device comprising:
   a substrate having a first end and a second end, wherein the substrate includes a contact portion, a first sensor portion positioned between the first end of the substrate and the contact portion, and a second sensor portion positioned between the second end of the substrate and the contact portion, wherein the first and second sensor portions are spaced apart and separated by the contact portion;
   a first strain gauge sensor positioned at the first sensor portion; and
   a second strain gauge sensor positioned at the second sensor portion, wherein the first end of the substrate and the second end of the substrate are configured to be coupled to a rigid curved surface such that the substrate is configured to conform to the rigid curved surface, wherein the first strain gauge sensor and the second strain gauge sensor are embedded in the substrate, and wherein the sensor device is configured such that a force applied to the contact portion of the substrate will be sensed by each of the first strain gauge sensor and the second strain gauge sensor due to a movement of the substrate with respect to the rigid curved surface.

2. The sensor device of claim 1, wherein each of the first strain gauge sensor and the second strain gauge sensor include a plurality of conductive pathways.

3. The sensor device of claim 2, wherein the plurality of conductive pathways comprise a plurality of channels with a conductive liquid metal positioned therein.

4. The sensor device of claim 2, wherein the plurality of conductive pathways are flexible.

5. The sensor device of claim 1, wherein the substrate is at least partially flexible.

6. The sensor device of claim 1, further comprising:
a first mounting portion positioned between the first end of the substrate and the first sensor portion; and
a second mounting portion positioned between the second end of the substrate and the second sensor portion, wherein the first mounting portion and the second mounting portion mount the substrate to the rigid curved surface.

7. The sensor device of claim 1, further comprising:
a normal force sensor positioned on the contact portion.

8. The sensor device of claim 7, wherein the normal force sensor comprises a spiral architecture.

9. A sensor device comprising:
a substrate including a contact portion, a first tab extending from the contact portion, a second tab extending from the contact portion in a direction substantially parallel to and opposite from the first tab, a third tab extending from the contact portion in a direction substantially perpendicular to the first and second tabs, and a fourth tab extending from the contact portion in a direction substantially parallel to and opposite from the third tab;
a first strain gauge sensor positioned at the first tab;
a second strain gauge sensor positioned at the second tab;
a third strain gauge sensor positioned at the third tab;
a fourth strain gauge sensor positioned at the fourth tab; and
a first normal force sensor positioned on the contact portion, wherein a distal end of each of the first tab, the second tab, the third tab, and the fourth tab are configured to be coupled to a rigid curved surface such that the substrate is configured to conform to the rigid curved surface, wherein the first strain gauge sensor, the second strain gauge sensor, the third strain gauge sensor, and the fourth strain gauge sensor are embedded in the substrate, and wherein the sensor device is configured such that a force applied to the contact portion of the substrate will be sensed by each of the first strain gauge sensor, the second strain gauge sensor, the third strain gauge sensor, the fourth strain gauge sensor, and the first normal force sensor due to a movement of the substrate with respect to the rigid curved surface.

10. The sensor device of claim 9, further comprising:
a second normal force sensor positioned between the first strain gauge sensor and the contact portion;
a third normal force sensor positioned between the second strain gauge sensor and the contact portion;
a fourth normal force sensor positioned between the third strain gauge sensor and the contact portion;
a fifth normal force sensor positioned between the third strain gauge sensor and the fourth normal force sensor; and
one or more additional normal force sensors positioned on the contact portion.

11. The sensor device of claim 10, wherein the one or more additional normal force sensors positioned on the contact portion comprises:
a sixth normal force sensor positioned on the contact portion;
a seventh normal force sensor positioned on the contact portion; and
an eighth normal force sensor positioned on the contact portion.

12. The sensor device of claim 9, further comprising:
a first mounting portion positioned on the first tab of the substrate, wherein the first strain gauge sensor is positioned between the first mounting portion and the contact portion; and
a second mounting portion positioned on the second tab of the substrate, wherein the second strain gauge sensor is positioned between the second mounting portion and the contact portion;
a third mounting portion positioned on the third tab of the substrate, wherein the third strain gauge sensor is positioned between the third mounting portion and the contact portion; and
a fourth mounting portion positioned on the fourth tab of the substrate, wherein the fourth strain gauge sensor is positioned between the fourth mounting portion and the contact portion, wherein each of the mounting portions mount the substrate to a rigid curved surface.

13. The sensor device of claim 9, wherein the substrate comprises a material that is soft to shear displacement but stiff to tensile displacement.

14. The sensor device of claim 9, wherein the substrate further comprises a softened region positioned between each of the first tab and the contact portion, the second tab and the contact portion, the third tab and the contact portion, and the fourth tab and the contact portion.

15. The sensor device of claim 14, wherein the softened region comprises a plurality of holes to reduce a local stiffness of the substrate.

16. The sensor device of claim 14, wherein the softened region comprises an anisotropic material that is soft to shear displacement but stiff to tensile displacement.

17. A sensor system comprising:
a sensor device including:
a substrate having a first end and a second end, wherein the substrate includes a contact portion, a first sensor portion positioned between the first end of the substrate and the contact portion, and a second sensor portion positioned between the second end of the substrate and the contact portion, wherein the first and second sensor portions are spaced apart and separated by the contact portion;
a first strain gauge sensor positioned at the first sensor portion; and
a second strain gauge sensor positioned at the second sensor portion; and
a rigid curved surface coupled to the substrate such that the first sensor portion and the second sensor portion are non-coplanar with the contact portion, wherein the first end of the substrate and the second end of the substrate are coupled to the rigid curved surface, wherein the first strain gauge sensor and the second strain gauge sensor are embedded in the substrate, and wherein the sensor system is configured such that a force applied to the contact portion of the substrate will be sensed by each of the first strain gauge sensor and the second strain gauge sensor due to a movement of the substrate with respect to the rigid curved surface.

18. The sensor system of claim 17, further comprising:
a first mounting portion positioned between the first end of the substrate and the first sensor portion; and
a second mounting portion positioned between the second end of the substrate and the second sensor portion, wherein the first mounting portion and the second mounting portion mount the substrate to the rigid curved surface.

19. The sensor system of claim 17, wherein the rigid curved surface comprises an end effector of a robotic device.

20. The sensor system of claim 17, further comprising a lubricant positioned between the substrate and the rigid curved surface.

21. The sensor device of claim 7, wherein the normal force sensor comprises a plurality of conductive pathways including a plurality of channels with a conductive liquid metal positioned therein.

22. The sensor device of claim 7, wherein the normal force sensor comprises a plurality of conductive pathways, and wherein the plurality of conductive pathways are flexible.

* * * * *